(12) United States Patent
Qtaishat et al.

(10) Patent No.: US 9,346,021 B2
(45) Date of Patent: May 24, 2016

(54) COMPOSITE MEMBRANES FOR MEMBRANE DISTILLATION AND RELATED METHODS OF MANUFACTURE

(75) Inventors: Moh'd Rasool Qtaishat, Ottawa (CA); Mohamed Khayet, Madrid (ES); Takeshi Matsuura, Ottawa (CA)

(73) Assignee: Membrane Distillation Desalination Ltd., Co., Amman (JO)

( * ) Notice: Subject to any disclaimer, the term of this patent is extended or adjusted under 35 U.S.C. 154(b) by 125 days.

(21) Appl. No.: 12/629,703

(22) Filed: Dec. 2, 2009

(65) Prior Publication Data

US 2011/0031100 A1    Feb. 10, 2011

Related U.S. Application Data

(60) Provisional application No. 61/119,223, filed on Dec. 2, 2008.

(51) Int. Cl.

| B01D 39/00 | (2006.01) |
|---|---|
| B01D 39/14 | (2006.01) |
| B29C 65/00 | (2006.01) |
| B01D 69/12 | (2006.01) |
| B01D 61/36 | (2006.01) |
| B01D 71/32 | (2006.01) |
| B01D 71/54 | (2006.01) |
| B01D 71/64 | (2006.01) |
| B01D 71/68 | (2006.01) |

(52) U.S. Cl.
CPC .............. *B01D 69/12* (2013.01); *B01D 61/364* (2013.01); *B01D 71/32* (2013.01); *B01D 71/54* (2013.01); *B01D 71/64* (2013.01); *B01D 71/68* (2013.01); *B01D 2325/36* (2013.01); *B01D 2325/38* (2013.01)

(58) Field of Classification Search
CPC .... B01D 71/68; B01D 2325/38; B01D 71/64; B01D 71/16; B01D 67/0011; B01D 61/145; B01D 61/362; B01D 67/0016; B01D 71/72
USPC .................... 210/490, 500.27, 500.29, 500.3, 210/500.41; 525/123, 381; 528/66; 202/205; 428/198; 521/64; 264/41
See application file for complete search history.

(56) References Cited

U.S. PATENT DOCUMENTS

| 4,879,041 | A | * | 11/1989 | Kurokawa et al. | ............ | 210/640 |
|---|---|---|---|---|---|---|
| 5,464,540 | A | * | 11/1995 | Friesen et al. | ................ | 210/640 |
| 5,494,855 | A | * | 2/1996 | Nohr et al. | ..................... | 428/198 |
| 5,522,991 | A | * | 6/1996 | Tuccelli et al. | ............... | 210/490 |

(Continued)

OTHER PUBLICATIONS

Lawson et al.: "Membrane Distillation", 1997, Journal of Membrane Science, vol. 124, pp. 1-25, doi:10.1016/S0376-7388(96)00236-0.

(Continued)

*Primary Examiner* — Ana Fortuna
(74) *Attorney, Agent, or Firm* — Sughrue Mion, PLLC

(57) ABSTRACT

The present invention provides composite membranes for membrane distillation and related methods of manufacture. In particular, there is provided a composite hydrophilic/hydrophobic membrane comprising a hydrophilic polymer layer and a hydrophobic polymer layer comprising fluorinated surface-modifying macromolecules, wherein said composite membrane has a high vapor flux. Also provided herein are methods of manufacturing and optimizing the composite membranes and a membrane distillation system comprising the composite membranes.

10 Claims, 38 Drawing Sheets

(56) References Cited

U.S. PATENT DOCUMENTS

| | | | |
|---|---|---|---|
| 5,954,966 A | | 9/1999 | Matsuura et al. |
| 5,958,989 A | * | 9/1999 | Wang et al. .................. 521/64 |
| 6,127,507 A | * | 10/2000 | Santerre ...................... 528/66 |
| 8,071,683 B2 | * | 12/2011 | Mullick et al. .............. 525/123 |
| 2005/0176893 A1 | * | 8/2005 | Rana .................. C08G 18/10 525/242 |
| 2011/0031100 A1 | * | 2/2011 | Qtaishat et al. ............. 202/205 |
| 2011/0207893 A1 | * | 8/2011 | Mullick et al. .............. 525/381 |

OTHER PUBLICATIONS

Burgoyne et al.: "Direct Contact Membrane Distillation", 2000, Separation Science and Technology, vol. 35, No. 8, pp. 1257-1284.
Alklaibi et al.: "Membrane-Distillation Desalination: Status and Potential", 2004, Desalination, vol. 171, pp. 111-113, doi: 10.1016/j.desal.2004.03.024.
Curcio et al.: "Membrane Distillation and Related Operations—A Review", 2005, Separation and Purification Reviews, vol. 34, pp. 35-86, doi: 10.1081/SMP-200054951.
Bourawi et al.: "A Framework for Better Understanding Membrane Distillation Separation Process", 2006, Journal of Membrane Science, vol. 285, pp. 4-29, doi: 10.1016/j.memsci.2006.08.002.
Peng et al.: "Desalination by Membrane Distillation Adopting a Hydrophilic Membrane", 2005, Desalination, vol. 173, pp. 45-54, doi: 10.1016/j.desal.2004.06.208.
Feng et al.: "Preparation and Properties of Microporous Membrane from Poly(vinylidene fluoride-co-tetrafluoroethylene) (F2.4) for Membrane Distillation", 2004, Journal of Membrane Science, vol. 237, pp. 15-24, doi: 10.1016/j.memsci.2004.02.007.
Feng et al.: "Factors Affecting Pore Structure and Performance of Poly(vinylidene fluoride -co-hexafluoro propylene) Asymmetric Porous Membrane", 2006, Journal of Membrane Science, vol. 277, pp. 55-64, doi: 10.1016/j.memsci.2005.10.009.
Li et al.: "Novel Membrane and Device for Vacuum Membrane Distillation-Based Desalination Process", 2005, Journal of Membrane Science, vol. 257, pp. 60-75, doi: 10.1016/j.memsci.2004.08.040.
Song et al.: "Direct contact Membrane Distillation-Based Desalination: Novel Membranes, Devices, Larger-Scale Studies, and a Model", Feb. 27, 2007, Industrial & Engineering Chemistry Research, vol. 46, No. 8, pp. 2307-2323, doi: 10.1021/ie0609968.
Gilron et al.: "Design for Cascade of Crossflow Direct Contact Membrane Distillation", Mar. 16, 2007, Industrial & Engineering Chemistry Research, vol. 46, No. 8, pp. 2324-2334, doi: 10.1021/ie060999k.
Bonyadi et al.: "Flux Enhancement in Membrane Distillation by Fabrication of Dual Layer Hydrophilic-Hydrophobic Hollow Fiber Membranes", 2007, Journal of Membrane Science, vol. 306, pp. 134-146, doi: 10.1016/j.memsci.2007.08.034.
Khayet et al.: "Preparation and Characterization of Polyvinylidene Fluoride Membranes for Membrane Distillation", Oct. 24, 2001, Industrial & Engineering Chemistry Research, vol. 40, No. 24, pp. 5710-5718, doi:10.1021/ie010553y.
Khayet et al.: "Application of Surface Modifying Macromolecules for the Preparation of Membranes for Membrane Distillation", 2003, Desalination, vol. 158, pp. 51-56, doi:10.1016/S0011-9164(03)00432-6.
Khayet et al.: "Porous Hydrophobic/Hydrophilic Composite Membranes Application in Desalination Using Direct Contact Membrane Distillation", 2005, Journal of Membrane Science, vol. 252, pp. 101-113, doi: 10.1016/j.memsci.2004.11.022.
Khayet et al.: "Porous Hydrophobic/Hydrophilic Composite Membranes: Estimation of the Hydrophobic-Layer Thickness", 2005, Journal of Membrane Science, vol. 266, pp. 68-79, doi: 10.1016/j.memsci.2005.05.012.
Khayet et al.: "Design of Novel Direct Contact Membrane Distillation Membranes", 2006, Desalination, vol. 192, pp. 105-111, doi: 10.1016/j.desal.2005.06.047.

Khayet et al.: "Porous Hydrophobic/Hydrophilic Composite Membranes Preparation and Application in DCMD Desalination at Higher Temperatures", 2006, Desalination, vol. 199, pp. 180-181, doi: 10.1016/j.desal.2006.03.039.
Khayet et al.: "Study on Surface Modification by Surface-Modifying Macromolecules and its Applications in Membrane-Separation Processes", 2003, Journal of Applied Polymer Science, vol. 89, No. 11, pp. 2902-2916, doi: 10.1002/app.12231.
Ahmad et al.: "Development of an Integrally Skinned Ultrafiltration Membrane for Wastewater Treatment: Effect of Different Formulations of PSf/NMP/PVP on Flux and Rejection", 2005, Desalination, vol. 179, pp. 257-263, doi: 10.1016/j.dessal.2004.11.072.
Fang et al.: "Effect of Surface-Modifying Macromolecules and Solvent Evaporation Time on the Performance of Polyethersulfone Membranes for the Separation of Chloroform/Water Mixtures by Pervaporation", 1994, Journal of Applied Polymer Science, vol. 54, pp. 1937-1943, doi: 10.1002/app.1994.070541216.
Suk et al.: "Synthesis of a New Type of Surface Modifying Macromolecules (nSMM) and Characterization and Testing of nSMM Blended Membranes for Membrane Distillation", 2006, Journal of Membrane Science, vol. 277, pp. 177-185; doi: 10.1016/j.memsci.2005.10.027.
Suk et al.: "Study on the Kinetics of Surface Migration of Surface Modifying Macromolecules in Membrane Preparation", Mar. 9, 2002, Macromolecules, vol. 35, No. 35, pp. 3017-3021, doi: 10.1021/ima011205a.
Matsuura: "Synthetic Membranes and Membrane Separation Processes", 1994, CRC Press, TP159-M4M39.
Mulder: "Basic Principles of Membrane Technology", 1996, Kluwer Academic Publishers, TP159-M4M85.
Xu et al.: "Polyethersulfone (PES) Hollow Fiber Ultrafiltration Membranes Prepared by PES/Non-Solvent/NMP Solution", 2004, Journal of Membrane Science, vol. 233, pp. 101-111, doi: 10.1016/j.memsci2004.01.005.
Rana et al.: "Development and Characterization of Novel Hydrophilic Surface Modifying Macromolecule for Polymeric Membranes", 2005, Journal of Membrane Science, vol. 249, pp. 103-112, doi: 10.1016/j. memsci.2004.09.034.
Rana et al.: "Novel Hydrophilic Surface Modifying Macromolecules for Polymeric Membranes: Polyurethane Ends Capped by Hydroxy Group", 2006, Journal of Membrane Science, vol. 282, pp. 205-216, doi: 10.1016/j.memsci.2006.05.024.
Khayet et al.: "Surface Modification of Membranes for the Separation of Volatile Organic Compounds from Water by Pervaporation", 2002, Desalination, vol. 148, pp. 31-37, doi:10.1016/S0011-9164(02)00649-5.
Martinez et al.: "Characterisation of three Hydrophobic Porous Membranes Used in Membrane Distillation Modelling and Evaluation of their Water Vapour Permeabilities", 2002, Journal of Membrane Science, vol. 203, pp. 15-27, doi:10.1016/S0376-7388(01)00719-0.
Barzin et al.: "Characterization of Polyethersulfone Hemodialysis Membrane by Ultrafiltration and Atomic Force Microscopy", 2004, Journal of Membrane Science, vol. 237, pp. 77-85, doi: 10.1016/j.memsci.2004.02.029.
Singh et al.: "Membrane Characterization by Solute Transport and Atomic Force Microscopy", 1998, Journal of Membrane Science, vol. 142, pp. 111-127, doi: 10.1016/S0376-7388(97)00329-3.
Qtaishat et al.: "Heat and Mass Transfer Analysis in Direct Contact Membrane Distillation", 2008, Desalination, vol. 219, pp. 272-292, doi: 10.1016/j.desal.2007.05.019.
Banat et al.: "Desalination by Vacuum Membrane Distillation: Sensitivity Analysis", 2003, Separation and Purification Technology, vol. 33, pp. 75-87, doi: 10.11016/S1383-5866(02)00221-6.
Khayet et al.: "Modelling Transport Mechanism Through a Porous Partition", 2001, Journal of Non-Equilibrium Thermodynamics., vol. 26, No. 1, pp. 1-14.
Schofield et al.: "Heat and Mass Transfer in Membrane Distillation", 1987, Journal of Membrane Science, vol. 33, pp. 299-313, doi:10.1016/S0376-7388(00)80287-2.
Khayet et al.: "Pervaporation and Vacuum Membrane Distillation Processes: Modeling and Experiments", Aug. 2004, American Institute of Chemical Engineers, vol. 50, No. 8, pp. 1697-1712.

(56) References Cited

OTHER PUBLICATIONS

Phattaranawik et al.: "Effect of Pore Size Distribution and Air Flux on Mass Transport in Direct Contact Membrane Distillation", 2003, Journal of Membrane Science, vol. 215, pp. 75-85, doi: 10.1016/S0376-7388(02)00603-8.

Martinez et al.: "On Transport Resistances in Direct Contact Membrane Distillation", 2007, Journal of Membrane Science, vol. 295, pp. 28-39, doi: 10.1016/j.memsci.2007.02.029, doi: 10.1016/j.memsci.2007.02.029.

Lagana et al.: "Direct Contact Membrane Distillation: Modelling and Concentration Experiments", 2000, Journal of Membrane Science, vol. 166, pp. 1-11, doi:10.1016/S0376-7388(99)00234-3.

Tomaszewska: "Preparation and Properties of Flat-Sheet Membranes From Poly(Vinylidene Fluoride) for Membrane Distillation", 1996, Desalination, vol. 104, pp. 1-11, doi:10.1016/0011-9164(96)00020-3.

Khayet, M.: "Membrane Surface Modification and Charaterization by X-ray Photoelectron Spectroscopy, Atomic Force Microscopy and Contact Angle Measurements", 2004, Applied Surface Science, vol. 238, pp. 269-272, doi: 10.1016/j.apsusc.2004.05.259.

Imdakm et al.: "A Monte Carlo Simulation Model for Membrane Distillation Processes: Direct Contact (MD)", 2004, Journal of Membrane Science, vol. 237, pp. 51-59, doi: 10.1016/j.memsci.2004.03.005.

Imdakm et al.: "Simulation of Heat and Mass Transfer in Direct Contact Membrane Distillation (MD): The Effect of Membrane Physical Properties", 2005, Journal of Membrane Science, vol. 262, pp. 117-128, doi: 10.1016/j.memsci.2005.05.026.

Khayet et al.: "Modelling Mass Transport Through a Porous Partition: Effect of Pore size Distribution", 2004, Journal of Non-Equilibrium Thermodynamics, vol. 29, No. 3, pp. 279-299, doi: 10.1515/JNETDY.2004.055.

Khayet et al.: "Morphological Study of Fluorinated Asymmetric Polyetherimide Ultrafiltration Membranes by Surface Modifying Macromolecules", 2003, Journal of Membrane Science, vol. 213, pp. 159-180.

Mengual et al.: "Membrane Distillation", 1997, Colloid & Interface Science, vol. 1, pp. 17-29.

* cited by examiner

PUP    PUDU

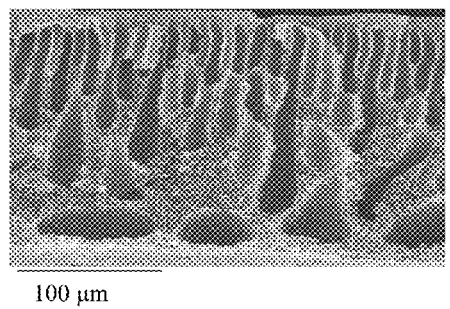
100 μm
FIG. 9A
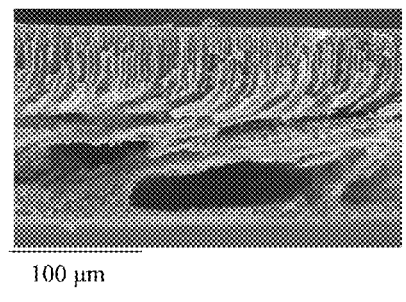
100 μm
FIG. 9B
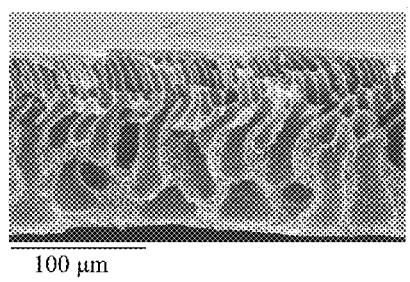
100 μm
FIG. 9C
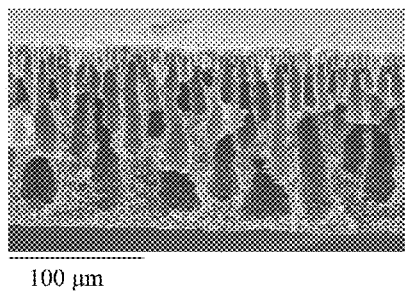
100 μm
FIG. 9D
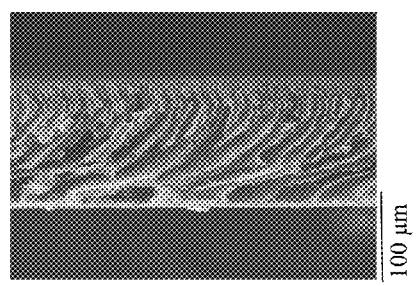
100 μm
FIG. 9E
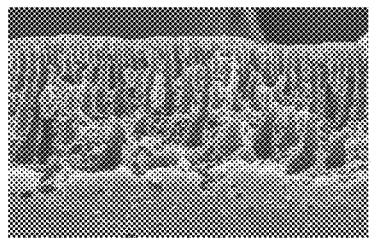
100 μm    FIG. 9F 100 μm 100 μm 100 μm

COMPOSITE MEMBRANES FOR MEMBRANE DISTILLATION AND RELATED METHODS OF MANUFACTURE

FIELD OF THE INVENTION

The present invention pertains to the field of membranes for membrane distillation. More particularly, the present invention pertains to the field of hydrophobic/hydrophilic composite membranes.

BACKGROUND

Membrane distillation (MD) is a thermally driven separation process that has been investigated widely for many applications including, but are not limited to, water desalination, food processing and removal of volatile organic compounds from water [1]. Many recent review articles have summarized research that has done in the field of MD [1-6].

The principle of MD is based on applying a thermal gradient between both sides of a porous hydrophobic membrane that acts as a physical support separating a hot feed solution from a cooling chamber containing either a liquid or a gas depending on the used MD configuration. For instance, in direct contact membrane distillation (DCMD), a cold liquid solution is allowed to flow through the permeate side of the membrane in order to condense the vapour that has migrated through the membrane pores from the hot feed solution. Other MD configurations can be used to recover and condense the migrated vapour molecules: vacuum membrane distillation (VMD), sweeping gas membrane distillation (SGMD) and air gap membrane distillation (AGMD) [1-6].

The main advantages of MD, compared to other desalination processes, are the high selectivity for non-volatile compounds (100% retention of ions, macromolecules, colloids, etc.). In addition, it provides the possibility of working at low temperatures, which allows coupling to low-grade, waste or alternative energy sources [7]. In spite of these obvious advantages, a MD process is not commercialized yet for large scale desalination plants. The reasons behind that are the relatively lower MD flux compared to the production of the well established commercialized desalination processes such as reverse osmosis and the membrane wetting which diminishes the durability of MD membranes. In other words, there is a lack of adequately designed MD membranes, which should have low conductive heat flux (i.e., low heat loss by conduction through the membrane matrix) and high mass flux in order to increase the membrane flux as well as small pore size to decrease the danger of membrane wetting.

The membranes that have been used in MD are, generally, porous membranes made of hydrophobic material such as polypropylene (PP), poly(vinylidene fluoride) (PVDF) and polytetrafluoroethylene (PTFE), available in capillary or flat-sheet forms, although these membranes were marketed for microfiltration and ultrafiltration processes [6].

Recently, in MD research, more attention has focused on preparing membranes specifically for the MD applications [7-19]. The objective of the research was either to increase membrane durability or improve permeation flux. For example, Peng et al. [7] prepared composite flat sheet MD membrane by casting a hydrophilic polymer on PVDF hydrophobic substrate. The membrane was tested by DCMD configuration and the results were compared to the PVDF uncoated substrate. The coated membrane durability was improved compared to the uncoated membrane; although the flux decreased by about 9% (a flux of 23.7 kg/m$^2$·h was achieved by the new membrane at feed and coolant temperatures of 70° C. and 12° C., respectively). Feng et al. [8] prepared asymmetric flat-sheet membranes from poly(vinylidene fluoride-co-tetrafluoroethylene) by the phase inversion method. Those membranes were tested by DCMD configuration and the results were compared to PVDF flat-sheet membranes prepared by the same procedure. Their new membranes exhibited higher flux than those of the PVDF membranes. They also prepared membranes from poly(vinylidene fluoride-co-hexafluoro propylene) [9] and found that the DCMD performance of these membranes was better than that of the PVDF membrane. Li and Sirkar [10] and Song et al. [11] designed novel hollow fiber membrane and device for desalination by VMD and DCMD. The membranes were commercial polypropylene (PP) membranes coated with plasma polymerized silicone fluoropolymer. Permeate fluxes as high as 71 kg/m$^2$·h at 85° C. feed temperature using VMD configuration were achieved. The same type of membranes was used for larger scale DCMD desalination device [12]. Bonyadi and Chung [13] used the co-extrusion method to prepare dual layer hydrophilic/hydrophobic hollow fiber membranes for MD. PVDF was used as a host polymer in the spinning dope, where hydrophobic and hydrophilic surfactants were added. A flux as high as 55 kg/m$^2$·h at inlet feed and permeate temperatures of 90° C. and 16.5° C., respectively, was achieved using DCMD configuration.

In series of publications [15-19], the requirements of higher flux MD membranes were clearly identified. As a result, the concept of hydrophobic/hydrophilic composite membranes for MD was first presented by Khayet et al. [15, 16]. It was shown that this type of membrane satisfies all the requirements of higher flux MD membranes [16, 17]. The hydrophobic/hydrophilic membrane was prepared by phase inversion method in a single casting step. A hydrophilic base polymer was blended with a hydrophobic surface modifying macromolecules (SMMs). During the casting step, the SMMs migrated to the air/polymer interface since they have lower surface energy [20]. Consequently, the membrane top-layer became hydrophobic while the bottom layer became hydrophilic.

There remains a need for high flux membranes for use in MD.

This background information is provided for the purpose of making known information believed by the applicant to be of possible relevance to the present invention. No admission is necessarily intended, nor should be construed, that any of the preceding information constitutes prior art against the present invention.

SUMMARY OF THE INVENTION

An object of the present invention is to provide composite membranes for membrane distillation and related methods of manufacture. In accordance with an aspect of the present invention, there is provided a composite hydrophilic/hydrophobic membrane comprising a hydrophilic polymer layer and a hydrophobic polymer layer comprising fluorinated surface-modifying macromolecules, wherein said composite membrane has a high vapour flux. The hydrophilic polymer layer comprises a polymer such as, but not limited to, polysulfone, polyether sulfone, polyetherimide polyvinylidenefluoride or cellulose acetate.

In accordance with another aspect of the present invention, there is provided a membrane distillation system comprising a composite hydrophilic/hydrophobic membrane comprising a hydrophilic polymer layer and a hydrophobic polymer layer comprising fluorinated surface-modifying macromolecules.

In accordance with another aspect of the present invention, there is provided a method of manufacturing a composite hydrophilic/hydrophobic membrane comprising a hydrophilic polymer layer and a hydrophobic polymer layer, said method comprising the steps of: (a) blending a host hydrophilic polymer with fluorinated surface-modifying macromolecules and a non-solvent additive in a solvent; (b) casting the polymer blend and allowing the solvent to evaporate at room temperature for a predetermined time; (c) immersing the cast film produced in step (b) in water to allow gellation, wherein, the method additionally comprises the steps of maximizing porosity of the top hydrophobic layer of the composite membrane and minimizing the thickness of the top hydrophobic layer of the composite membrane; and maximizing the thickness, the porosity and the thermal conductivity of the bottom hydrophilic layer.

In accordance with another aspect of the present invention, there is provided a method of optimizing the MD performance of a composite hydrophobic/hydrophilic membrane comprising a hydrophilic polymer layer and a hydrophobic polymer layer, said method comprising the steps of: maximizing porosity of the top hydrophobic layer of the composite membrane and minimizing the thickness of the hydrophobic layer of the composite membrane; and maximizing the thickness, the porosity and the thermal conductivity of the bottom hydrophilic layer.

BRIEF DESCRIPTION OF THE FIGURES

FIGS. 9A-9F show SEM photographs of the cross-section of SMM/PEI membranes: FIG. 9A M1; FIG. 9B M2; FIG. 9C M3; FIG. 9D M4; FIG. 9E M5; FIG. 9F M7.

FIG. 10A feed temperature effect on DCMD flux of distilled water feed solution; FIG. 10B water vapour flux of 0.5 M NaCl feed solution at $T_f$ of 65° C. and $T_p$ of 15° C.

FIG. 11A feed temperature effect on DCMD flux of distilled water feed solution.

FIG. 12A feed temperature effect on DCMD flux of distilled water feed solution; FIG. 12B water vapour flux of 0.5 M NaCl feed solution at $T_f$ of 65° C. and $T_p$ of 15° C.

FIG. 13A feed temperature effect on DCMD flux of distilled water feed solution; FIG. 13B water vapour flux of 0.5 M NaCl feed solution at $T_f$ of 65° C. and $T_p$ of 15° C.

FIG. 16A M1; FIG. 16B M2; FIG. 16C M3, FIG. 16D M4; FIG. 16E M5; FIG. 16F M6; FIG. 16G M7.

FIG. 17A mean temperature effect on DCMD flux of distilled water feed at stirring rate of 500 rpm; FIG. 17B water vapour flux of 0.5 M NaCl feed solution at $T_m$ of 45° C. and stirring rate of 500 rpm.

FIG. 18A mean temperature effect on DCMD flux of distilled water feed at stirring rate of 500 rpm; FIG. 18B water vapour flux of 0.5 M NaCl feed solution at $T_m$ of 45° C. and stirring rate.

FIG. 19A mean temperature effect on DCMD flux of distilled water feed at stirring rate of 500 rpm; FIG. 19.B water vapour flux of 0.5 M NaCl feed solution at $T_m$ of 45° C. and stirring rate of 500 rpm.

FIG. 20A mean temperature effect on DCMD flux of distilled water feed at stirring rate of 500 rpm; FIG. 20B water vapour flux of 0.5 M NaCl feed solution at $T_m$ of 45° C. and stirring rate of 500 rpm.

FIG. 21A M1; FIG. 21B M2.

FIG. 22A M1; FIG. 22B M2.

FIG. 24A mean temperature effect on DCMD flux of distilled water feed solution; FIG. 24B water vapour flux of 0.5 M NaCl feed solution at Tm of 45° C.

FIG. 25A M1; FIG. 25B M2; and FIG. 25C M3.

FIG. 26A feed temperature effect on DCMD flux of distilled water feed solution; FIG. 26B water vapour flux of 0.5 M NaCl feed solution at $T_f$ of 65° C. and $T_p$ of 15° C.

DETAILED DESCRIPTION OF THE INVENTION

Figure 1:
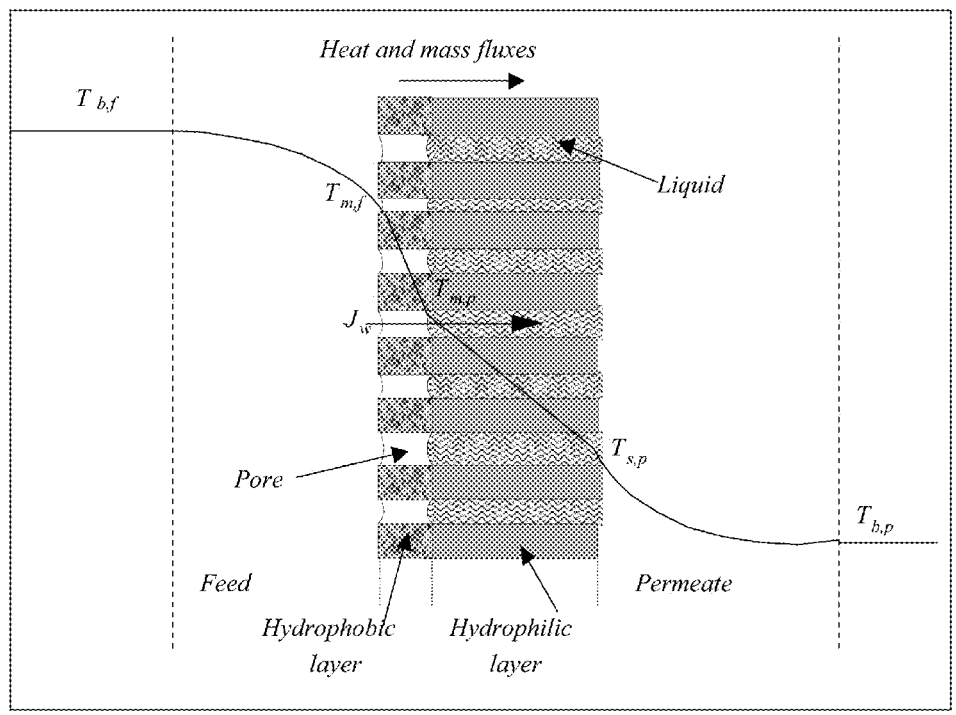
FIG. 1 is a schematic of the DCMD mechanism of transport through a porous composite hydrophobic/hydrophilic.

Unless defined otherwise, all technical and scientific terms used herein have the same meaning as commonly understood by one of ordinary skill in the art to which this invention belongs.

As used in the specification and claims, the singular forms "a", "an" and "the" include plural references unless the context clearly dictates otherwise.

The term "comprising" as used herein will be understood to mean that the list following is non-exhaustive and may or may not include any other additional suitable items, for example one or more further feature(s), component(s) and/or ingredient(s) as appropriate.

In general, membranes for use in MD should allow a high flow rate. Further, a good porous membrane should be highly permeable, have low thermal conductivity, high liquid entry pressure of water ($LEP_w$; which is the minimum pressure of water that must be applied onto pure water before water overcomes the hydrophobic forces of the membrane and penetrates into the membrane pores), in addition it should have good thermal stability and excellent chemical resistance to feed streams.

To provide the above characteristics, high flux membranes useful in MD should be designed to have a high hydrophobicity and relatively small pore sizes. However, while still being small, the membrane pores should be as large as possible in order to reduce barrier resistance. Further, the membranes should be as thin as possible, to minimize the barrier resistance to mass transfer, while being sufficiently thick to minimize temperature polarization by lowering the heat conductance of the membrane. The present invention provides high flux composite membranes that are useful in MD and are designed to balance these requirements.

As used herein, the term "flux" refers to the quantity of vapour crossing the hydrophobic layer of the composite membrane pores present in a given membrane area during a period of time. The term "high flux" or "high vapour flux", as used herein, refers to a flux of about 50 kg/m² h at 60° C. feed temperature, or higher.

Composite Membranes

The composite membranes of the present invention comprise a hydrophilic layer and a hydrophobic layer. The hydrophobic layer prevents or minimizes water penetration into its pores and is relatively thin, thereby minimizing resistance to mass transfer. The heat conductance of the composite membrane of the present invention can be reduced through the use of a relatively thick hydrophilic sublayer.

The composite membranes are prepared using fluorinated surface-modifying macromolecules (SMMs), which migrate to the air-film surface during membrane formation according to thermodynamic principles and form an amphipathic structure (hydrophobic/hydrophilic/hydrophobic). The SMMs used in the preparation of these membranes are oligomeric fluoropolymers synthesized using polyurethane chemistry and tailored with fluorinated end-groups. (See, for example, U.S. Pat. No. 5,954,966)

The hydrophilic bulk membrane phase is prepared using a polymeric material that can be blended with the SMMs. Suitable polymers include, but are not limited to, polysulfone, polyether sulfone, polyetherimide polyvinylidenfluoride and cellulose acetate.

Manufacture of Composite Membranes

In accordance with one embodiment of the present invention, the composite membranes of the present invention are manufacture using a phase inversion method in which a host hydrophilic polymer is blended with the SMMs in a single casting step. Alternative methods can be used to prepare the composite membranes, however, SMM surface migration is critical to preparation of the membranes of the present invention and the phase inversion method is the simplest and cheapest method currently known.

Phase inversion is a process in which a polymer is transformed from a liquid to a solid state. There are a number of methods to achieve phase inversion. Among others, the dry-wet phase inversion technique and the temperature induced phase separation (TIPS) are most commonly used in the industrial membrane manufacturing. The dry-wet phase inversion technique was applied by Loeb and Sourirajan in their development of the first cellulose acetate membrane for seawater desalination. Therefore, this method is often called the Loeb-Sourirajan method.

According to the Loeb-Sourirajan method, a polymer solution is prepared by mixing polymer, solvent and, optionally, a nonsolvent. The solution is then cast on a suitable surface by a doctor blade to a thickness of about 250 μm. After partial evaporation of the solvent, the cast film is immersed in a bath of nonsolvent medium, often called gelation medium. Due to a sequence of two desolvation steps, i.e., evaporation of solvent and solvent-nonsolvent exchange in the gelation bath, solidification of polymer film takes place. It is desirable to choose a solvent of strong dissolving power with high volatility. During the first step of desolvation by solvent evaporation, a thin skin layer of solid polymer is formed instantly at the top of the cast film due to the loss of solvent. In the solvent-nonsolvent exchange process that follows, nonsolvent diffuses into, while solvent diffuses out of, the polymer solution film through the thin solid layer.

At some point in the process, the content of solvent in the solution film becomes so low that the solvent no longer is able to hold polymer in one phase. Phase separation takes place at this point, forming droplets of one liquid phase dispersed in the other continuous liquid phase. The point of phase separation, and the size and the number of the dispersed droplets depend on the nature of solvent and nonsolvent and the polymer solution composition. The control of the number and the size of the droplets will eventually control the structure of the porous substrate.

The thin layer of solid polymer that forms during the first evaporation step becomes the top skin layer that will govern the selectivity and the flux of the membrane, while the porous structure that forms during the solvent-nonsolvent extraction step becomes the porous sublayer, providing the mechanical strength. Hence, the membrane obtained by the dry-wet phase inversion process is an integrally skinned asymmetric membrane. The top skin layer can also be made porous by lowering the polymer concentration in the casting solution and the solvent evaporation period. This is called hereafter porous skin layer. Ultrafiltration membranes have a porous skin layer. The asymmetric membranes can also be made in tubular form using a casting bob assembly and hollow fibers can be spun using a hollow fiber spinneret.

Optimization of the Composite Membranes

The present invention further provides a method of optimizing hydrophobic/hydrophilic composite membranes for MD. The method of optimization is useful in preparing membranes having a higher flux.

A criterion parameter ($f_i$) reflecting the hydrophobic top-layer and hydrophilic sub-layer morphology was identified. It has been found that the criterion parameter ($f_i$) should be lower than unity in order to improve the permeate flux by increasing the hydrophilic sub-layer thickness while the total membrane thickness is kept constant. Consequently, with $f_i$ less than 1, an increase in hydrophilic sub-layer thickness resulted in a dramatic increase in the calculated DCMD theoretical flux. Moreover, the theoretical flux increased with increasing both the hydrophobic and hydrophilic layers' porosities, but it was more pronounced for the hydrophobic top-layer porosity. Further, it was surprisingly found that the DCMD flux could be improved by an order of magnitude if the hydrophilic sub-layer's thermal conductivity was 26 W/m·K when assuming an infinite stirring rate at both thermal boundary layers.

Based on these findings, there is provided a method that makes use of the required characteristics of the hydrophobic/hydrophilic composite membranes to improve their performance in MD. In particular, it has now been found that the following three criteria can be used to optimize a composite membrane:

- the porosity of the top hydrophobic layer as well as the bottom hydrophilic layer should be as high as possible;
- the thickness of the top hydrophobic layer should be as low as possible; and
- the thermal conductivity of the bottom hydrophilic layer should be as high as possible.

As a result, a composite membrane can be prepared with characteristics for improved MD performance using a method comprising the steps of:

1. maximizing porosity of the top hydrophobic layer of the composite membrane;
2. minimizing the thickness of the top hydrophobic layer of the composite membrane; and
3. maximizing the thickness, the porosity and the thermal conductivity of the bottom hydrophilic layer.

Application of the Composite Membranes

The composite membranes of the present invention are particularly useful in membrane distillation.

Under different MD configurations, the proposed composite membranes can be used for seawater desalination, wastewater treatment, food processing, concentration of pharmaceutical products, Volatile organic compounds (VOCs) removal from water, ethanol/water separation etc.

To gain a better understanding of the invention described herein, the following examples are set forth. It should be understood that these examples are for illustrative purposes only. Therefore, they should not limit the scope of this invention in any way.

EXAMPLES

Example 1

Process for Optimizing Composite Membranes for Membrane Distillation

It is documented that 61% of MD studies included modeling as the basis for investigating the MD process performance [6]. Most MD publications have focused on modeling the DCMD process since it is the most suitable configuration for desalination, which is the most common application of MD. DCMD modeling can be split into two domains: i) heat and mass transfer analysis of the process and ii) the effect of membrane characteristics. The studies of the first domain focused, mainly, on predicting the permeate flux, heat and mass transfer coefficients, heat and mass resistances and temperature and concentration polarization coefficients [4, 32, 36-40 and 42]. The other studies are related to the second domain and focused on the investigation of the effect of membrane characteristics such as membrane thickness, porosity and pore size distribution on the membrane performance [9, 10, 13-17, 41 and 43-47].

Commercial microporous hydrophobic membranes, available in capillary or flat-sheet forms, have been used in most MD research. El-Bourawi et al. [6] summarized most of the commercial membranes commonly used in MD processes together with some of their characteristics. Those membranes were mainly made of polypropylene (PP), polyvinylidene fluoride (PVDF) and polytetrafluoroethylene (PTFE). It should be noted that all those commercial membranes were marketed for microfiltration or ultrafiltration purposes, but have been used in MD because of their hydrophobicity and adequate pore sizes. On the other hand, only a few authors have designed novel membranes and modules for MD [9, 10, 13-19, 44 and 45].

In recent publications [15-19 and 45], the use of hydrophobic/hydrophilic composite membranes for MD has been adopted. Higher flux MD membrane requirements were identified based on the physical understanding of the MD process. Consequently, a thin-hydrophobic/thick-hydrophilic membrane approach was developed and experimentally proven.

The concept of composite hydrophobic/hydrophilic membrane is based on better understanding of the requirements for high flux MD membranes. Briefly, the concept dictates that a thinner hydrophobic layer combined with a thick hydrophilic sub-layer will increase the flux since the mass transfer resistance will decrease. On the other hand, the temperature polarization effect will decrease because of the thick hydrophilic sub-layer [21].

The objective of the present Example was to study the hydrophobic/hydrophilic composite membrane performance from a theoretical view point, in order to develop an understanding of the hydrophobic/hydrophilic composite membrane concept, to assist in the design of high flux hydrophobic/hydrophilic membranes for desalination by DCMD. A mathematical model describing the effects of both the hydrophobic top-layer and the hydrophilic sub-layer characteristics on the DCMD process performance was developed. Four different surface modifying macromolecules (SMMs) blended polyetherimide (PEI) membranes and two commercial PTFE membranes were considered [16 and 17]. Based on the model and investigations, the characteristics of the hydrophobic top-layer and the hydrophilic sub-layer of the composite hydrophobic/hydrophilic membrane, required for enhancement of the DCMD water vapour flux, were identified.

Experimental Data

Two commercial polytetrafluoroethylene membranes supported by a polypropylene net, TF200 (pore size 0.22 µm; 0.8 porosity) and TF450 (pore size 0.45 µm; 0.8 porosity) supplied by Gelman Company and four laboratory made hydrophobic/hydrophilic composite membranes (M12, M15, M17 and M20 [16]) were used in this study. The details of membrane preparation procedure are available elsewhere [16]. Those membranes were named as M12, M15, M17 and M20 based on the variation of the polyetherimide (PEI, Ultem® 1000, General Electric Company) concentration in the casting solution from 12 to 20 wt. % maintaining the concentration of the surface modifying macromolecules (SMMs) at 2 wt. %.

All membranes used in the present study were characterized by the measurement of thickness, $\delta$, advancing contact angle, $\theta_a$, liquid entry pressure of water, $LEP_w$ and gas permeation test. The gas permeation data were used to obtain the mean pore diameter, $d_{p,t}$, the effective porosity of the hydrophobic top-layer, $\epsilon_t/L_p$ [16 and 17]. The other surface (i.e., the hydrophilic layer) was investigated using Atomic Force Microscopy (AFM), which allows the determination of data for the surface porosity of the porous hydrophilic sub-layer, $\epsilon_s$, and the roughness of both the top layer and sub-layer of the membranes. Details of the experimental procedures have been described previously [16 and 17].

Table 1 shows the membrane characterization results for both the commercial and the laboratory made membranes. These results are used in this study to discuss the effect of the hydrophobic/hydrophilic layers characteristics on the DCMD performance of the composite membranes.

TABLE 1

Membrane thickness (δ), advancing contact angle of the top surface ($\theta_a$), liquid entry pressure of water ($LEP_w$), mean pore size ($d_{p,t}$), effective porosity of the hydrophobic top-layer ($\epsilon_t/L_p$), surface porosity of hydrophobic top-layer ($\epsilon_t$), surface porosity of hydrophilic sub-layer ($\epsilon_s$), and mean roughness, $R_m$, of the SMM/PEI membranes (M12, M15, M17 and M20) and the commercial PTFE membranes (TF200, TF450).

| Membrane | PEI[a] (wt %) | δ (μm) | $\theta_a$ (°) | $LEP_w$ ($10^5$ Pa) | $d_{p,t}$[b] (nm) | $\epsilon_t/L_p$[b] ($m^{-1}$) | $\epsilon_t$[b] (%) | $\epsilon_s$[d] (%) | $R_m$[e] (nm) |
|---|---|---|---|---|---|---|---|---|---|
| M12 | 12 | 50.92 | Top: 97.7 Bottom: 85.3 | 3.41 | 22.86 | 3773.12 | 19.21 | 17.63 | Top: 42.9 Bottom: 73.8 |
| M15 | 15 | 52.21 | Top: 96.7 Bottom: 86.1 | 4.76 | 19.46 | 4141.08 | 21.62 | 16.31 | Top: 38.6 Bottom: 90.4 |
| M17 | 17 | 54.33 | Top: 97.5 Bottom: 85.9 | 5.13 | 15.51 | 4567.81 | 24.82 | 14.30 | Top: 31.2 Bottom: 66.2 |
| M20 | 20 | 51.75 | Top: 95.1 Bottom: 84.6 | 6.38 | 12.26 | 4155.94 | 21.51 | 15.22 | Top: 28.0 Bottom: 72.4 |
| TF200[c] | | 54.81 | Top: 113.6 | 2.76 | 198.96 | 7878.14 | 43.18 | 33.97 | — |
| TF450[c] | | 60.02 | Top: 118.3 | 1.49 | 418.82 | 7439.02 | 44.65 | 30.86 | — |

[a]Concentration of PEI in the solvent dimethylacetamide. In addition, 10 wt % of γ-butyrolactone and 2 wt % of SMM were added to prepare the casting solutions [21].
[b]$d_{p,t}$, $\epsilon_t/\tau_t$ and $\epsilon_t/L_p$ were determined from the gas permeation test [16]. $\tau_t$ is assumed to be unity.
[c]Measured total thickness: 165.2 μm for TF200 and 170.4 μm for TF450.
[d]$\epsilon_s$ was determined using atomic force microscopy (AFM) [17].
[e]Mean roughness parameter.

Theoretical Approach

The system studied consisted of a composite hydrophobic/hydrophilic membrane maintained between hot pure water, named hereafter the feed side, and cold pure water, the permeate side. The hydrophobic side of the membrane was brought into contact with the hot feed water, while the hydrophilic-layer of the membrane was maintained in contact with cold water which penetrated into the pores of the hydrophilic-layer. On the other hand, the pores of the hydrophobic-layer are maintained dry unless the applied transmembrane pressure exceeds the liquid entry pressure of water (LEPw) of the membrane. At this point, liquid/vapour interfaces are formed at both ends of the pores of the hydrophobic layer, as shown in FIG. 1.

The temperature drop established across the hydrophobic-layer creates a vapour pressure difference, which is the driving force in DCMD process. In this case, evaporation takes place at the hot feed side and after water vapour is transported through the pores of the hydrophobic-layer, condensation takes place at the vapour/liquid interface formed at the boundary between the hydrophobic and the hydrophilic layers.

In the system described above, both mass and heat transfers occur simultaneously across the membrane. Consequently, the temperatures at the membrane surfaces differ from those at the bulk liquid phases, leading to a decrease of the driving force and reduction of the DCMD flux (i.e. temperature polarization effect).

Heat Transfer

The following heat transfer flux is involved in the DCMD system as described previously:

Through the feed solution boundary layer:

$$Q_f = h_f(T_{b,f} - T_{m,f}) \quad (1)$$

Through the hydrophobic top layer:

$$Q_t = h_t(T_{m,f} - T_{m,p}) + J_w \Delta H_v \quad (2)$$

Through the hydrophilic sub-layer:

$$Q_s = h_s(T_{m,p} - T_{s,p}) \quad (3)$$

Through the permeate solution boundary layer:

$$Q_p = h_p(T_{s,p} - T_{b,p}) \quad (4)$$

At steady state, the overall heat transfer flux through the whole DCMD system, Q, is given by $$Q = Q_f = Q_t = Q_s = Q_p \quad (5)$$

In the above equations, h is the heat transfer coefficient, $J_w$ is the permeate flux, $\Delta H_v$ is the latent heat of vaporization and T is the absolute temperature. The subscripts specifying the location of the temperature, b, f, p, m and s refer to the bulk solution, feed, permeate, hydrophobic top-layer of the membrane and its hydrophilic sub-layer, respectively.

Therefore, from the above equations, the heat flux can be written as follows:

$$Q = \left( \frac{1}{h_f} + \frac{1}{h_t + \frac{J_w \Delta H_v}{T_{m,f} - T_{m,p}}} + \frac{1}{h_s} + \frac{1}{h_p} \right)^{-1} (T_{b,f} - T_{b,p}) \quad (6)$$

As a result the overall heat transfer coefficient (U) for the DCMD process may be written as:

$$U = \left( \frac{1}{h_f} + \frac{1}{h_t + \frac{J_w \Delta H_v}{T_{m,f} - T_{m,p}}} + \frac{1}{h_s} + \frac{1}{h_p} \right)^{-1} \quad (7)$$

The heat transfer coefficients, $h_f$ and $h_p$ can be estimated with the help of the known empirical correlations of the dimensionless numbers and the correction factor used to express the temperature dependence of the water viscosity.

$$Nu = aRe^b Pr^c \left(\frac{\mu_b}{\mu_m}\right)^d \quad (8)$$

Where Nu, Re, and Pr are Nusselt, Reynolds and Prandtl numbers, respectively; a, b, c and d are characteristics constants of the liquid flow regime; $\mu_b$ and $\mu_m$ are the water dynamic viscosity at the bulk and at the corresponding side of the membrane, respectively [16 and 17].

The heat transfer coefficient of the hydrophilic sub-layer, $h_s$, can be calculated from the thermal conductivities of the hydrophilic membrane polymer ($k_s$) and water in the pores ($k_w$).

$$h_s = \frac{k'_s}{\delta_s} = \frac{k_w \varepsilon_s + k_s(1-\varepsilon_s)}{\delta_s} \quad (9)$$

where $\delta_s$ and $\varepsilon_s$ are the thickness and porosity of the hydrophilic-layer of the composite membrane, respectively.

The heat transfer coefficient of the hydrophobic top-layer, $h_t$, can be calculated from the thermal conductivities of the hydrophobic membrane polymer ($k_t$) and the gas present inside the pores ($k_g$).

$$h_t = \frac{k'_t}{\delta_t} = \frac{k_g \varepsilon_t + k_t(1-\varepsilon_t)}{\delta_t} \quad (10)$$

where $\delta_t$ and $\varepsilon_t$ are the thickness and porosity of the hydrophobic top-layer of the composite membrane, respectively.

Mass Transfer

In DCMD process, the permeate flux of liquid water, $J_w$ can be related to the transmembrane liquid pressure as follows [6, 8, 11, 21, 25]:

$$J_w = B_m (p_{m,f} - p_{m,p}) \quad (11)$$

where $p_{m,f}$ and $p_{m,p}$ are the partial pressures of water at the feed and permeate calculated at the temperatures $T_{m,f}$ and $T_{m,p}$ respectively; and $B_m$ is the net DCMD membrane permeability.

The vapour pressures within the membrane are not directly measurable. Therefore, it would be more convenient to express Eq. (11) in terms of temperatures. For the small trans-membrane bulk temperature differences ($T_{b,f} - T_{b,p} \leq 10$ K) used in this study, the following expression can be used as indicated by Schofield et al. [6].

$$J_w = \frac{K'}{\delta_t}(T_{m,f} - T_{m,p}) \quad (12)$$

Where K' is defined as $$K' = B_m \delta_t \left(\frac{dp}{dT}\right)_{T_m} \quad (13)$$

where $T_m$ is the mean temperature, $(T_{b,f} + T_{b,p})/2$, and (dp/dT) can be evaluated from the Clausius-Clapeyron equation together with Antoine equation used to calculate the vapour pressure of water [1, 21].

$$\left(\frac{dp}{dT}\right)_{T_m} = \frac{\Delta H_v}{RT_m^2} \exp\left(23.238 - \frac{3841}{T_m - 45}\right) \quad (14)$$

Various types of mechanisms have been proposed for the vapours transport in DCMD: Knudsen mechanism, molecular diffusion mechanism, and/or the combination thereof [1]. The governing quantity that provides a guideline in determining which mechanism is operative under a given experimental condition is the Knudsen number, Kn, defined as the ratio of the mean free path ($\lambda$) of the transported molecules to the membrane pore size (i.e. $Kn = \lambda/d_{p,t}$).

Accordingly, the membrane permeability ($B_m$) can be evaluated depending on the flow mechanism as follows Knudsen mechanism $$B_m^K = \frac{2}{3} \frac{\varepsilon_t r_{p,t}}{\tau_t \delta_t} \left(\frac{8M}{\pi RT}\right)^{1/2} \quad (15)$$

where $\varepsilon_t$, $\tau_t$, $r_{p,t}$, $\delta_t$ are the porosity, pore tortuosity, pore size and thickness of the membrane hydrophobic-layer, respectively; M is the molecular weight of water, R is the gas constant and T is the absolute temperature.

Molecular diffusion mechanism $$B_m^D = \frac{\varepsilon_t}{\tau_t \delta_t} \frac{PD}{P_a} \frac{M}{RT} \quad (16)$$

where $P_a$ is the air pressure, P is the total pressure inside the pore which is assumed constant and equal to the sum of the partial pressures of air and water vapor, and D is the water diffusion coefficient. The value of PD (Pa m²/s) for water-air can be calculated from the following expression [8].

$$PD = 1.895 \cdot 10^{-5} T^{2.072} \quad (17)$$

Combined Knudsen/ordinary-diffusion mechanism $$B_m^C = \left[\frac{3}{2} \frac{\tau_t \delta_t}{\varepsilon_t r_{p,t}} \left(\frac{\pi RT}{8M}\right)^{1/2} + \frac{\tau_t \delta_t}{\varepsilon_t} \frac{P_a}{PD} \frac{RT}{M}\right]^{-1} \quad (18)$$

Mathematical Model Describing the Effect of the Hydrophobic/Hydrophilic Composite Membrane Characteristics on the Permeate Flux It is very important to develop a valid mathematical model for the hydrophobic/hydrophilic membrane for membrane distillation (MD), which will provide a guideline for the future development of highly efficient MD membranes. The model will allow us to optimize the different parameters that affect the performance of hydrophobic/hydrophilic membranes.

As a result of the performed heat transfer analysis, Eq. (2) can be rewritten as:

$$Q = Q_t = \left(\frac{k'_t}{\delta_t} + \frac{J_w \Delta H_v}{T_{m,f} - T_{m,p}}\right)(T_{m,f} - T_{m,p}) \quad (19)$$

Substituting Q in Eq. (19) with $U(T_{b,f} - T_{b,p})$ and rearranging:

$$T_{m,f} - T_{m,p} = \frac{U(T_{b,f} - T_{b,p})}{\frac{k'_t}{\delta_t} + \frac{J_w \Delta H_v}{T_{m,f} - T_{m,p}}} \quad (20)$$

Substituting the water vapour flux ($J_w$) in Eq. (20) with Eq. (12):

$$T_{m,f} - T_{m,p} = \frac{U(T_{b,f} - T_{b,p})}{\frac{k'_t}{\delta_t} + \frac{K' \Delta H_v}{\delta_t}} \quad (21)$$

Substituting $(T_{m,f} - T_{m,p})$ in Eq. (21) with Eq. (12) and rearranging, the water vapour flux can be expressed as:

$$J_w = \frac{K' U(T_{b,f} - T_{b,p})}{k'_t + K' \Delta H_v} \quad (22)$$

If infinite stirring rate is assumed at both feed and permeate solutions, the heat transfer coefficients of the boundary layers become infinity. When the overall heat transfer coefficient and vapour flux that correspond to the infinite heat transfer coefficients are given as $U_\infty$ and $J_w^\infty$, respectively, Eq. (7) becomes:

$$U_\infty = \left(\frac{1}{h_t + \frac{J_w^\infty \Delta H_v}{T_{b,f} - T_{b,p}}} + \frac{1}{h_s}\right)^{-1} \quad (23)$$

By substituting $h_s$, $h_t$ and $J_w$ in Eq. (23) with appropriate expressions:

$$U_\infty = \left(\frac{1}{\frac{k'_t}{\delta_t} + \frac{K' \Delta H_v}{\delta_t}} + \frac{1}{\frac{k'_s}{\delta_s}}\right)^{-1} \quad (24)$$

From Eqs. (22) and (24), the following equation can be obtained:

$$\frac{J_w^\infty}{T_{b,f} - T_{b,p}} = \frac{K' \left[\frac{1}{\frac{k'_t}{\delta_t} + \frac{K' \Delta H_v}{\delta_t}} + \frac{1}{\frac{k'_s}{\delta_s}}\right]^{-1}}{k'_t + K' \Delta H_v} \quad (25)$$

Further rearrangement of Eq. (25) yields, $$\frac{T_{b,f} - T_{b,p}}{J_w^\infty} = \frac{\delta_t}{K'} + \left[\frac{k'_t + K' \Delta H_v}{k'_s K'}\right] \delta_s \quad (26)$$

When a constant value of $\delta$ is assumed for the total thickness of the hydrophobic/hydrophilic composite membrane, $$\delta_t = \delta - \delta_s \quad (27)$$

Substituting $\delta_t$ of Eq. (26) with Eq. (27):

$$\frac{T_{b,f} - T_{b,p}}{J_w^\infty} = \frac{\delta}{K'} + \frac{\delta_s}{K'}\left[\frac{k'_t + K' \Delta H_v}{k'_s} - 1\right] \quad (28)$$

Further rearrangement of Eq. (28) yields:

$$J_w^\infty = \frac{K'(T_{b,f} - T_{b,p})}{\delta + \delta_s(f_i - 1)} \quad (29)$$

where $$f_i = \frac{k'_t + K' \Delta H_v}{k'_s} \quad (30)$$

Substituting $k'_t$, $k'_s$ and $K'$ in Eq. (30) with Eqs. (9), (10) and (13), respectively, one can obtain the following expression for $f_i$:

$$f_i = \frac{[k_g \varepsilon_t + k_t(1-\varepsilon_t)] + B_m \delta_t \left(\frac{dp}{dT}\right)_{T_m} \Delta H_v}{k_w \varepsilon_s + k_s(1-\varepsilon_s)} \quad (31)$$

Accordingly, $f_i$ reflects only the morphology of the hydrophobic top-layer and the hydrophilic sub-layer (i.e. $\varepsilon_t$, $r_{p,t}$, $\varepsilon_s$) and their thermal conductivities.

Result and Discussion

Theoretical Validation of the Hydrophobic/Hydrophilic Membrane Concept

Equation (29) shows that if the quantity $f_i$, given by Eq. (31), is smaller than 1, an increase in the hydrophilic sub-layer thickness, $\delta_s$, will enhance the DCMD flux through the composite hydrophobic/hydrophilic membrane, $J_w^\infty$. Otherwise, the DCMD flux will exhibit a decreasing trend when the hydrophilic sub-layer thickness is increased. Since $f_i$ is obviously a positive value, the criteria for the increase of $J_w^\infty$ with an increase of $\delta_s$ is, $$0 \leq f_i \leq 1 \quad (32)$$

This is not unexpected since having the quantity $f_i$ lower than one means an increase in either the hydrophilic sub-layer porosity or thermal conductivity and/or an increase in the hydrophobic top-layer porosity, which will eventually decrease the barrier resistance to the mass flux through the membrane.

It should be noted that the numerical value of $\delta_t$ has absolutely no effect on $f_i$ even though it appears in Eq. (31), since $\delta_t$ in Eq. (31) is cancelled by $\delta_t$ that appears in the denominator of $B_m$ according to Eqs. (15), (16) and (18). Moreover, the change of the hydrophobic material will have only little effect on $f_i$ because most of the hydrophobic polymers have similar thermal conductivities [26].

In order to validate the physical concept of hydrophobic/hydrophilic membrane by using the presented DCMD model equations, simulation was made for DCMD configuration using water as feed. The DCMD flux was calculated for different thicknesses of the hydrophilic sub-layer, $\delta_s$, while maintaining the total thickness $\delta=60$ μm. The DCMD operating conditions were assumed to be the same as those used in the earlier publication [6], 45° C. for the bulk feed temperature ($T_{b,f}$) and 35° C. for the bulk permeate temperature ($T_{b,p}$). In addition, infinite stirring rates were assumed on both the feed and permeate membrane sides. On the other hand, as it is indicated in [21], the permeate flux was measured at different stirring rates and extrapolation to an infinite stirring rate was carried out.

Table 2 shows all the necessary membrane parameters required for the calculation. The membrane characterization parameters such as the porosities ($\epsilon_t$) and ($\epsilon_s$) and the pore diameter ($d_{p,t}$) were obtained from gas permeation tests and atomic force microscopy as reported in [21]. It is found that both porosities and pore diameters are substantially larger for the commercial membranes. $k'_s$ values were calculated from Eq. (9), $k'_t$ value was set equal to 0.032 W/m·K as reported in earlier paper [21] and K' values were calculated by Eqs. (13) to (18). In addition to the above membrane characterization parameters the following numerical values were used for the calculation of $k'_t$, $k'_s$ and K'.

prevailing mechanism in the case of the commercial membranes. This was determined by evaluating Knudsen number (Kn). The mean free path, was estimated under the given operating conditions as 137.7 nm.

The calculated $f_i$ values that are also shown in Table 2 satisfy the condition given by Eq. (32) for both the laboratory made membranes and the commercial membranes.

Figure 2:
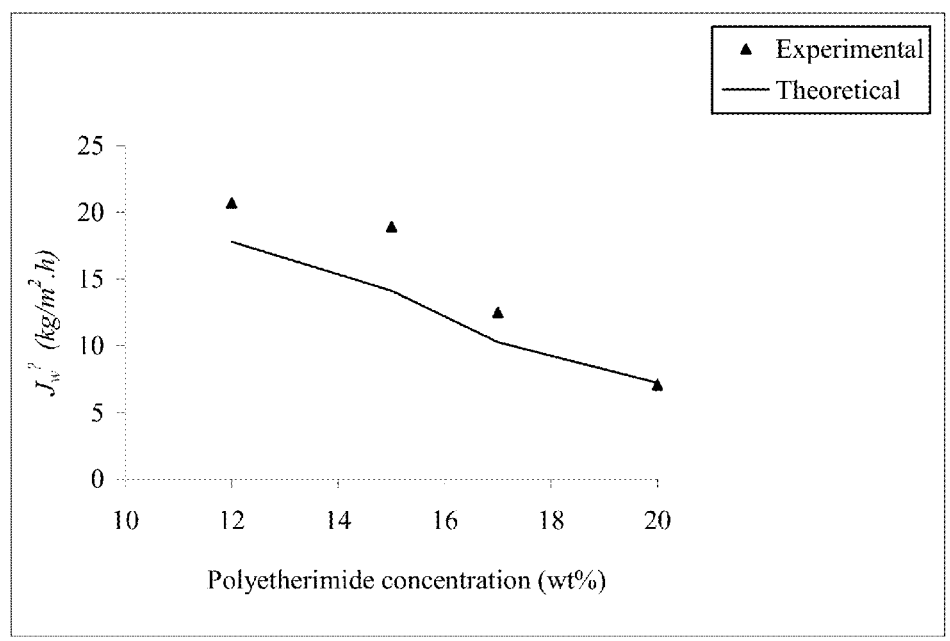
FIG. 2 shows the effect of polyetherimide concentration on both experimental and theoretical permeate flux at infinite stirring rate and bulk temperatures of 45 and 35° C.

The agreement of the model calculation by Eq. (29) with the experimental results was examined. The experimental values corresponding to the infinite stirring rate were obtained by extrapolation as mentioned earlier [21]. FIG. 2 shows the theoretical and experimental flux values for the different PEI concentrations. Agreement is reasonable, showing the validity of the model. The flux decreases as the PEI concentration increases due to the decrease in the average pore diameter ($d_{p,t}$).

Figure 3A:
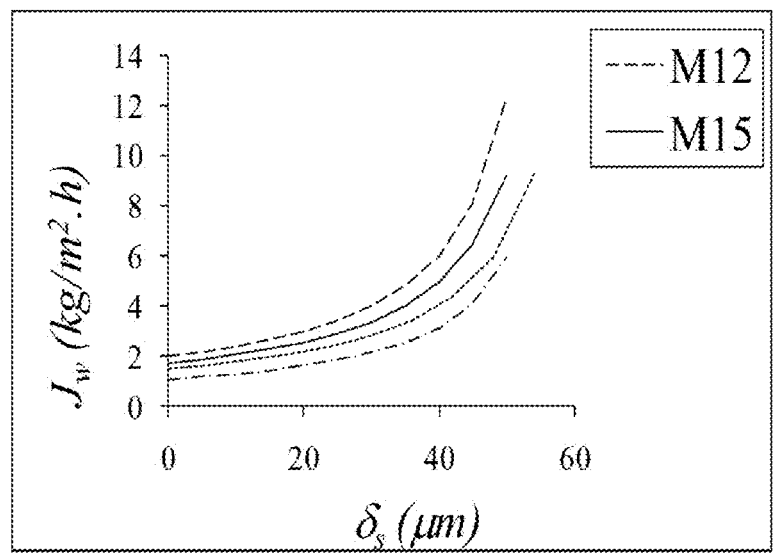
FIGS. 3A and 3B demonstrate the effect of increasing the hydrophilic sub-layer thickness on the DCMD flux of the hydrophobic/hydrophilic composite membrane FIG. 3A Laboratory made membranes, FIG. 3B Commercial membranes)
Figure 3B:
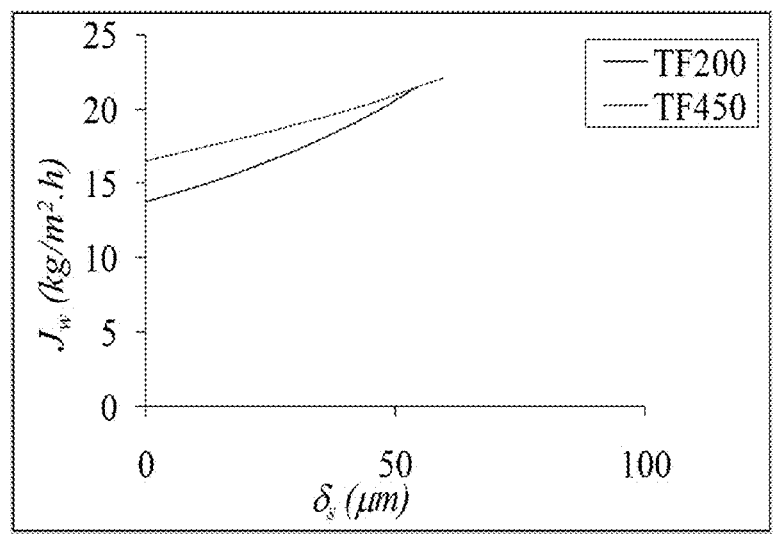

In FIGS. 3A and 3B it is noticed that the DCMD flux increases with an increase in the hydrophilic sub-layer thickness ($\delta_s$), or a decrease in the hydrophobic layer thickness ($\delta_t$). It can be also seen that the effect of $\delta_s$ on the DCMD flux ($J_w$) is stronger for the laboratory prepared membranes (M12-M20) than for the commercial membranes (TF200 and TF 450). This is because of the smaller $f_i$ values for the laboratory made membranes.

TABLE 2

Mass transfer mechanism and the estimated values of $k'_t$, $k'_s$, K' and the function $f_i$, for both the laboratory made membranes (M12, M15, M17 and M20) and the commercial membranes (TF200 and TF450).

| Membrane | PEI (wt %) | $k'_t{}^a$ (W/m · K) | $k'_s$ (W/m · K) | Kn | Mass Transfer Mechanism | K' ($10^{-9}$ kg/m · s · K) | $f_i$ |
|---|---|---|---|---|---|---|---|
| M12 | 12 | 0.032 | 0.218 | 6.02 | Knudsen Model | 2.82 | 0.176 |
| M15 | 15 | 0.032 | 0.211 | 7.08 | Knudsen Model | 2.52 | 0.179 |
| M17 | 17 | 0.032 | 0.201 | 8.88 | Knudsen Model | 2.30 | 0.185 |
| M20 | 20 | 0.032 | 0.2056 | 11.23 | Knudsen Model | 1.58 | 0.173 |
| TF200 | | 0.1432 | 0.29907 | 0.69 | Transition Region Model | 20.97 | 0.637 |
| TF450 | | 0.15 | 0.2835 | 0.33 | Transition Region Model | 27.6 | 0.749 |

$^a$Values for M12 to M20 were taken from Khayet et al. [17].

The value 2405.55 kJ/kg was used for the latent heat of vaporization ($\Delta H_v$), 0.0269 W/m·K was used for the gas thermal conductivity ($k_g$), 0.626 W/m·K was used for the water thermal conductivity ($k_w$), 0.25 W/m·K was used for the SMMs thermal conductivity ($k_t$), which was considered to be equal to the thermal conductivity of PTFE. The thermal conductivity ($k_s$) of PEI and PP was 0.1297 W/m·K and 0.135 W/m·K, respectively.

It should be noted that $k'_s$ values are higher for the commercial membranes than for the laboratory made membranes. This is because of the larger porosity of the commercial membranes. It must be pointed out that K' values are an order of magnitude higher for the commercial membranes. This is because of the smaller pore diameters and lower porosities of the hydrophobic SMM layers of the laboratory membranes compared to the commercial membranes.

Table 2 also shows that the mass transfer of water vapour through the pores of the hydrophobic top-layer is governed by the Knudsen mechanism for the laboratory-made membranes. On the other hand, the transition mechanism is the Discussion on the Improvement of the Laboratory Made Membranes 1. Hydrophobic Layer Porosity Increase in the hydrophobic layer porosity will obviously have a positive effect on the DCMD flux for the following two reasons.

a)—It will increase the coefficient $B_m$ according to Eqs. (15), (16) and (17) and consequently K' in Eq. (29).

b)—$k'_t$ will decrease according to Eq. (10) because of the low value of $k_g$ compared to $k_t$. However, this effect is currently ignored because of the very low value of $k'_t$, which is 0.032 W/m K as stated earlier.

To know the effect of the porosity of the hydrophobic top-layer, calculation was made by increasing the hydrophobic layer porosity from 0.2 to 0.6 while the other parameters were maintained constant as follows: $d_{p,t}=17.53$ nm; $\epsilon_s=0.1587$, $\delta=52.3$ μm and $\delta_s=47.07$ μm (i.e. 90% of the total composite membrane thickness as stated elsewhere [22]).

Figure 4:
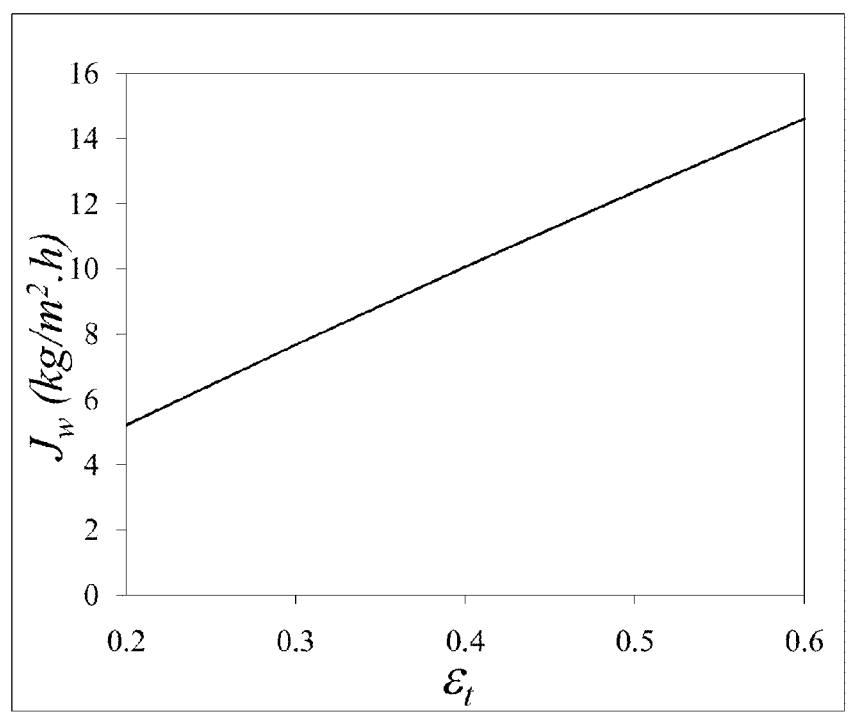
FIG. 4 graphically depicts the effect of the hydrophobic top-layer porosity, $\epsilon_f$, on the DCMD flux of the hydrophobic/hydrophilic membranes.

It should be noted that $d_{p,t}$ and $\epsilon_s$ are the average of the four laboratory made membranes (SMMs blended PEI membranes). The results of the calculation are given in FIG. 4. As it is shown, the DCMD flux increases as the porosity of the top hydrophobic layer increases. The DCMD flux was tripled when the hydrophobic top layer porosity was increased from 0.2 to 0.6. Therefore, this should be incorporated in the design of novel high flux DCMD membranes.

Physically, the increase of the hydrophobic top-layer porosity will increase the permeate flux because of two reasons: (i) the air entrapped within the membrane pores has lower thermal conductivity than the polymeric material of the membrane and (ii) the available surface area for evaporation is increased.

2. Hydrophilic Layer Porosity

Increase of the hydrophilic sub-layer porosity will cause an increase in DCMD flux since $k'_s$ will increase according to Eq. (9) because of the higher value of $k_w$ than $k_s$. This will decrease the $f_i$ value as indicated by Eq. (30) leading to an increase of the DCMD flux. The calculation was made by increasing the hydrophilic sub-layer porosity from 0.1 to 0.6 while the other parameters were maintained constant as follows: $d_{p,t}$=17.53 nm, $\epsilon_t$=0.2197, $\delta$=52.3 μm and $\delta_s$=47.07 μm.

It should be noted that the values of $d_{p,t}$ and $\epsilon_t$ are the average values of the laboratory prepared membranes. The results of the calculation are given in FIG. 5.

Figure 5:
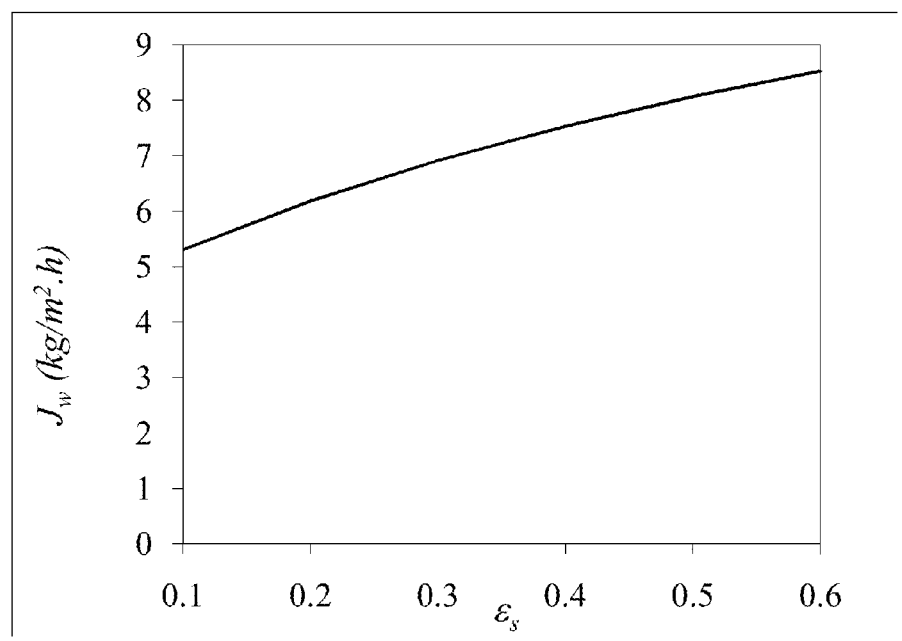
FIG. 5 graphically depicts the effect of hydrophilic sub-layer porosity, $\epsilon_s$, on the DCMD flux of the hydrophobic/hydrophilic membranes.

As expected, FIG. 5 shows the increase of the DCMD flux with the increase of the hydrophilic sub-layer porosity, $\epsilon_s$. More specifically, increasing the hydrophilic sub-layer porosity from 0.1 to 0.6 causes a DCMD flux increase by 60%. Therefore, this should also be considered in the composite hydrophobic/hydrophilic membrane design.

It must be pointed out that the DCMD flux through the composite hydrophobic/hydrophilic membranes is more sensitive to the increase of the hydrophobic top-layer porosity than the increase of the hydrophilic sub-layer porosity.

3. Thermal Conductivity of the Hydrophilic Sub-Layer

The increase of the thermal conductivity of the hydrophilic sub-layer material (PEI in the present study, $k_s$) will increase the thermal conductivity of the whole hydrophilic layer ($k'_s$) as stated in Eq. (9). This will decrease $f_i$ (see Eq. (30)) and increase the DCMD flux as may be expected from Eq. (29).

Figure 6:
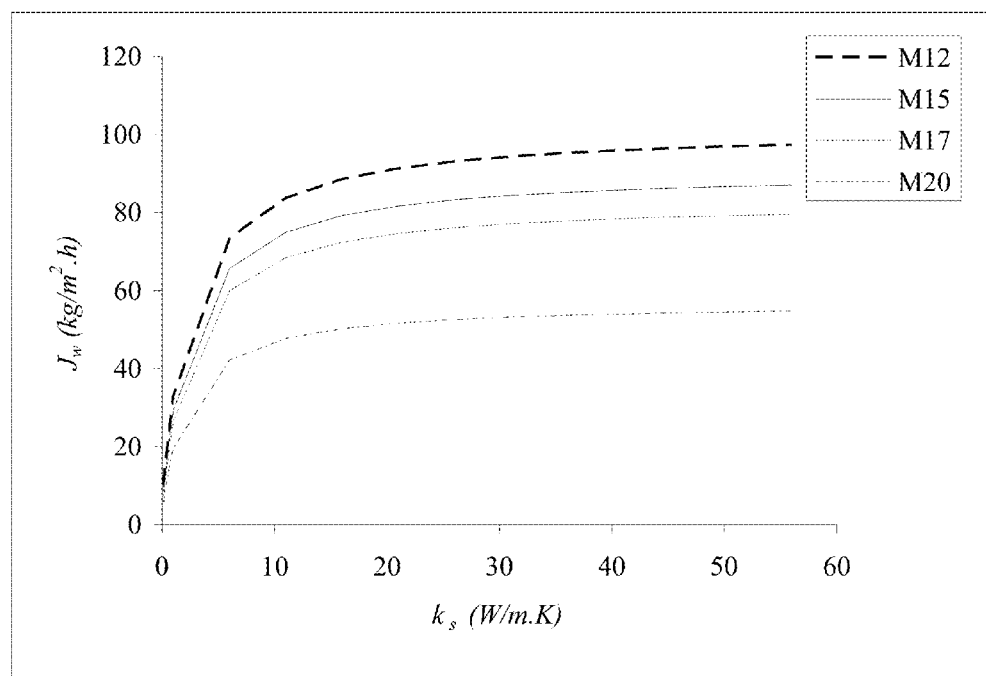
FIG. 6 graphically depicts the effect of the thermal conductivity of the hydrophilic sub-layer, $k_s$, on the DCMD flux of the composite hydrophobic/hydrophilic membranes.

The theoretical calculation was made considering the laboratory made membranes (M12, M15, M17 and M20). The results of the calculation are shown in FIG. 6. As expected, the DCMD flux increases considerably with an increase in $k_s$, approaching an asymptotic value for each membrane. This is due to the fact that the thermal conductivity of the hydrophilic sub-layer, $k_s$, results in a dramatic decrease of the $f_i$ value. If one can decrease this value ($f_i$) until it approaches zero the permeate flux will be many times larger than any known MD flux.

FIG. 6 also shows that the DCMD flux may approach 90 kg/m2·h at the given operating conditions, when the hydrophilic/hydrophobic membrane is properly designed and the temperature polarization can be removed. A hydrophilic sub-layer thermal conductivity of 26 W/m K is enough to achieve the maximum attainable flux.

From FIG. 6, it can be concluded that the hydrophilic sub-layer thermal conductivity should be as high as possible. The reason is that the temperature gradient across the hydrophobic layer (in FIG. 1) becomes steeper with an increase in the thermal conductivity of the hydrophilic layer, as a result, the temperature polarization defined as indicated in Eq. (33) also increases.

$$TPC = \frac{T_{m,f} - T_{m,p}}{T_{b,f} - T_{b,p}} \tag{33}$$

It is worth mentioning that the thermal conductivity of polymers does not reach the desired value. It is recommended to choose material that has a thermal conductivity far greater than those of polymers.

4. Stirring Rate Effect on the Optimal Thermal Conductivity

Finite heat transfer coefficients would be closer to reality of practical applications. For this case, combination of Eqs. (7), (22) and (30) yields:

$$J_w = \frac{K'(T_{b,f} - T_{b,p})}{\delta + \delta_s(f_i - 1) + (k'_t + K'\Delta H_v)\left(\frac{1}{h_f} + \frac{1}{h_p}\right)} \tag{34}$$

Where $h_f$ and $h_p$ are the heat transfer coefficients of the boundary layers on the feed and permeate side, respectively. Further assuming $h_f$=$h_p$=h, Eq. (34) is rewritten as:

$$J_w = \frac{K'(T_{b,f} - T_{b,p})}{\delta + \delta_s(f_i - 1) + (k'_t + K'\Delta H_v)\frac{2}{h}} \tag{35}$$

Figure 7:
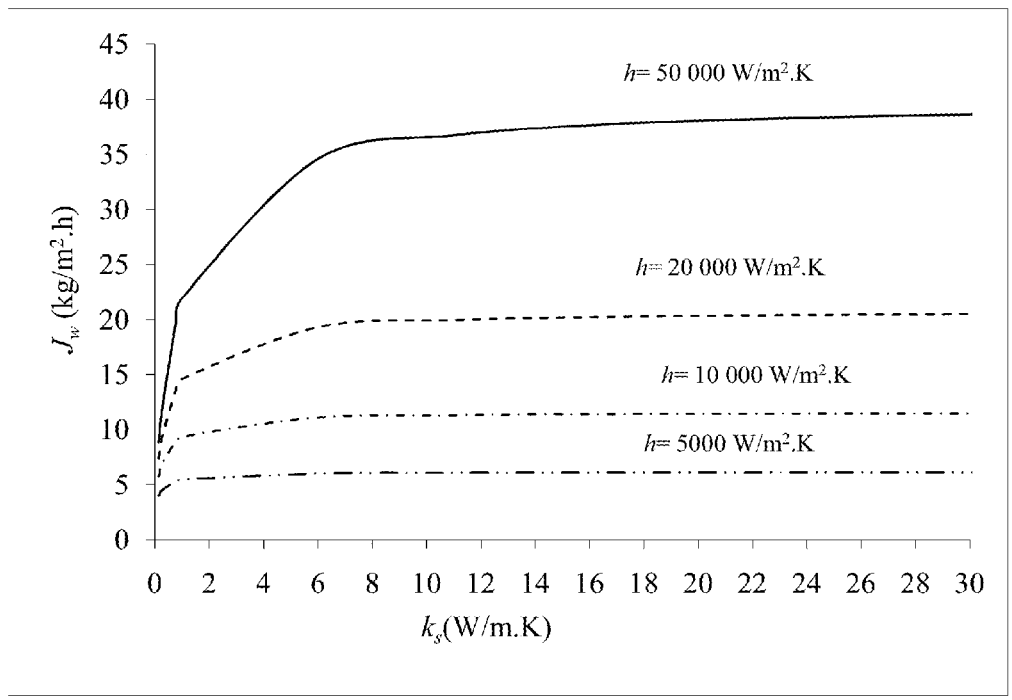
FIG. 7 graphically depicts the effect of the thermal conductivity of the hydrophilic sub-layer on the DCMD flux of the composite hydrophobic/hydrophilic membranes at different boundary layers' heat transfer coefficients.

Simulation was conducted for various heat transfer coefficients ranging from 5000 to 50 000 W/m²·K, while maintaining all other parameters the same as those used in section 4.2.3. Membrane M12 was specifically chosen for the simulation. The results are shown in FIG. 7. It is obvious that the simulated flux values are far lower than those achieved for infinite heat transfer coefficient, although the flux increases as heat conductivity ($k_s$) increases. The effect of the increasing $k_s$ value becomes more pronounced as h increases. For example an increase of $k_s$ from 0.13 to 26 W/m·K improved the permeate flux by 53.2% and 334.1% for the h value of 5 000 W/m²·K and 50 000 W/m²·K, respectively. Another observation that can be obtained from FIG. 7 is that the flux value levels off more quickly, meaning at the lower $k_s$ value, as the heat transfer coefficient decreases.

Conclusions

As set out above a new set of mathematical equations were derived to describe the performance of hydrophobic/hydrophilic composite membranes. A parameter $f_i$ reflecting the morphology of the hydrophobic top-layer and the hydrophilic sub-layer (i.e. the surface porosity, $\epsilon_t$, and the mean pore radius, $r_{p,t}$, of the hydrophobic top-layer, and the surface porosity of the hydrophilic sub-layer, $\epsilon_s$) has been defined. It has been shown that the parameter $f_i$ should be lower than unity in order to increase the MD flux when the hydrophillic sub-layer thickness is decreased. Otherwise, it will lead to a decrease in the MD flux. Simulation using the proposed mathematical model showed that the increase in the porosities of both hydrophobic top-layer and hydrophilic sub-layer will increase the MD flux. Moreover, the increase of the thermal conductivity of the hydrophilic sub-layer will increase the MD flux reaching asymptotic values at about 26 W/m·K of the hydrophilic-layer thermal conductivity.

Nomenclature

Symbols a Characteristic constant for empirical correlation (Eq. 8)
$B_m$ net DCMD permeability (kg m$^{-2}$ s$^{-1}$ Pa$^{-1}$)
$d_{p,t}$ mean pore size of the hydrophobic top-layer (nm)

D water diffusion coefficient ($m^2 s^{-1}$)
$f_i$ factor defined in Eq. (30)
h heat transfer coefficient ($W m^{-2} K^{-1}$)
$J_w$ DCMD flux ($kg m^{-2} h^{-1}$)
$J_w^\infty$ DCMD flux at infinite stirring rate ($kg m^{-2} h^{-1}$)
k thermal conductivity ($W m^{-1} K^{-1}$)
$k'_t$ top-layer thermal conductivity ($W m^{-1} K^{-1}$)
$k'_s$ sub-layer thermal conductivity ($W m^{-1} K^{-1}$)
K' membrane permeability ($kg m^{-1} s^{-1} K^{-1}$)
Kn Knudsen number
$LEP_w$ liquid entry pressure of water (Pa)
M molecular weight of water ($kg kmol^{-1}$)
Nu Nusselt number
p Partial vapour pressure of water (Pa)
P total pressure (Pa)
$P_a$ air pressure (Pa)
Pr Prandtl number
Q heat flux ($W m^{-2}$)
T absolute temperature (K)
$T_m$ absolute mean temperature (K)
$r_{p,t}$ mean pore radius of the hydrophobic top-layer (nm)
R gas constant ($J mol^{-1} K^{-1}$)
Re Reynolds number
U Overall heat transfer coefficient ($W m^{-2} K^{-1}$)
$U_\infty$ Overall heat transfer coefficient at infinite stirring rate ($W m^{-2} K^{-1}$)
Greek Letters
δ total membrane thickness (μm)
$δ_s$ hydrophilic sub-layer thickness (μm)
$δ_t$ hydrophobic top-layer thickness (μm)
ε porosity (%)
ε/τ effective porosity (%)
λ mean free path (nm)
μ water dynamic viscosity ($kg m^{-1} s^{-1}$)
θ water contact angle (°)
τ pore tortuosity
$ΔH_v$ latent heat of vaporization (kJ/kg)
Subscripts
a advancing contact angle
b bulk
f feed
g gas
m membrane
m,f hydrophobic surface of the membrane at the feed side
m,p interface hydrophobic/hydrophilic of the membrane
p pore
s hydrophilic sub-layer
s,p hydrophobic surface of the membrane at the permeate side
t hydrophobic top-layer
w water
Superscripts
b Characteristic constant for empirical correlation (Eq. 8)
c Characteristic constant for empirical correlation (Eq. 8)
d Characteristic constant for empirical correlation (Eq. 8)
K Knudsen
D molecular-diffusion
C combined Knudsen/ordinary-diffusion Example 2

Preparation and Characterization of Hydrophobic/Hydrophilic Polyetherimide Composite Membranes for Desalination by Direct Contact Membrane Distillation The objective of this Example is to identify and discuss the effects of hydrophobic/hydrophilic membrane preparation conditions on the membrane morphology and desalination DCMD performance of these membranes. The membrane performance was related to the membrane morphology as well as to the membrane preparation factors such as, SMMs type, SMMs concentration, evaporation time and solvent type. Two different types of SMMs were synthesized and characterized. Polyetherimide (PEI) was used as the host hydrophilic polymer. Different membranes were prepared and characterized using the gas permeation test, the measurement of the liquid entry pressure of water ($LEP_w$), the scanning electron microscopy (SEM), the contact angle (CA) and the X-ray photoelectron spectroscopy (XPS) analysis. Finally, all the membranes were tested by DCMD with feed distilled water and 0.5 M NaCl solution. The results were compared to those of the commercial PTFE membrane (FGLP 1425, Millipore Corporation USA). The prepared membranes seem promising for practical application in desalination by DCMD.

Experimental

Material

All chemicals used in this work and their chemical abstract service (CAS) number are enlisted in Table 3. The weight average molecular weight ($M_w$) of the polyetherimide (PEI) is 15 kDa and its glass transition temperature ($T_g$) is 216.8° C. The commercial membrane used is polytetrafluoroethylene, PTFE, (FGLP 1425) having a porosity of 0.70 and a nominal pore size of 0.25 μm supplied by the Millipore Corporation, Billerica, Mass., USA.

TABLE 3

Materials Employed in this Example.

| Material description | CAS number | Source |
| --- | --- | --- |
| 4,4'-Methylene bis(phenyl isocyanate) (MDI, 98%) | 101-68-8 | Sigma-Aldrich, Inc., St. Louis, MO, USA |
| Poly(propylene glycol) (PPG, typical $M_n$ 425 Dalton) | 25322-69-4 | Aldrich Chemical Company Inc., Milwaukee, WI, USA |
| α,ω-Aminopropyl poly(dimethyl siloxane) (PDMS) of average molecular weight 900 | 106214-84-0 | Shin-Etsu Chemical Co. Ltd., Tokyo, Japan |
| Zonyl fluorotelomer intermediate, 2-(Perfluoroalkyl)ethanol, (FAE, BA-L of average $M_n$ 443 and 70 wt % fluorine | 678-39-7 | DuPont product supplied by Aldrich Chemical Company, Inc., Milwaukee, WI, USA |
| N,N-Dimethylacetamide (DMAc, anhydrous 99.8%) | 127-19-5 | Sigma-Aldrich, Inc., St. Louis, MO, USA |
| 1-Methyl-2-pyrrolidinone (NMP, anhydrous 99.5%) | 112-14-1 | Sigma-Aldrich, Inc., St. Louis, MO, USA |

TABLE 3-continued

Materials Employed in this Example.

| Material description | CAS number | Source |
|---|---|---|
| γ-Butyrolactone (GBL, 99+%) | 96-48-0 | Aldrich Chemical Company, Inc., Milwaukee, WI, USA |
| Tetrahydrofuran (THF, HPLC grade 99.9%) | 109-99-9 | Aldrich Chemical Company, Inc., Milwaukee, WI, USA |
| Polyetherimide (PEI, Ultem 1000, Natural Pallet) Specific gravity: 1.27 | 61128-46-9 | General Electric Co., Pittsfield, MA, USA |

SMMs Synthesis

Figure 8:
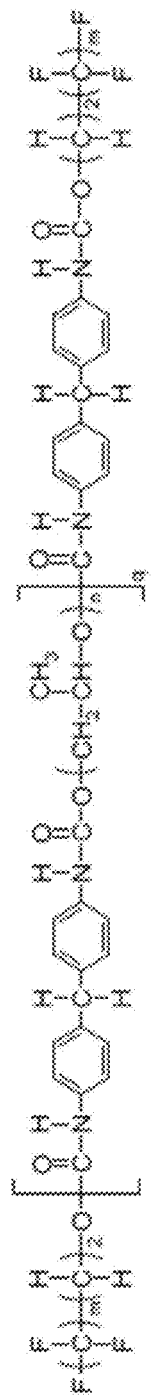
FIG. 8 depicts the chemical structures of two prepared surface modifying macromolecules.
Figure 8:
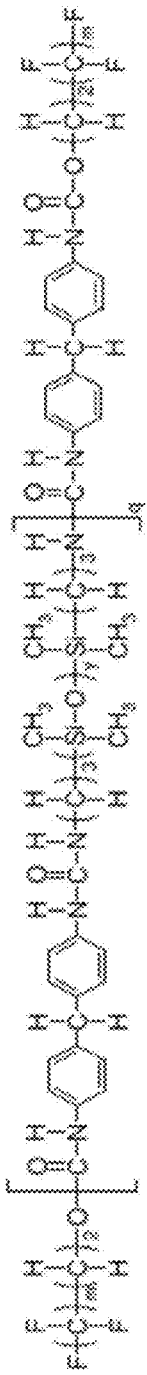

The SMMs were synthesized using a two-step solution polymerization method [22 and 23]. The solvent N,N-dimethylacetamide (DMAc) was distilled at about 25° C. under a pressure of 133.3 Pa (1.0 Torr). Methylene bis(p-phenyl isocyanate) (diphenylmethane diisocyanate, MDI) was also distilled at 150° C. under 66.7 Pa (0.5 Torr). Polypropylene glycol (PPG), α,ω-aminopropyl poly(dimethyl siloxane) (PDMS) and 2-(perfluoroalkyl)ethanol (FAE) were degassed for 24 h under 66.7 Pa. The first polymerization step was conducted in a solution with a predetermined composition to form polyurethane for the reaction of MDI with PPG or polyurea for the reaction of MDI with PDMS as a pre-polymer. In the second polymerization step, the pre-polymer was end-capped by the addition of FAE, resulting in a solution of SMM. The composition of SMMs are: MDI:PPG:FAE=3:2:2 or MDI:PDMS:FAE=3:2:2. The prepared SMMs are named hereafter as PUP and PUDU based on their chemical structure, which is shown in FIG. 8 (i.e., poly(urethane propylene glycol), PUP and poly(urea dimethylsiloxane urethane), PUDU, both ends capped by FAE.

SMMs Characterization

The elemental analysis of fluorine content in the two prepared SMMs was carried out using standard method in ASTM D3761. An accurate weight (10-50 mg) of sample was placed into oxygen flask bomb combustion (Oxygen Bomb calorimeter, Gallenkamp). After pyro-hydrolysis, the fluorine (ion) was measured by an ion chromatography (Ion Chromatograph, Dionex DX1000).

The glass transition temperature ($T_g$) was examined by differential scanning calorimeter (DSC) equipped with universal analysis 2000 program (DSC Q1000, TA Instruments, New Castle, Del.). About 10 mg of polymer was crimped into aluminum pan. The SMMs were annealed at 280° C. for 10 min, then quenched to −50° C. and scanned at a heating rate of 10° C./min. The $T_g$ value was recorded at the midpoint of the corresponding heat capacity transition.

The weight average molecular weight ($M_w$) and the number average molecular weight ($M_n$) of the synthesized SMMs were measured by gel permeation chromatography (GPC) using Waters Associates GPC chromatograph equipped with Waters 410 refractive index detector. Three Waters UltraStyragel™ packed columns were installed in series. The tetrahydrofuran (THF) was filtered and used at 40° C. and a flow rate of 0.3 ml/min. First, the calibration of the system was performed using polystyrene (Shodex, Tokyo, Japan) standards with different molecular weights between $1.3 \times 10^3$ and $3.15 \times 10^6$ g/mol. The standards and SMM samples were prepared in a THF aqueous solution (0.2 w/v %) and filtered prior to injection through 0.45 μm filter to remove high molecular weight components. Millenium 32 software (Waters) was used for data acquisition.

Membrane Preparation

SMM modified PEI membranes were prepared in a single casting step by the phase inversion method [25, 27 and 36]. α-Butyrolactone (GBL) was used as a non-solvent additive. A predetermined amount of PEI was dissolved in a DMAc/GBL or a NMP/GBL mixture. The PEI concentration in the casting solution was maintained at 12 wt %, while the amount of GBL was maintained at 10 wt %. Two different types of SMMs, PUP and PUDU, were added to the PEI solution in different concentrations in a range of 0.5-2 wt %. The resulting mixtures were stirred in an orbital shaker at room temperature for at least 48 h. Prior to their use, all the resulting polymer solutions were filtered through a 0.5 μm Teflon® filter and degassed at room temperature. The polymer solutions were cast on a smooth glass plate to a thickness of 0.30 mm using a casting rod at room temperature. The solvent was then evaporated at ambient temperature for a predetermined period before the cast films together with the glass plates were immersed for 1 h in distilled water at room temperature. During gelation, it was observed that the membranes peeled off from the glass plate spontaneously. All the membranes were then dried at ambient conditions for 3 days. Table 4 shows the prepared membranes, their materials of construction and preparation conditions.

TABLE 4

Membrane preparation details: Casting solution composition and preparation conditions

| ‡Membrane code | SMM type | Solvent | SMM concentration (wt %) | Evaporation time (min) |
|---|---|---|---|---|
| M0 | — | NMP | 0 | 0 |
| M1 | PUP | NMP | 1.5 | 0 |
| M2 | PUDU | NMP | 1.5 | 0 |
| M3 | PUP | NMP | 1.0 | 0 |
| M4 | PUP | NMP | 2.0 | 0 |
| M5 | PUDU | DMAc | 1.5 | 0 |
| M6 | PUDU | NMP | 1.5 | 2 |
| M7 | PUDU | NMP | 1.5 | 4 |

‡PEI concentration: 12 wt %; GBL concentration: 10 wt %; solvent: 78 wt %; gelation bath temperature: 20° C.

Membrane Characterization

1. Measurement of Gas Permeation Test and Liquid Entry Pressure of Water ($LEP_w$)

Figure 14:
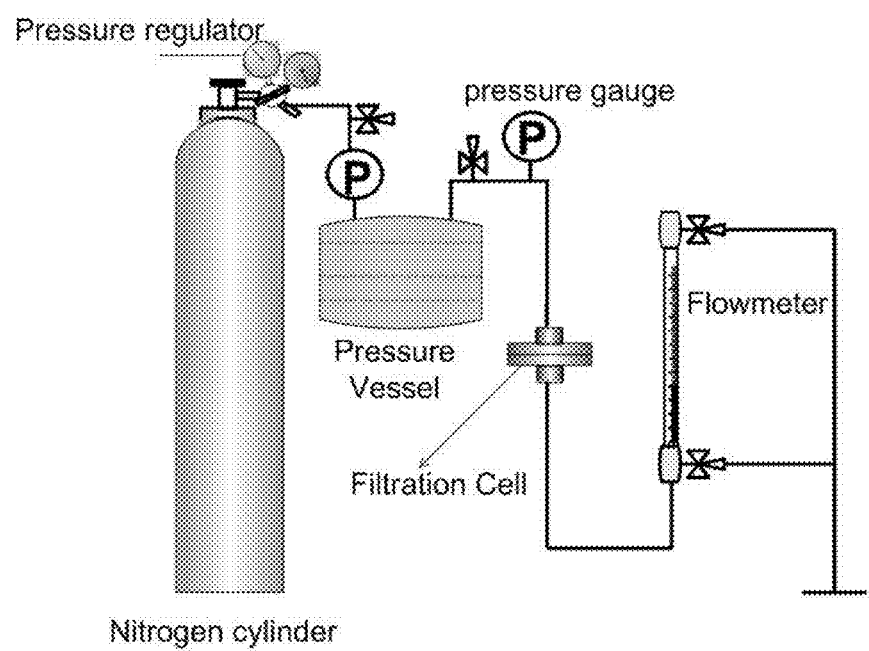
FIG. 14 is a schematic diagram of the gas permeation and liquid entry pressure of water tests setup.

Measurement of liquid entry pressure of water ($LEP_w$) and the gas permeation test were carried out for the prepared surface modified PEI membranes. The gas permeation test was performed prior to the measurement of $LEP_w$. FIG. 14 shows a schematic diagram of the testing setup. The effective area of the membrane was 9.6 cm². First, the equipment was made ready for the gas permeation test by filling the pressure vessel with nitrogen at a pressure of 5 bars. Then the stainless steel membrane holder inlet valve was opened and the inlet nitrogen pressure was controlled by the help of the pressure gauge. The flux of the nitrogen flowing from the bottom of the membrane was measured by air flow meter.

In the present study, the permeation flux of nitrogen through each dry membrane was measured at various transmembrane pressures, in the range of 10-100 kPa. In general, the gas permeance, B, for a porous medium contains both a diffusive term and a viscous term, the contribution of which depends on the applied pressure as reported by Carman [24]:

$$B = \frac{4}{3}\left(\frac{2}{\pi MRT}\right)^{0.5}\frac{r\varepsilon}{L_p} + \frac{P_m}{8\mu RT}\frac{r^2\varepsilon}{L_p} \quad (34)$$

where R is the gas constant, T is the absolute temperature, M is the molecular weight of the gas, $\mu$ is the gas viscosity, $P_m$ is the mean pressure within the membrane pore, r is the membrane pore radius, $\varepsilon$ is the porosity, and $L_p$ is the effective pore length.

Throughout all the conducted gas permeation experiments, it was noticed that the gas permeance was independent of pressure, which means that the gas permeance is independent of $P_m$. Therefore, diffusive mechanism seems to dominate the gas transport through the membrane pores revealing the fact that the prepared membranes in this study have small pore sizes. Accordingly, the gas permeance will be described after omitting the viscous term of Eq. (34) as [16 and 17]:

$$B = \frac{4}{3}\left(\frac{2}{\pi MRT}\right)^{0.5}\frac{r\varepsilon}{L_p} \quad (35)$$

This test was therefore useful in evaluating the pore size/effective porosity ratio ($r\varepsilon/L_p$). Some of the gas permeation experiments were duplicated using different membrane sheets made from the same casting solution batch in order to evaluate the variance of the obtained value from batch to batch. Moreover, for each membrane, the measurement of the gas flow rate was made three times at a given gas pressure and the obtained values were averaged to obtain the membrane permeance value.

The equipment was then made ready for the measurement of the LEPw; the pressure vessel was filled with 2 L of water. Then, pressure was applied from the nitrogen cylinder on water. The pressure was increased by 0.1 bar each time until the water penetrated through the membrane and left the filtration cell. As soon as the water started to flow, pressure was recorded and this was considered as the liquid entry pressure of water (LEPw) for that membrane. The experiment was done three times using three different sheets made from the casting solution batches. The results were averaged to obtain the LEPw.

2. Scanning Electron Microscopy (SEM)

The cross-section of the SMMs blended PEI membranes was analyzed by scanning electron microscopy, SEM, (JSM-6400 JEOL, Japan). The membranes were cut into pieces (3 mm width and 10 mm length) and subsequently immersed in liquid nitrogen reservoir for 5 s. While keeping the pieces in the liquid nitrogen, those were broken into two pieces by pulling from both ends. One of the broken pieces was mounted on metal plate with carbon paste and gold-coated prior to use. The cross-section of the membranes at the broken parts was finally examined by SEM.

3. X-Ray Photoelectron Spectroscopy (XPS)

The elemental composition at the surface of each SMM blended membrane was determined by X-ray photoelectron spectroscopy (XPS, Kratos Axis HS X-ray photoelectron spectrometer, Manchester, UK). Each membrane was cut into samples of 1 cm² from random positions of the membrane. Monochromatized Al $K_\alpha$ X-radiation was used for excitation and a 180° hemispherical analyzer with a three channel detector was employed. The X-ray gun was operated at 15 kV and 20 mA. The pressure in the analyzer chamber was $1.33\times10^{-4}$ to $1.33\times10^{-5}$ Pa. The size of the analyzed area was about 1 mm². All the membrane samples were analyzed for fluorine content at both top and bottom sides.

4. Measurement of Contact Angle (CA)

The contact angle (CA) of the SMMs blended membranes was measured to study their hydro-phobicity/-philicity. The CA measurements were executed using the VCA-Optima (AST products, Inc., MA, USA). Samples of 4 cm² area (2×2 cm) at random positions were prepared from each membrane. The samples were then placed on the glass sample plate and fixed with scotch tape. The equipment syringe filled with distilled water was installed to stand vertically. Two microliters of water were deposited on the membrane surface. The CA was measured at five different spots on each membrane sample for both top and bottom surfaces.

DCMD Experiments

The prepared SMMs blended PEI membranes were tested by the DCMD setup shown in a previous study [36]. The performance of each membrane was compared to that of the commercial PTFE membrane in terms of water vapour flux and NaCl separation factor. The membrane modules are a system of three circular stainless steel cells each composed of two cylindrical chambers. Each cell has an O-ring to prevent water leakage, one inlet and one outlet at the feed side and one inlet and one outlet at the permeate side, respectively. The diameter of each cell is approximately 10 cm, which results in a total effective area (of three cells), of 235.6 cm². Each cell has two supportive compartments with a thickness of 2.5 to 3 cm. The feed chamber is connected to a heating system through its jacket to control the temperature of the liquid feed. The permeate chamber is connected to a cooling system to control the temperature of the permeate side stream. The membranes were placed between the two chambers (feed side and permeate side). The feed and permeate flow rate were held constant at 2 l/min for each cell (the total flow rate was 6 l/min) The inlet and outlet temperatures of both the feed and permeate solutions were measured, after steady state was reached, using thermocouples connected to a digital meter with an accuracy of ±0.05° C. The MD module cells together with all tubes were insulated to prevent heat loss. The permeate flux was measured by monitoring the water level in both the feed and permeate cylindrical graduated containers. The loss in the amount of water in the feed container should be equal to the gain in the amount of water in the permeate container when there is no leakage of water in the DCMD setup.

Different sets of DCMD experiments were carried using as a feed distilled water and 0.5 M NaCl aqueous solution. When distilled water was used as feed, the feed temperature was varied from 35 to 65° C., while the permeate temperature was maintained at 11-15° C. When 0.5 M NaCl solution was used as feed, the feed temperature was 65° C. and the permeate temperature was 15° C.

Results and Discussion

Characterization of SMMs and SMMs Blended PEI Membranes

The values of $T_g$, $M_w$ and $M_n$ for the SMMs (PUP and PUDU) are given in Table 3. The precise $T_g$ value could not be obtained for the PUDU as the sample was heated up to 280° C. due to the limitation of higher temperature of the equipment. According to the SMMs chemical composition presented in FIG. 8, the value of m, number of repeat unit of $CF_2$, was calculated from the molecular weight of 2-(perfluoroalkyl)ethanol (FAE) to be 7.58. The values of the n, number of repeat unit of propylene glycol, and y, number of repeat unit of dimethylsiloxane, were calculated from the average molecular weight of PPG and of PDMS to be 7.02 and 9.81, respectively. The value of q, number of repeat unit of urethane or urea was calculated from the weight averaged molecular weight of each SMM to be 50.60 and 22.58 for PUP and PUDU, respectively.

| SMM type | F (wt %) | $T_g$ (° C.) | $M_w$ ($W^4$ g/mol) | $M_n$ ($10^4$ g/mol) |
|---|---|---|---|---|
| PUP | 11.45 | 19.35 | 3.61 | 1.09 |
| PUDU | 11.75 | >280 | 2.71 | 1.28 |

The contact angle (CA) data of all membranes are shown in Table 6. It was observed that the CA of the top side of the prepared membranes was higher than that of the bottom side. The higher CA of the membrane M2 compared to that of the membrane M1 prepared under the same conditions except the SMMs type indicates that the hydrophobicity of the SMMs PUDU is greater than that of PUP. As expected from the SMMs concentrations, the CA of the blended membranes using PUP follows the order: M4>M1>M3. These results were observed for other SMMs membranes prepared with other host polymers [13 and 31].

TABLE 6

Top and bottom contact angles (CA) of the prepared membranes.

| Membrane | CA (θ°) |
|---|---|
| M0 | Top: 80.04 ± 4.55 |
|    | Bottom: 72.83 ± 2.62 |
| M1 | Top: 89.31 ± 3.91 |
|    | Bottom: 78.69 ± 2.80 |
| M2 | Top: 91.93 ± 0.52 |
|    | Bottom: 67.76 ± 3.29 |
| M3 | Top: 88.36 ± 2.59 |
|    | Bottom: 64.99 ± 4.43 |
| M4 | Top: 96.28 ± 2.72 |
|    | Bottom: 80.03 ± 4.45 |
| M5 | Top: 100.6 ± 3.18 |
|    | Bottom: 74.4 ± 4.17 |
| M6 | Top: 104 ± 4.57 |
|    | Bottom: 80.4 ± 4.30 |
| M7 | Top: 121.2 ± 3.21 |
|    | Bottom: 78.1 ± 4.04 |

With an increase in solvent evaporation time, the CA of the membranes follows the order: M7>M6>M5, which is also expected since the SMMs migrate more with the increased evaporation time. This result was also observed previously for other SMMs blended membranes [13, 25, 45 and 50].

The results of the XPS analysis for both PEI and SMMs blended PEI membranes are presented in Table 7. Fluorine was not detected in the PEI membrane. This is expected since fluorine is associated to SMMs. For all the SMMs blended PEI membranes, fluorine contents of the top side membranes were found to be higher than those of the bottom side indicating SMMs migration towards the top-layer of the membranes. For the same SMMs concentration, the PUDU blended PEI membrane (M2) exhibits more fluorine than the PUP blended PEI membrane (M1). This is related to the fluorine concentration, which is higher for PUDU compared to PUP, as indicated in Table 5. It must be pointed out here that when the PUP concentration was varied in the PEI polymer casting solution, the CA of the corresponding membranes (M3, M1 and M2) together with the fluorine content increased with increasing the SMM concentration as shown in Tables 6 and 7, respectively. This result was also observed previously for other SMMs blended membranes [13, 25, 45 and 50].

TABLE 7

XPS results of some of the prepared membranes for both top and bottom sides.

| Membrane | F (mass conc., %) |
|---|---|
| M0 | Top: 0.00 |
|    | Bottom: 0.00 |
| M1 | Top: 23.70 |
|    | Bottom: 0.21 |
| M2 | Top: 28.93 |
|    | Bottom: 7.68 |
| M3 | Top: 9.16 |
|    | Bottom: 2.05 |
| M4 | Top: 27.17 |
|    | Bottom: 7.07 |

The SEM images of the membranes cross-section are shown in FIGS. 9A-9F. As can be seen, all the membranes are of asymmetric structure with finger-like structure at the top surface, whereas the structure of the bottom surface varies depending on the SMMs type, SMMs concentration, solvent type and solvent evaporation time.

The data for the $LEP_W$ and ($r\epsilon/L_p$) are summarized in Table 8. This data is discussed below together with the DCMD data.

TABLE 8

Liquid entry pressure of water ($LEP_w$) and product of average pore size and effective porosity per unit effective pore length ($\epsilon r/L_p$) of the laboratory prepared membranes.

| Membrane | $LEP_w$ (bar) | $\epsilon r/L_p$ |
|---|---|---|
| M1 | 3.7 | 7.09 $10^{-5}$ |
| M2 | 4.0 | 1.53 $10^{-5}$ |
| M3 | 5.2 | 5.48 $10^{-7}$ |
| M4 | 4.9 | 6.03 $10^{-6}$ |
| M5 | 5.1 | 1.10 $10^{-6}$ |
| M6 | 4.7 | 3.84 $10^{-6}$ |
| M7 | 5.5 | 4.20 $10^{-7}$ |

Membrane Performance
1. SMMs Type Effect

Figure 10A:
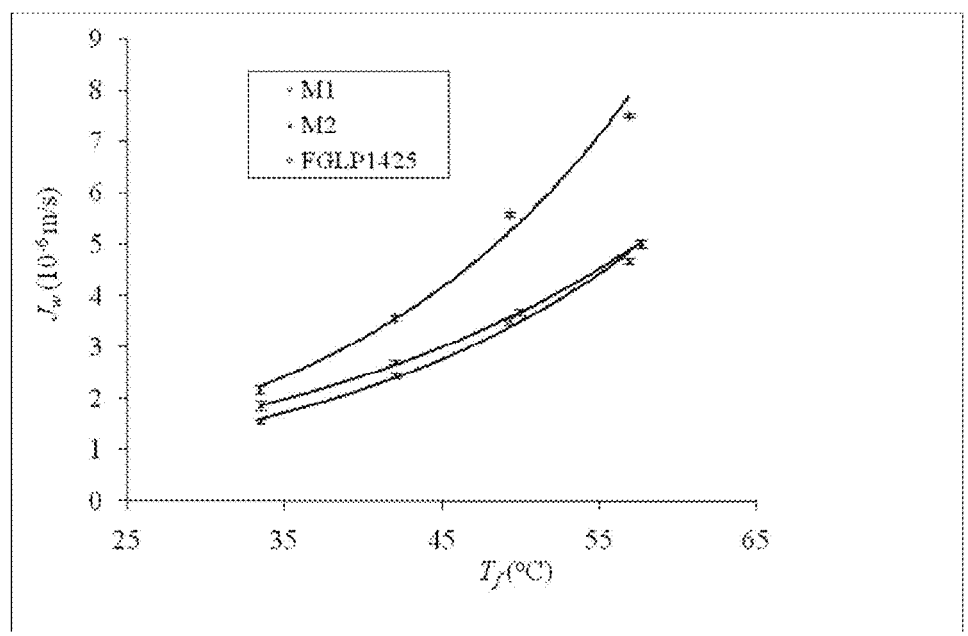
FIGS. 10A and 10B graphically depict the effect of SMM type on SMM/PEI membrane performance in DCMD.
Figure 10B:
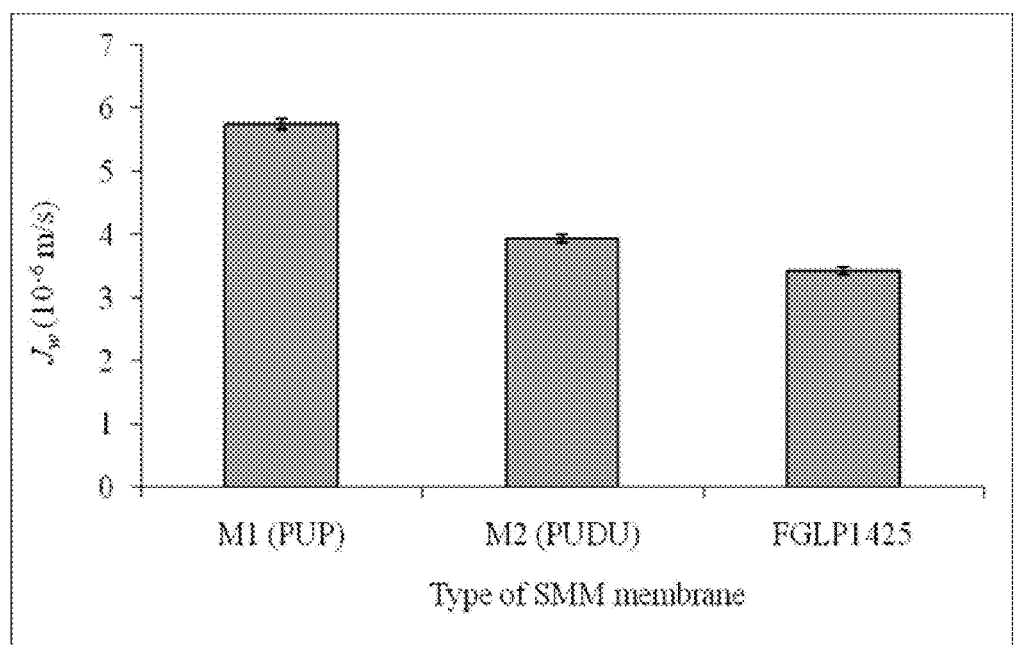

M1 (PUP) and M2 (PUDU) membranes were chosen to compare the SMM type effects on the morphology and DCMD performance (see Table 4 for membrane preparation conditions). FIGS. 10A and 10B show the DCMD fluxes of the above membranes along with those of the commercial membrane (FGLP 1425). FIG. 10A shows the DCMD flux versus feed inlet temperature when distilled water was used as feed. FIG. 10B shows the DCMD flux of the same membranes when using 0.5M NaCl aqueous solution as feed. As can be observed, both the commercial membrane and the SMMs blended PEI membranes exhibit an exponential increase of the DCMD flux with an increase in the feed inlet temperature. Both FIGS. 10A and 10B show that the order in the DCMD flux is M1>M2>FGLP 1425. The prepared SMMs blended PEI membranes showed higher permeate fluxes than the commercial membrane, and the PUP blended membrane (M1) is superior to PUDU blended PEI membranes for DCMD application. In particular, the DCMD flux of the membrane M1 was found to be 55% higher than that of the commercial membrane.

The permeate flux when using NaCl aqueous solution as feed was 25 to 30% lower than that obtained when distilled water was used as feed, reflecting the lower vapour pressure of the salt solution. Another reason for the decrease in the DCMD flux is the concentration polarization due to the presence of NaCl solute in the feed membrane side [16]. Referring to the experiments with salt solution, the solute separation factor is defined as:

$$\alpha = \left(1 - \frac{C_p}{C_f}\right) 100 \tag{36}$$

where $C_p$ and $C_f$ are the NaCl concentration in the permeate and in the bulk feed solution, respectively. It was observed that $\alpha$ was above 99% for the three tested membranes. This indicates that the SMMs blended membranes M1 and M2 are promising MD membranes as reported in previous studies [16-18]. On the other hand, the membrane M0, prepared without blending SMMs, did not show any salt rejection capacity, indicating that SMMs blending is essential for preparing MD membranes.

According to Table 6 and 7 the CA and fluorine content are both higher for M2 membrane surface than M1 membrane surface. Therefore, M2 membrane is more hydrophobic than M1 membrane. Moreover, Table 8 shows that M1 membrane's $LEP_W$ value is smaller than that of the membrane M2, indicating that either M1 membrane is more hydrophilic and/or M1 membrane has a larger maximum pore size than M2 membrane, according to the Laplace equation [24]. Both cases can be applied since M1 membrane is more hydrophilic and has larger value of the ratio ($\epsilon r/L_p$) than the membrane M2. It can be therefore concluded that the membrane exhibiting higher ratio ($\epsilon r/L_p$) will have higher DCMD flux. This is not unexpected since an increase in the ratio ($\epsilon/L_p$) means an increase in either the porosity and/or pore radius or a decrease in effective pore length. Considering that the value of the ratio ($\epsilon r/L_p$) was obtained from the gas permeation experiments, a parallel relationship was found between the gas transport and vapour transport.

SEM pictures of the cross-section of the two different SMM/PEI membranes are presented in FIG. 9A and FIG. 9B. Both images show an asymmetric membrane structure with a dense top-layer supported by a finger-like structure underneath. However, the bottom parts of both membranes are quite different. The finger-like structure of the membrane M2 (FIG. 9B) reached the bottom side, where it formed large and fully developed macro-voids. On the other hand, at the bottom of the M1 membrane (FIG. 9A) a sponge like structure was formed together with large macro-voids. The higher permeate flux of membranes exhibiting sponge-like structure than that of membranes having finger-like structure was documented [20]. Therefore higher flux of sponge-like M1 membrane than finger-like M2 membrane seems natural. However, this interpretation is ignoring the contribution of the top skin layer to the DCMD mass transport. In fact, it is the skin layer that is controlling the overall membrane transport. While not wishing to be bound by theory, it is thought that the porous sub-layer only provides mechanical support. The above observation (of the relationship between the structure of the sub-layer and the DCMD flux) suggests that the porous sub-layer also is contributing to the membrane transport as liquid water penetrates inside its void-space.

2. SMMs Concentration Effect

Figure 11A:
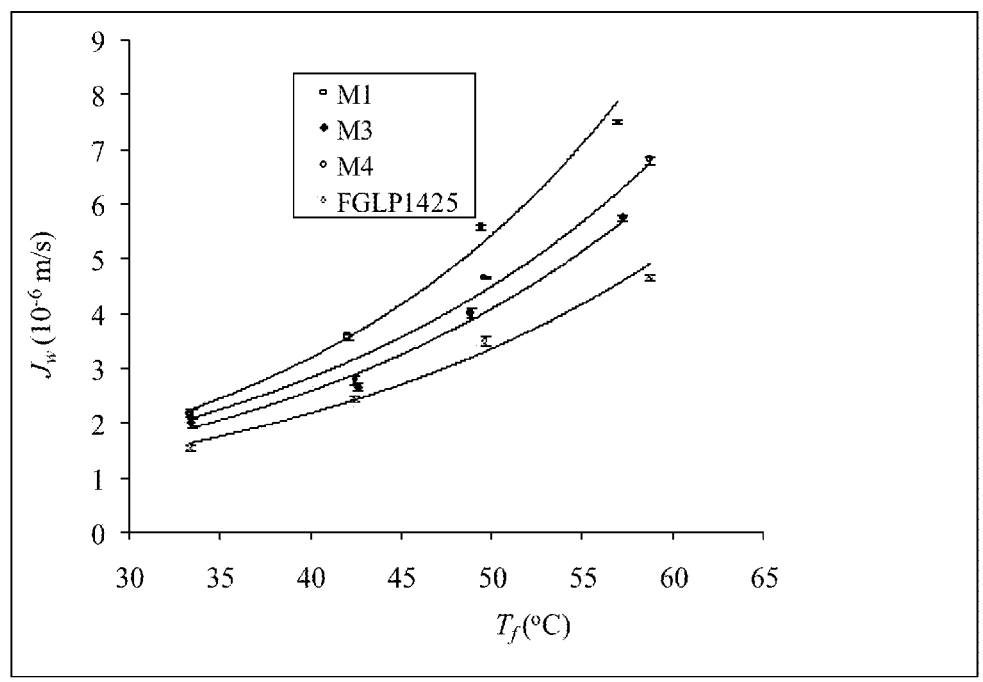
FIGS. 11A and B graphically depict the effect of SMM concentration on SMM/PEI membrane performance in DCMD.
Figure 11B:
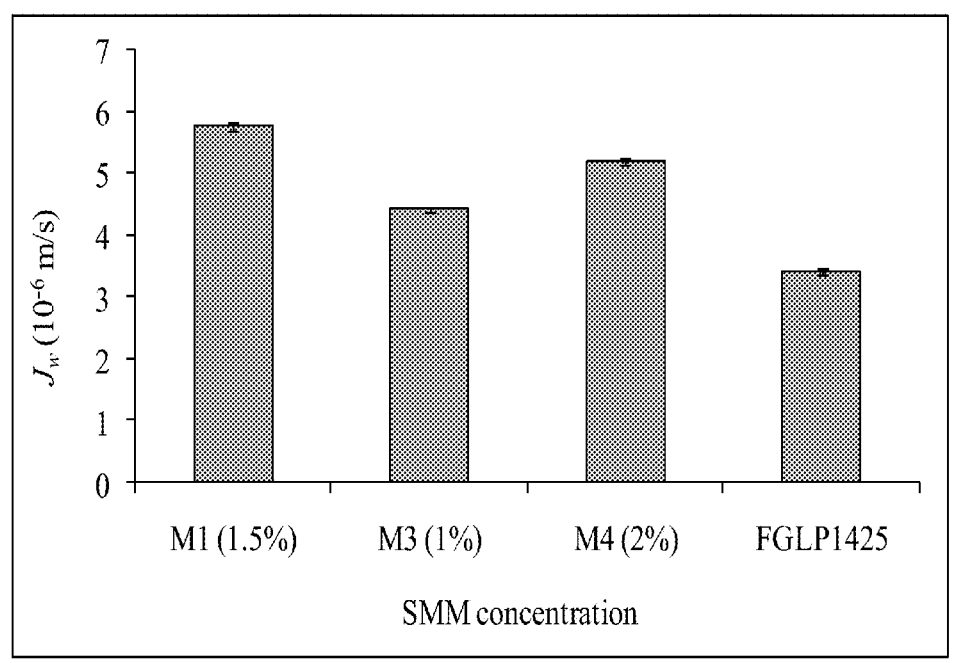
FIG. 11B water vapour flux of 0.5 M NaCl feed solution at $T_f$ of 65° C. and $T_p$ of 15° C.

M0 (0 wt %), M3 (1.0 wt %), M1 (1.5 wt %) and M4 (2.0 wt %) membranes were chosen to study the effect of the SMM concentration (see Table 4). FIGS. 11A and 11B show the DCMD fluxes of the above membranes along with those of the commercial membrane (FGLP 1425). FIG. 11A shows DCMD flux versus feed inlet temperature from the DCMD experiments with distilled water as feed. FIG. 11B shows the performance of the membranes for DCMD with 0.5 M aqueous NaCl solution as feed. The data for M0 membrane was not included since it failed to act as MD membrane. For all other membranes the separation factor, $\alpha$, was found to be more than 99%. In FIG. 11A DCMD flux increases exponentially with the feed temperature, similar to FIG. 10A.

Comparing the permeate flux data, M1 membranes showed the best performance among the tested membranes, despite the fact that M4 and M3 showed flux enhancement by 40 and 20%, respectively, compared to the commercial membrane.

According to Table 8, the increasing order in $LEP_W$ values was; M1 (3.7 bar)<M4 (4.9 bar)<M3 (5.2 bar), indicating that M1 membrane has the largest maximum pore size according to Laplace equation [24] and/or less hydrophobic (i.e., smaller top-layer CA). The decreasing in $\epsilon r/L_p$ values was, on the other hand, M1 ($7.09 \times 10^{-5}$)>M4 ($6.03 \times 10^{-6}$)>M3 ($5.48 \times 10^{-7}$). This trend validates the conclusion that the membranes with higher $\epsilon r/L_p$ values exhibit higher fluxes.

The surface fluorine contents of the membranes are shown in Table 7. The observed order is M3 (9.16%)<M1 (23.70%)<M4 (27.17%), which shows that the fluorine content of the top surface of the membrane increases with an increase in the SMM concentration. The CAs are M3 (88.4°)<M1 (89.3°)<M4 (96.3°), confirming the highest hydrophobicity of M4 membrane.

SEM pictures of the cross-section of the M3 and M4 membranes are presented in FIGS. 9C and 9D respectively (see FIG. 9A for M1 membrane cross-section structure). Generally, the structures are very similar, consisting of a bottom layer of fully developed macro-pores with a sponge-like structure, an intermediate layer with finger-like structure and a skin layer on the top. Hence, the PUP concentration in the dope did not affect the membrane structure, while affecting the $\Box r/L_p$ value. The latter parameter reflects the structure of the skin layer, the detailed structure of which can not be observed by SEM.

Another important thing is that all the above membranes exhibited higher fluxes than PTFE commercial membrane (FGLP 1425), regardless the SMM concentration. This is probably due to the sponge-like structure, which seems favourable for higher flux membranes in MD and to the smaller thickness of the top hydrophobic layer as reported in previous studies [16 and 17].

3. Solvent Type Effect

Figure 12A:
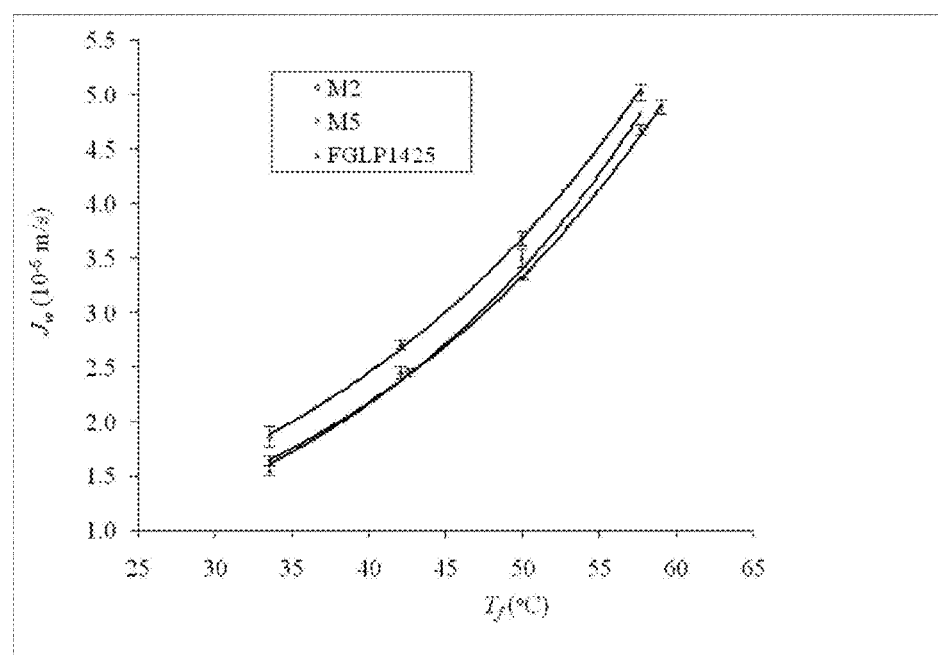
FIGS. 12A and 12B graphically depict the effect of solvent type on SMM/PEI membrane performance in DCMD.
Figure 12B:
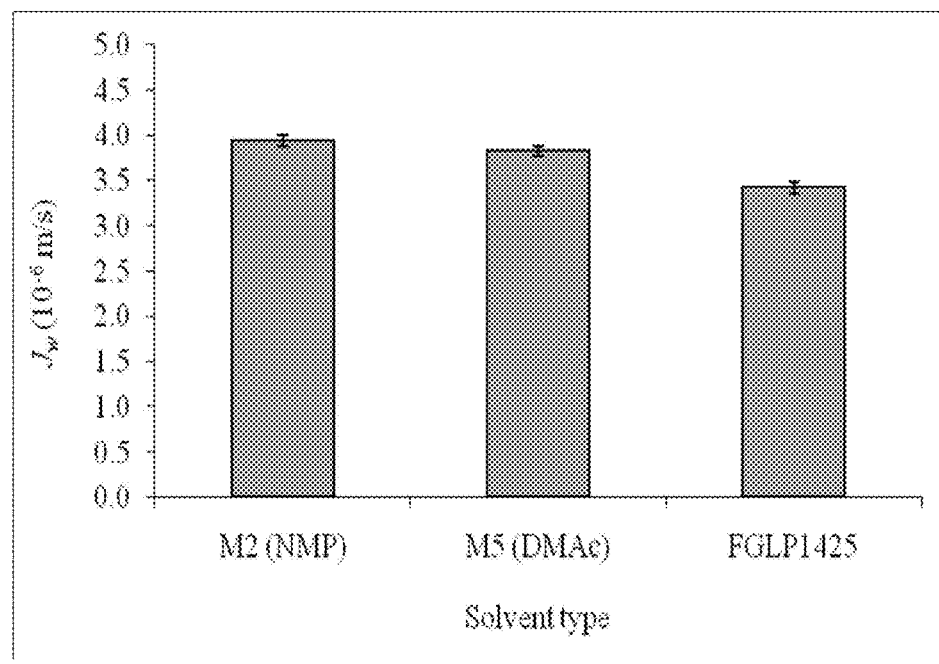

M2 (NMP) and M5 (DMAc) were chosen for the comparison of SMM/PEI membranes prepared with different solvents. Other membrane preparation parameters were kept unchanged (see Table 4). FIGS. 12A and 12B show the DCMD fluxes of the above membranes along with those of the commercial membrane (FGLP 1425). FIG. 12A shows the permeate DCMD flux versus feed inlet temperature from the DCMD experiments with distilled water as feed. FIG. 12B shows the performance of the membranes for DCMD with 0.5 M aqueous NaCl solution as feed. For both M2 and M5 membranes the separation factor, $\alpha$, was found to be more than 99%. Again in FIG. 12A the DCMD flux of all tested membranes increases exponentially with the feed temperature, similar to FIG. 10A.

The M2 membrane exhibited higher fluxes than M5 membrane (and the commercial membrane). The flux increased by around 11% from M5 membrane to M2 membrane. M2 membrane showed lower LEPw than the M5 membrane indicating that M2 membrane may have larger maximum pore size according to Laplace equation [24] or M5 membrane is more hydrophobic. In fact, CA of M5 membrane (100.6°) is higher than that of M2 membrane) (91.93°. Moreover, the order of the effective porosity/pore size ratio ($\epsilon r/L_p$) order was: M2>M5, which further validates our earlier conclusion that the membrane with higher ($\epsilon r/L_p$) exhibits higher DCMD flux.

The SEM cross-sectional picture of M5 membrane is shown in FIG. 9E, while that of M2 is presented in FIG. 9B. Both membranes consist of a bottom layer of fully developed macro-pores with a finger-like structure, an intermediate layer of finger-like structure, and a skin layer on the top. However, the macro-pores of M5 membrane are smaller. This could further explain the higher flux of M5 compared to that of M2 membrane.

4. Evaporation Time Effect

Figure 13A:
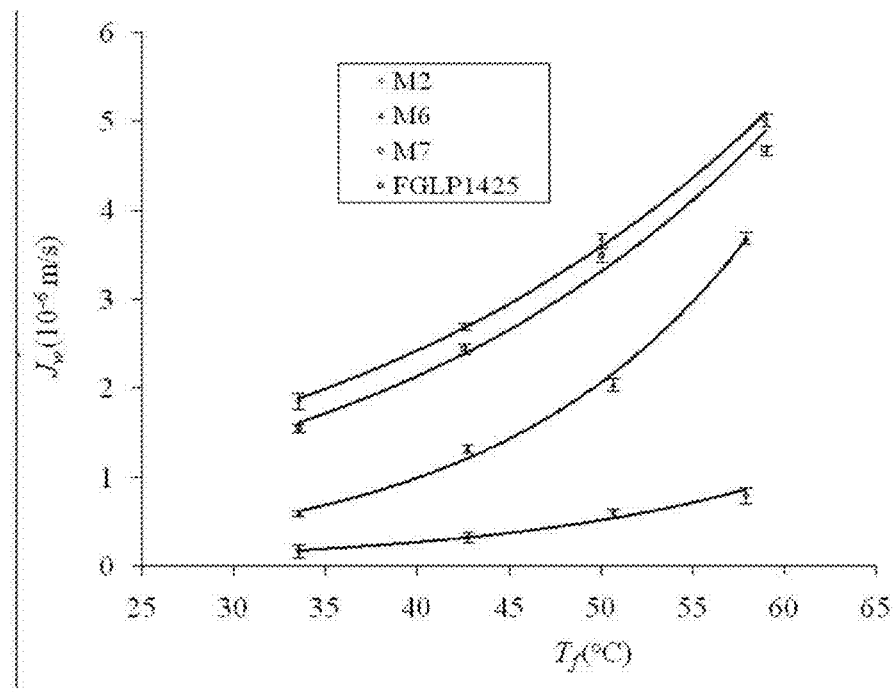
FIGS. 13A and 13B graphically depict the effect of evaporation time effect on SMM/PEI membrane performance in DCMD.
Figure 13B:
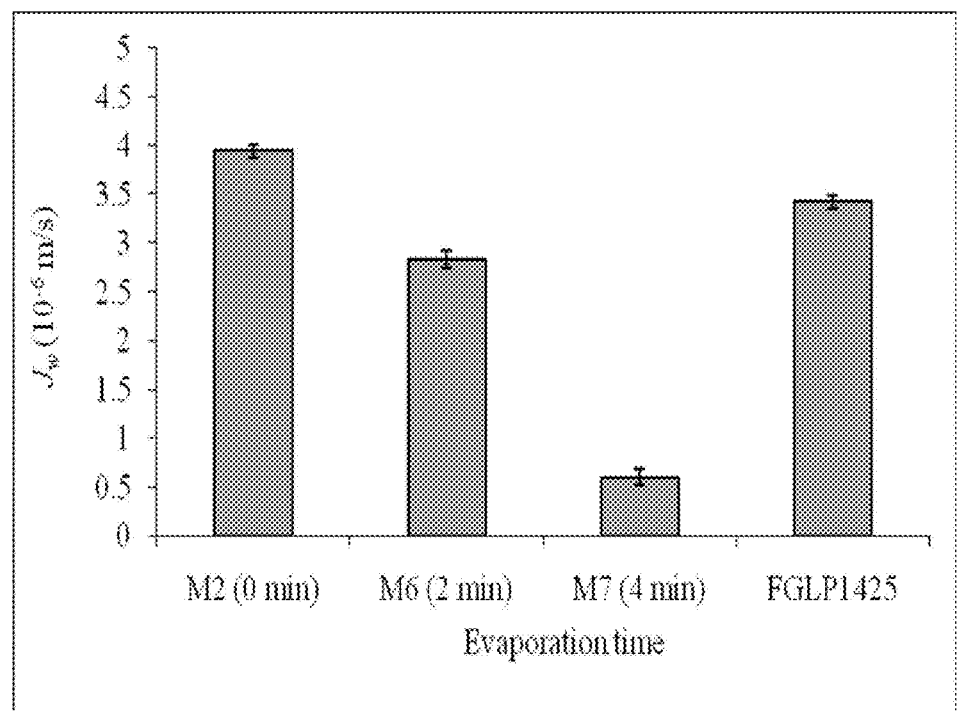

The effect of the evaporation time was studied by M2 (0 min), M6 (2 min) and M7 (4 min) membranes, while keeping the other membrane preparation parameters unchanged (see Table 4). FIGS. 13A and 13B show the DCMD fluxes of the above membranes along with those of the commercial membrane (FGLP 1425). FIG. 13A shows DCMD flux versus feed inlet temperature from the DCMD experiments with distilled water as feed. FIG. 13B shows the performance of the membranes for DCMD with 0.5 M aqueous NaCl solution as feed. For all the above membranes the separation factor, α, was found to be more than 99%. In FIG. 13A, for all tested membranes the DCMD flux increases exponentially with the feed temperature, similar to the trends shown in previous Figures. The permeate flux decreased dramatically from M2 to M7 membranes, in other words with an increase in the evaporation time. More specifically, the DCMD flux decreased by 60% and 85% for the evaporation time of two minutes (M6) and four minutes (M7), respectively, from zero evaporation time (M2).

Comparing $LEP_W$ values, the increasing order is M2 (4.0 bar)<M6 (4.7 bar)<M7 (5.5 bar), indicating that the membrane M2 has the largest maximum pore size according to Laplace equation [24] and/or the lowest CA. The observed increasing order in the CA is M2 (91.93)<M6 (104°)<M7 (121.2°) (see Table 7). As the evaporation time increases the hydrophobicity of the membrane surface increases. Suk et al. [23 and 25] studied the effect of evaporation time on SMM migration toward the top-layer and similar behaviour was obtained. As for $\epsilon r/L_p$ values, the observed decreasing order is M2>M6>M7. This trend as well validates the conclusion that membranes with higher $\epsilon r/L_p$ will exhibit higher permeate DCMD flux. The DCMD experiments presented in this Example indicate that no time is necessary to make the membrane surface sufficiently hydrophobic to be used for MD.

SEM picture of the cross-section of M7 membrane is presented in FIG. 9F, while that of M2 is presented in FIG. 9B. Both membranes consist of a bottom layer of fully developed macro-voids with a finger-like structure, an intermediate layer with finger-like structure, and a skin layer on the top. The size and number of macro-voids decreased with an increase in the evaporation time and the sponge-like structure between macro-voids became thicker. The macro-voids were almost totally eliminated when the evaporation time was 4 minutes. This also may explain the dramatic decrease in DCMD flux with evaporation time increase. It must be pointed out that a thicker sponge-like structure was maintained in the membrane M7. Hence, it is supposed to have a high permeate flux. Despite that, this membrane exhibited a permeate flux lower than that of the membrane M2 prepared without evaporation time. This also means that $\epsilon r/L_p$ value that governs the DCMD flux is not a property of the porous sub-layer, but a property of the top skin layer.

Conclusions

This Example provides means for improving the performance of the composite hydrophobic/hydrophilic PEI membranes in MD. This was achieved through studying the effect of different membrane preparation parameters such as SMMs type, SMMs concentration, Solvent type and evaporation time before gelation.

A better and instructive understanding of hydrophobic/hydrophilic membranes performance in MD has been obtained by finding the relationship between the membrane morphology and its performance in MD. The linkage between the membrane characteristics and the membrane performance was coherent. It was verified that the top skin layer (the hydrophobic layer) characteristics highly influence the DCMD flux. Those characteristics are mainly the liquid entry pressure of water and the product of average pore size and effective porosity per unit effective pore length ($r\epsilon/L_p$). Moreover it was shown that the cross-sectional structure of the membrane played a role in enhancing the DCMD flux in such a way that the membranes with sponge-like structure and/or larger macro-voids at the bottom layer (the hydrophilic layer) exhibited higher fluxes. Among the tested membrane preparation conditions, it was found that the membranes with PUP based SMMs are better than those with PUDU based SMMs, NMP was better solvent for membrane preparation than DMAc, membranes prepared with no evaporation time exhibited higher permeate fluxes than those of evaporation time before gelation and, finally, membranes with 1.5 wt % SMMs produced higher permeate fluxes than the membranes prepared with other different SMMs concentrations. All of these valuable findings were explained via the above presented understanding.

Generally, most of the SMMs modified PEI membranes exhibited higher permeate fluxes than those obtained using the commercial PTFE membrane, although the SMMs modified PEI membranes have considerably lower pore size and porosity. Moreover, the separation factor was found to be higher than 99% for all the tested membranes. It was proved that the SMMs are necessary to produce workable membranes in MD.

Example 3

Preparation and Characterization of Hydrophobic/Hydrophilic Polysulfone Composite Membranes for Desalination by Direct Contact Membrane Distillation The objective of this Example was to introduce polysulfone (PS), which is widely used in preparing reverse osmosis (RO), ultrafiltration (UF) and microfiltration (MF) membranes [21], as a possible membrane material for manufacturing membrane distillation membranes for the first time. To this end; hydrophobic/hydrophilic membranes were prepared by the phase inversion method using PS as the host hydrophilic polymer, whereas the hydrophobic layer was formed via the migration of the hydrophobic SMM toward the air/polymer interface while the SMM blended polysulfone dope was cast into a film. Moreover, this Example identifies and discusses the effects of hydrophobic/hydrophilic membrane preparation conditions on the membrane morphology and desalination DCMD performance of the prepared membranes. The membrane performance was related to the membrane morphology as well as to the membrane preparation factors such as, SMM type, PS concentration, non-solvent concentration and solvent type. Three different types of SMMs were synthesized, characterized and blended to PS for membrane preparation. Membranes so prepared were characterized using the gas permeation test, the measurement of the liquid entry pressure of water (LEPw), the scanning electron microscopy (SEM), and the contact angle (CA) measurement. Finally, all the membranes were tested by DCMD with feed distilled water and 0.5 M NaCl solution. The results were compared to those of the commercial PTFE membrane (FGLP 1425, Millipore Corporation USA). The prepared membranes are useful in desalination by DCMD.

Experimental

Materials

All chemicals used in this work and their chemical abstract service (CAS) number are enlisted in Table 7.1. The average molecular weight ($M_w$) of the polysulfone (PS) is 79000 g/mol and its glass transition temperature ($T_g$) is 185° C. The commercial membrane used is polytetrafluoroethylene, PTFE, (FGLP 1425) having a porosity of 0.70 and a nominal pore size of 0.25 μm supplied by Millipore Corporation, Billerica, Mass., USA.

and the weight average molecular weight of the synthesized SMMs was measured by gel permeation chromatography (GPC) as described above in Example 2.

Membrane Preparation

SMM modified PS membranes were prepared in a single casting step by the phase inversion method [15-16]. Ethanol was used as a non-solvent additive. A predetermined amount of PS was dissolved in a NMP/ethanol or a DMAc/ethanol mixture. The PS concentration in the casting solution was varied in a range of 10-14 wt %, two different ethanol concentrations were used; 10 and 20 wt %. Three different types of SMMs, nSMM1, nSMM2 and nSMM3 were added to the PS solution with a maintained concentration of 1.5 wt %. The resulting mixtures were stirred in an orbital shaker at room temperature for at least 48 h prior to their use. The resulting polymer solutions were filtered through a 0.5 μm Teflon® filter and degassed at room temperature. The polymer solutions were cast on a smooth glass plate to a thickness of 0.30 mm using a casting rod at room temperature. The resulted cast films together with the glass plates were immersed for 1 h in distilled water at room temperature. During gelation, it was

TABLE 9

Materials Used in this Example

| Material description | CAS number | Source |
|---|---|---|
| 4,4'-Methylene bis(phenyl isocyanate) (MDI, 98%) | 101-68-8 | Sigma-Aldrich, Inc., St. Louis, MO, USA |
| α,ω-Aminopropyl poly(dimethyl siloxane) (PDMS) of average molecular weight 900 | 106214-84-0 | Shin-Etsu Chemical Co. Ltd., Tokyo, Japan |
| Zonyl BA-L ™ (BAL) of average $M_n$ 443 and 70 wt % fluorine | 678-39-7 | DuPont product supplied by Aldrich Chemical Company, Inc., Milwaukee, WI, USA |
| N,N-Dimethylacetamide (DMAc, anhydrous 99.8%) | 127-19-5 | Sigma-Aldrich, Inc., St. Louis, MO, USA |
| 1-Methyl-2-pyrrolidinone (NMP, anhydrous 99.5%) | 112-14-1 | Sigma-Aldrich, Inc., St. Louis, MO, USA |
| Ethanol (anhydrous, 99+%) | 64-17-5 | Aldrich Chemical Company, Inc., Milwaukee, WI, USA |
| Tetrahydrofuran (THF, HPLC grade 99.9%) | 109-99-9 | Aldrich Chemical Company, Inc., Milwaukee, WI, USA |
| Polysulfone (PS, UDEL ™ 3500) Specific gravity: 1.24 | 25154-01-2 | Solvay Advanced Polymer, LLC, Alpharetta, Georgia, USA |

SMMs Synthesis

The SMMs were synthesized using the two-step solution polymerization method described above [22 and 23]. In this example, the first polymerization step was conducted in a solution of a predetermined composition to form polyurea by the reaction of MDI with PDMS as a pre-polymer. In the second polymerization step, the pre-polymer was end-capped by the addition of FAE, resulting in a solution of SMM having the PUDU structure shown in FIG. 8.

The composition of SMMs were altered such that the ratio of MDI:PDMS:FAE was (i) 2:1:2, (ii) 3:2:2 and (iii) 4:3:3. The prepared SMMs are named hereafter as nSMM1, nSMM2 and nSMM3, respectively, based on the PDMS stoichiometric number.

SMMs Characterization

The elemental analysis of fluorine content in the three prepared SMMs was carried out using standard method in ASTM D3761. An accurate weight (10-50 mg) of sample was placed into oxygen flask bomb combustion (Oxygen Bomb calorimeter, Gallenkamp). After pyro-hydrolysis, the fluorine (ion) was measured by an ion chromatography (Ion Chromatograph, Dionex DX1000).

The glass transition temperature ($T_g$) of synthesized SMMs were examined by differential scanning calorimeter observed that the membranes peeled off from the glass plate spontaneously. All the membranes were then dried at ambient conditions for 3 days. Table 10 shows the prepared membranes, their materials of construction and preparation conditions.

TABLE 10

Membrane preparation details: casting solution composition and preparation conditions‡

| Membrane code | SMM type | Solvent | Polymer Concentration | Ethanol Concentration |
|---|---|---|---|---|
| M1 | nSMM1 | NMP | 10 | 10 |
| M2 | nSMM2 | NMP | 10 | 10 |
| M3 | nSMMS | NMP | 10 | 10 |
| M4 | nSMM1 | NMP | 12 | 10 |
| M5 | nSMM1 | NMP | 14 | 10 |
| M6 | nSMM1 | DMAc | 10 | 10 |
| M7 | nSMM1 | NMP | 10 | 20 |

‡No evaporation time and gelation bath temperature: 20° C.

Membrane Characterization

1. Measurement of Gas Permeation Test and Liquid Entry Pressure of Water (LEPw)

Measurement of liquid entry pressure of water (LEPw) and the gas permeation test were carried out for the prepared surface modified PS membranes, essentially as described above in Example 2.

As in Example 2, the permeation flux of nitrogen through each dry membrane was measured at various transmembrane pressures, in the range of 10-100 kPa. In general, the gas permeance, B, for a porous medium contains both a diffusive term and a viscous term, the contribution of which depends on the applied pressure as required by Equation 34 above.

Similarly, throughout all the gas permeation experiments, it was noticed that the gas permeance was independent of pressure ($P_m$). Accordingly, the gas permeance will be described after omitting the viscous term of Eq. (34) as [16 and 17], to get Eq. (35), which was useful in evaluating the ratio ($r\epsilon/L_p$).

As in Example 2, some of the gas permeation experiments were duplicated using different membrane sheets made from the same casting solution batch in order to evaluate the variance of the obtained values from batch to batch. Moreover, for each membrane, the measurement of the gas flow rate was made three times at a given gas pressure and the average value is reported as the membrane permeance.

The measurements for the $LEP_W$ were then carried out as explained in Example 2. The experiment was done three times using three different sheets made from the casting solution batches. The results were averaged to obtain the final $LEP_W$ value of each membrane.

2. Scanning Electron Microscopy (SEM)

The cross-section of the SMMs blended PS membranes was analyzed by SEM using the same system and technique as set out in Example 2.

3. Measurement of Contact Angle (CA)

The contact angle (CA) of the SMMs blended membranes was measured to study their hydro-phobicity/-philicity using the same system and technique as set out in Example 2.

DCMD Experiments

Figure 15:
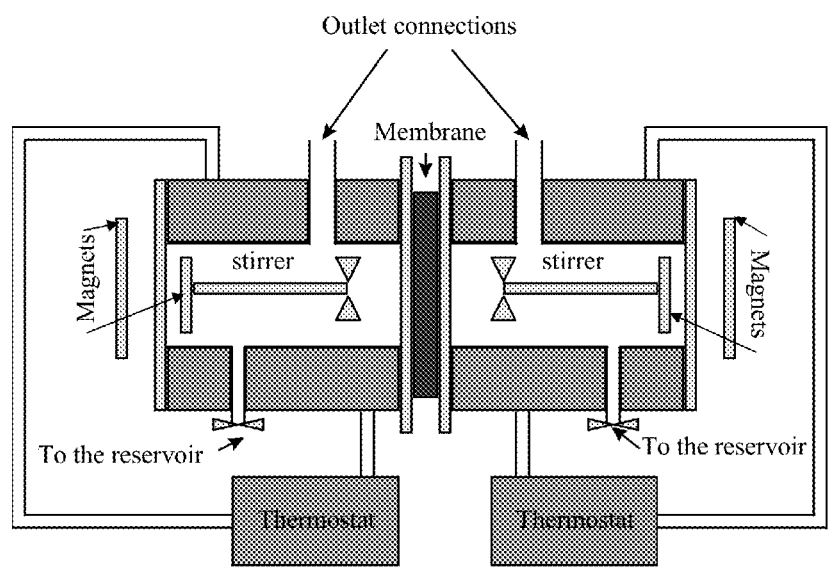
FIG. 15 is a schematic diagram of the experimental DCMD set-up [16] used in Example 3.

The laboratory system used to conduct the DCMD experiments for the SMMs blended PS membranes is presented in FIG. 15. The central part of the system is a stainless steel cell composed of two cylindrical chambers. One of the chambers is connected to a heating system through its jacket to control the temperature of the liquid feed. The other chamber is connected to a cooling system to control the temperature of the permeate. The membrane is placed between the two chambers (feed side and permeate side). The hot feed solution is brought into contact with the hydrophobic top layer of the membrane and the cold permeate solution is in contact with the hydrophilic part of the membrane. The effective membrane area is $2.75 \times 10^{-3}$ m$^2$. The bulk feed and permeate temperatures are measured, after steady state is reached, inside each chamber by a pair of sensors connected to a digital meter with an accuracy of ±0.1° C. Both the feed and permeate liquids are stirred inside the cell by graduated magnetic stirrers. The DCMD flux is calculated in every case by measuring the condensate collected in the permeate chamber for a predetermined period. The experiments are conducted first for pure water to determine the water vapour permeability of the membranes. Subsequently, aqueous solution of 0.5 M sodium chloride is employed as feed.

The experiments were carried out under a temperature difference between the feed and permeate of 10° C. When distilled water was used as feed, the mean temperature was varied from 20 to 45° C., while the stirring rate was maintained at 500 rpm. When 0.5M NaCl solution was used as feed, the mean temperature was 45° C. and the stirring rate was 500 rpm. The concentration of both feed and permeate solutions is determined by a conductivity meter (712 ΩMetrohm). The solute separation factor, α, is calculated using the following expression:

$$\alpha = \left(1 - \frac{C_p}{C_f}\right) * 100\% \tag{36}$$

where $C_p$ and $C_f$ are the NaCl concentration in the permeate and in the bulk feed solution, respectively.

Results and Discussion

SMMs Characterization

The precise $T_g$ values could not be obtained for the SMMs (nSMM1, nSMM2 and nSMM3) as the samples were heated up to 280° C. due to the limitation of higher temperature of the equipment. According to the SMMs chemical structure presented in FIG. 8, the value of m, the number of the repeating unit, $CF_2$, was calculated from the molecular weight of (FAE). The value of y, the number of repeating unit, dimethylsiloxane, was calculated from the average molecular weight of PDMS. q, the number of the repeating unit, urea, was estimated for each SMM based on its fluorine content. The values of $T_g$, weight average molecular weight ($M_w$), fluorine content (F wt %), m, y, and q for the SMMs are given in Table 11.

TABLE 11

SMMs characterization results

| SMM | F(wt %) | $M_w$ (10$^4$ g/mol) | $T_g$(° C.) | m | y | q |
|---|---|---|---|---|---|---|
| nSMM1 | 16.21% | 2.95 | >280 | 7.58 | 9.81 | 2.306 |
| nSMM2 | 11.75% | 2.71 | >280 | 7.58 | 9.81 | 3.557 |
| nSMM3 | 10.06% | 3.30 | >280 | 7.58 | 9.81 | 4.320 |

Membrane Characterization

The contact angle (CA) data of all membranes are shown in Table 12. It was observed that the CA of the top side of the prepared membranes is higher than their bottom side; indicating that the hydrophobicity of the membrane top layer is higher than that of the bottom sub-layer. This is attributed to the fact that the hydrophobic SMM tends to migrate toward the membrane top surface during gelation in order to minimize the interfacial energy according to the thermodynamic principles [15, 16, 20, 22, 23 and 25].

The CA of the SMMs blended membranes where nSMM1, nSMM2 and nSMM3 were used as surface modifying macromolecules; follows the order: M1 (96.66°)>M2 and M3 (100.4° and 100.52°, respectively).

The membrane with higher hydrophilic polymer concentration exhibited higher contact angle at the membrane top surface. The CA of the blended membranes using nSMM1 as surface modifying macromolecules but with different PS concentrations; follows the order: M5>M4>M1. Furthermore, the SMM blended PS membrane where DMAc was used as solvent (M6) exhibited higher CA than M1. Similar trend was also observed from the non-solvent concentration point of view (M7>M1).

TABLE 12

CA results of the prepared membrane for both top and bottom sides

| Membrane | CA (θ°) |
|---|---|
| M1 | Top: 96.66 ± 3.84 |
|    | Bottom: 84.60 ± 0.42 |
| M2 | Top: 100.40 ± 0.91 |
|    | Bottom: 78.87 ± 4.35 |
| M3 | Top: 100.52 ± 5.92 |
|    | Bottom: 84.70 ± 1.68 |
| M4 | Top: 100.50 ± 6.34 |
|    | Bottom: 77.28 ± 5.07 |
| M5 | Top: 102.95 ± 3.42 |
|    | Bottom: 82.85 ± 3.64 |
| M6 | Top: 101.64 ± 4.42 |
|    | Bottom: 82.23 ± 2.25 |
| M7 | Top: 103.60 ± 2.20 |
|    | Bottom: 86.85 ± 2.48 |

The SEM images of the membrane cross-sections are shown in FIGS. 16A-16G. As can be seen, all the membranes are of asymmetric structure with a dense top-layer supported by a finger-like structure underneath. However, the bottom parts of the membranes are different. The finger-like structure of the membrane M1, M2 and M3 (FIG. 16A, FIG. 16B and FIG. 16C, respectively) reaches the bottom side, where small macro-voids were formed in vertical direction. It was noticed that at the bottom of the membrane; the macro-voids were separated by vertical sponge-like polymer layers.

From polymer concentration point of view; the SEM images of M1, M4 and M5 membranes (see FIG. 16A, FIG. 16D and FIG. 16E) showed that the size of the macro-voids at the bottom layer decreased with increasing polymer concentration. On the other hand, the structure of the top and the intermediate layer remained unaltered; i.e., a similar top dense layer is supported by a finger-like structure underneath.

Figure 16A:
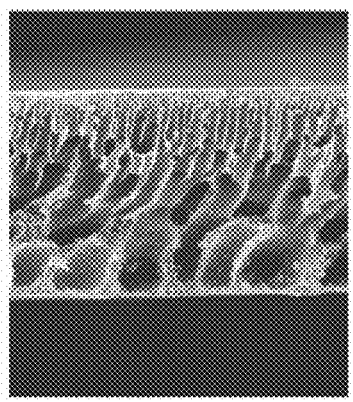
FIGS. 16A-16G depict SEM pictures of the cross-section of the prepared membranes.
Figure 16B:
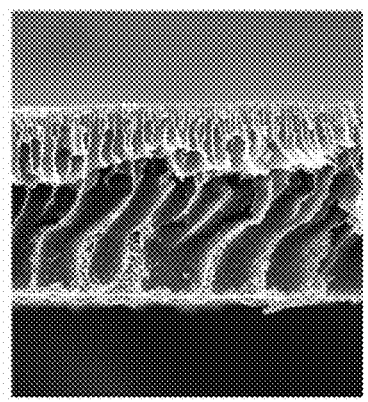
Figure 16C:
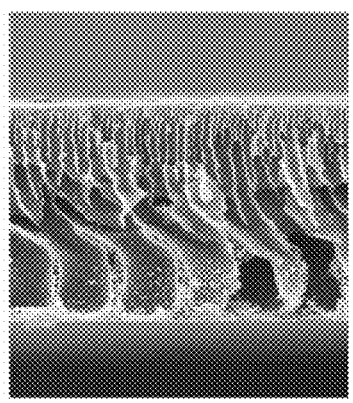
Figure 16D:
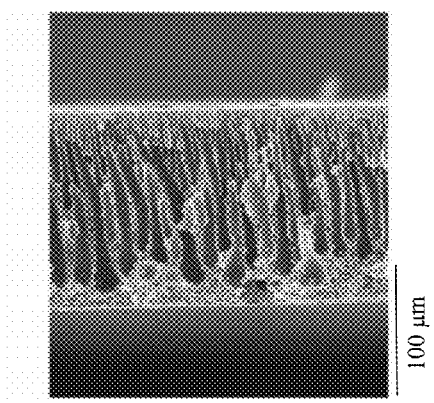
Figure 16E:
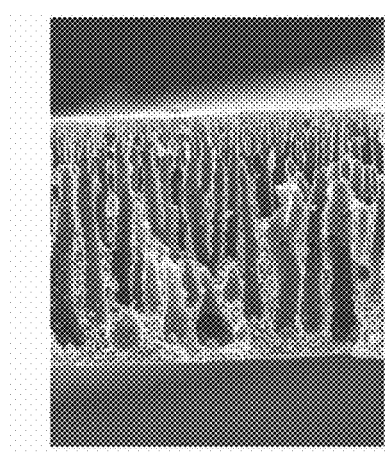

M6 membrane (FIG. 16F), prepared with DMAc as solvent, exhibited completely different structure from that membranes prepared with NMP as solvent (FIG. 16A). In the M6 membrane, the top layer was a dense layer supported by a short finger-like structure underneath, followed by a sponge-like structure at the intermediate and bottom layers of the membrane.

Both M1 and M7 membrane, in which the non-solvent additive concentration was altered (see FIG. 16A and FIG. 16G), exhibited similar structures with a top dense layer supported by a finger-like structure underneath. However, the macro-voids size was smaller in M7 than M1. Moreover, the vertical sponge-like polymer layers that separate the macro-voids at the bottom of the membrane was more pronounced in M7 membrane.

The data for the $LEP_W$ and $(r\epsilon/L_p)$ are summarized in Table 13. The data is discussed below, together with the DCMD data.

TABLE 13

Liquid entry pressure of water (LEPw) and $(\epsilon r/L_p)$ of the prepared membranes

| Membrane | LEPw (bar) | $\epsilon r/L_p$ |
|---|---|---|
| M1 | 2.9 | 1.15 10$^{-4}$ |
| M2 | 3.3 | 6.97 10$^{-5}$ |
| M3 | 3.6 | 4.93 10$^{-5}$ |
| M4 | 4.4 | 3.02 10$^{-6}$ |
| M5 | 4.6 | 5.48 10$^{-7}$ |
| M6 | 3.2 | 1.65 10$^{-6}$ |
| M7 | 3.3 | 5.48 10$^{-7}$ |

Membrane Performance

1. SMMs Type Effect

Figure 17A:
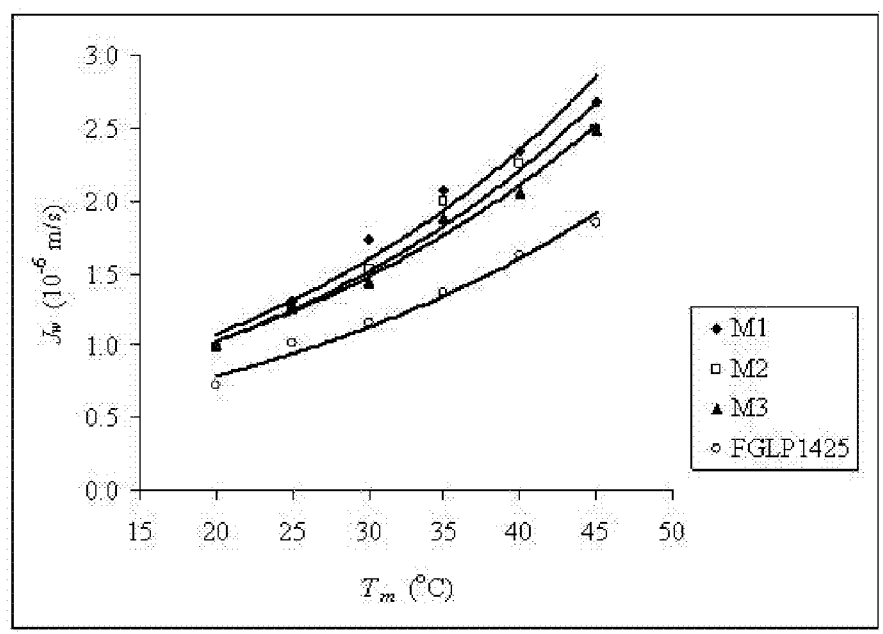
FIGS. 17A and 17B graphically depict the effect of SMM type on SMM/PS membrane performance in DCMD.
Figure 17B:
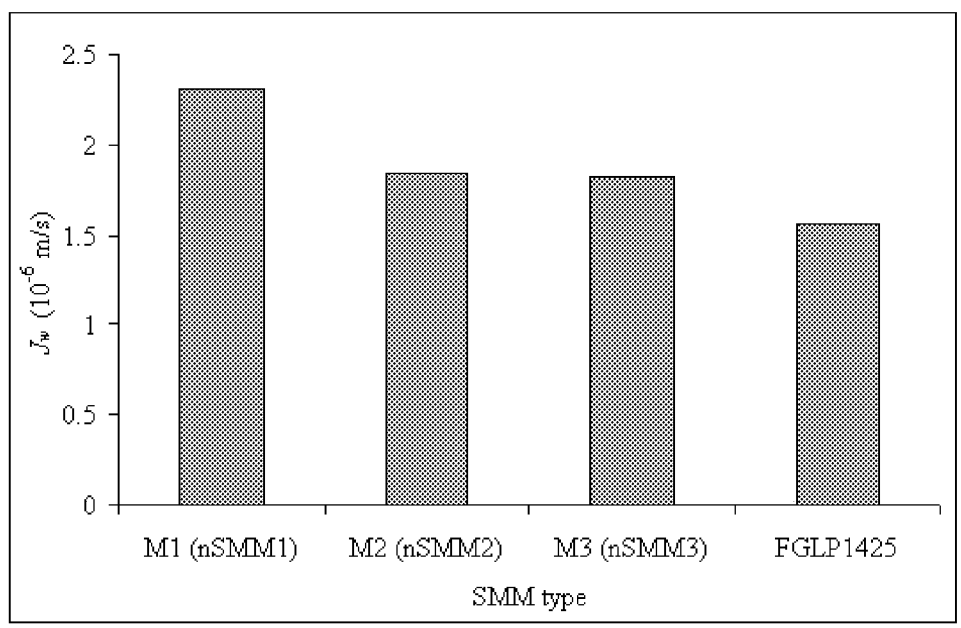

M1 (nSMM1), M2 (nSMM2) and M3 (nSMM3) membranes were chosen to compare the SMM type effects on the DCMD performance (see Table 10 for membrane preparation conditions). FIGS. 17A and 17B show the DCMD fluxes of the above membranes along with those of the commercial membrane (FGLP 1425). FIG. 17A shows the DCMD flux versus the average temperature of feed and permeate solutions ($T_m$) when distilled water was used as feed, while FIG. 17B shows the DCMD flux of the same membranes when using 0.5M NaCl aqueous solution as feed.

It is well documented that temperature is the operating variable that affects the MD flux the most due to the exponential increase of vapour pressure with temperature according to the Antoine equation [1-6]. As shown in FIG. 17A; both the commercial membrane and the SMMs blended PS membranes exhibit an exponential increase of the DCMD flux with an increase in $T_m$.

Both FIGS. 17A and 17B show that the order in the DCMD flux is M1>M2>M3>FGLP 1425. In other words, the prepared SMMs blended PS membranes showed higher permeate fluxes than the commercial membrane. In particular, the DCMD flux of the membranes M1, M2 and M3 was found, on average within the tested temperatures, to be (43±8.51) %, (35±8.30) % and (31±6.63) %, respectively, higher than that of the commercial membrane as shown in FIG. 15A.

According to Table 13, the LEPw of those membranes under investigation followed the order of M3>M2>M1. This indicates that the order of maximum pore size according to Laplace equation [26] might be M1>M2>M3, which agrees with the flux order. Moreover, Table 13 shows that the decreasing order of the ratio ($r\epsilon/L_p$) is M1>M2>M3, which is again the same order of the permeate flux. As observed with the polyetherimide composite membranes described above, the membrane exhibiting higher ($\epsilon r/L_p$) ratio will have higher DCMD flux. This is expected since an increase in the ratio ($\epsilon r/L_p$) means an increase in either the porosity and/or pore radius or a decrease in effective pore length.

As can be observed in FIG. 17B; smaller permeate fluxes were obtained in the presence of sodium chloride. The flux of M1 and FGLP 1425 decreased by 13-15% compared to that obtained when distilled water was used as feed. While, the flux decline in case of M2 and M3 was around 26%. Generally, it is expected to observe a flux decline in presence of NaCl, since the water vapour pressure decreases, which results in lower driving force for vapor transport. Moreover, a boundary layer develops next to the feed membrane surface, where the NaCl concentration increases toward the membrane surface due to concentration polarization. The presence of the concentration boundary layer and the temperature boundary layer together reduces the driving force.

The solute separation factor defined as:

$$\alpha = \left(1 - \frac{C_p}{C_f}\right)100 \tag{37}$$

where $C_p$ and $C_f$ are the NaCl concentration in the permeate and in the bulk feed solution, respectively, was higher than 99.9% (the permeate conductivity was always smaller than 25 µS/cm in all the tested membranes) for all the tested membranes. This indicates that the SMMs blended membranes M1, M2 and M3 are useful for MD processes.

2. Polymer Concentration Effect

Figure 18A:
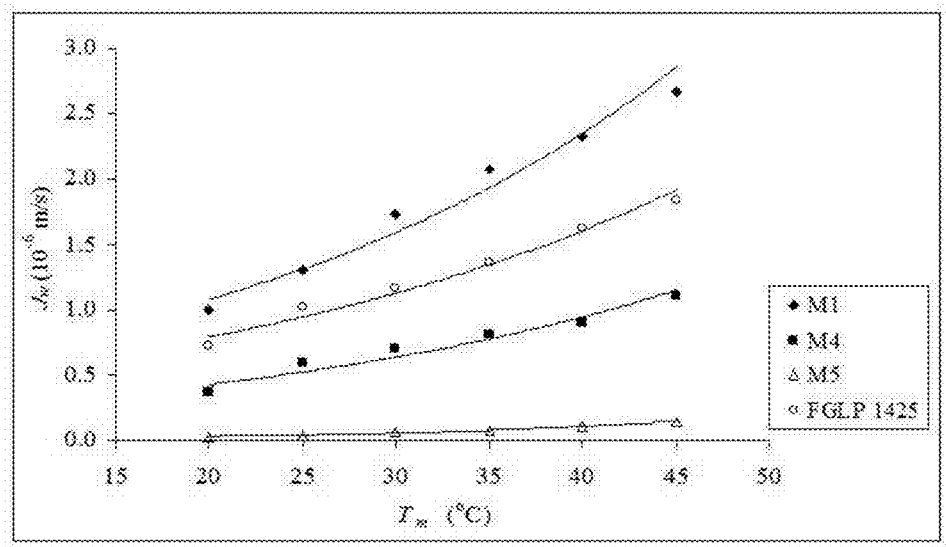
FIGS. 18A and 18B graphically depict the effect of hydrophilic polymer concentration on SMM/PS membrane performance in DCMD.
Figure 18B:
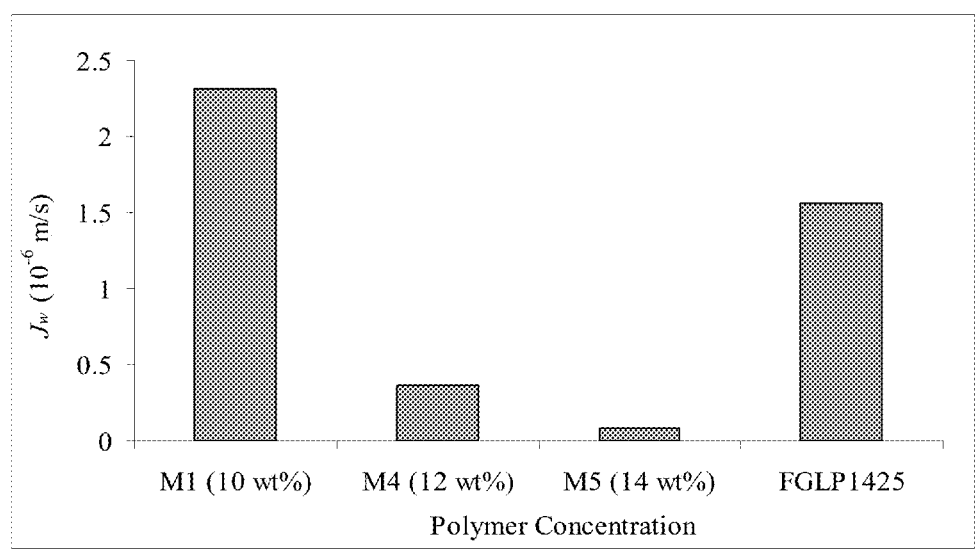

M1 (10 wt %), M4 (12 wt %) and M5 (14 wt %) membranes were chosen to study the effect of the hydrophilic host polymer (PS) concentration on the DCMD flux (see Table 10). FIGS. 18A and 18B show the DCMD fluxes of the above membranes along with those of the commercial membrane (FGLP 1425). FIG. 18A shows the DCMD flux versus the average temperature of feed and permeate solutions ($T_m$) when distilled water was used as feed, while FIG. 18B shows the DCMD flux of the same membranes when using 0.5M NaCl aqueous solution as feed.

Comparing the permeate flux data; M1 membranes showed the best performance among the tested membranes. As stated earlier, the M1 membrane showed (43±8.51) % flux enhancement compared to the commercial membrane. Conversely, M4 and M5 membranes DCMD exhibited fluxes lower, on average of the tested temperature range, by (43±3.69 and 94±1.64) % than that of the commercial membrane, respectively.

According to Table 13, the increasing order in the LEPw values was; M1<M4<M5, indicating that M1 membrane has the largest maximum pore size according to Laplace equation [26] and/or less hydrophobic (i.e. smaller top-layer CA). The decreasing order in the $\epsilon r/L_p$ values was, on the other hand, M1>M4>M5. This trend validates our earlier conclusion that the membranes with higher $\epsilon r/L_p$ values will exhibit higher fluxes.

It can be concluded that increasing the polymer concentration leads to a significant decrease in the permeate flux, which is attributable to either the decrease in the maximum pore size or the decrease in the $\epsilon r/L_p$ ratio. Similar trend was observed when a different polymer was used [16 and 23].

In the presence of NaCl (see FIG. 18B); the flux decreased compared to those values obtained when distilled water was used as feed. The flux decline in the case of M4 and M5 membrane was 66% and 43%, respectively. Once again, this could be explained by the formation of the concentration boundary layer, which contributes together with the thermal boundary layer in the flux decline.

The solute separation factor was higher than 99.9% for all the above membranes. The permeate conductivity was around 12 μS/cm for M4 and M5 membrane, while it was around 23 μS/cm for the commercial and M1 membrane.

3. Solvent Type Effect

Figure 19A:
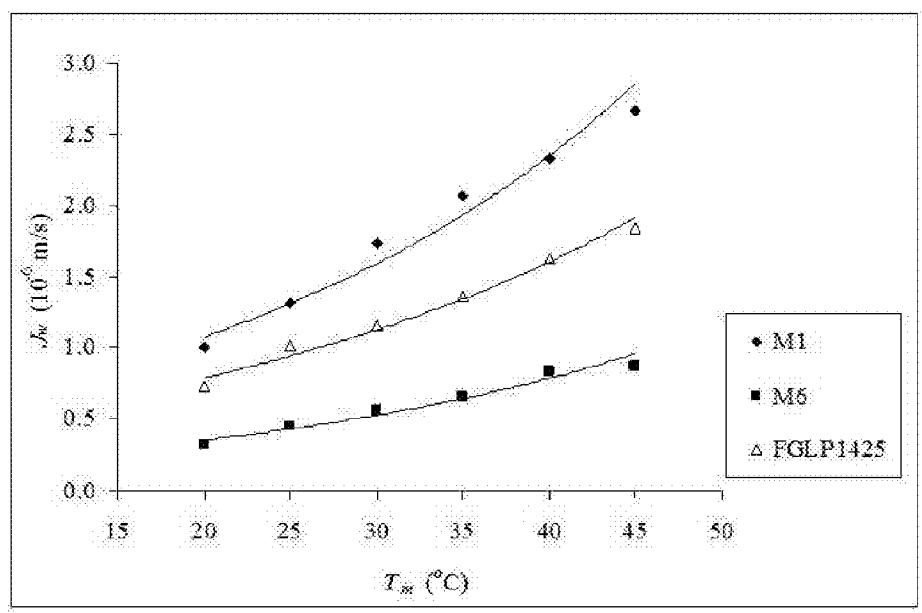
FIGS. 19A and 19B graphically depict the effect of solvent type on SMM/PS membrane performance in DCMD.
Figure 19B:
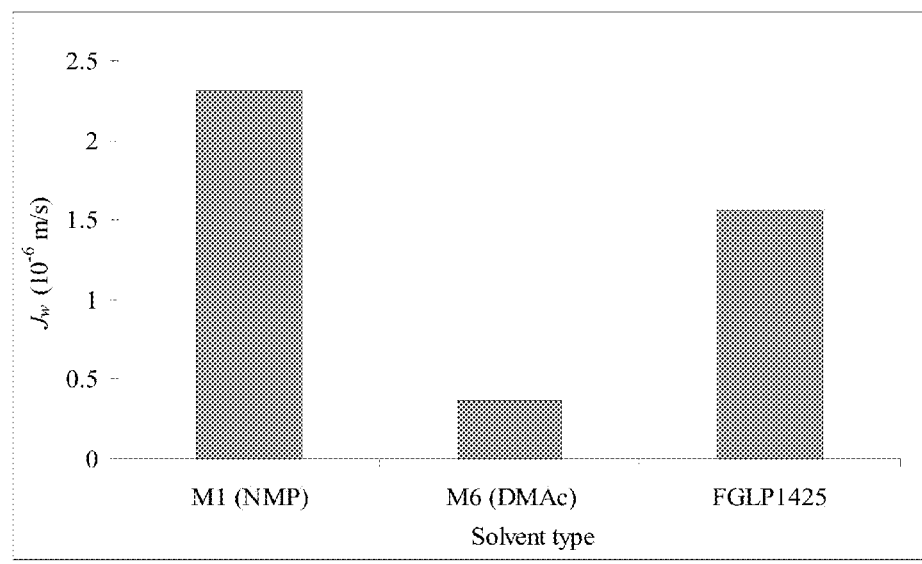

M1 (NMP) and M6 (DMAc) were chosen for the comparison of SMM/PS membranes prepared using different solvents. Other membrane preparation parameters were kept unchanged (see Table 10). FIGS. 19A and 19B show the DCMD fluxes of the above membranes along with those of the commercial membrane (FGLP 1425). FIG. 19A shows the DCMD flux versus the average temperature of feed and permeate solutions ($T_m$) when distilled water was used as feed, while FIG. 19B shows the DCMD flux of the same membranes when using 0.5M NaCl aqueous solution as feed.

As shown in FIG. 19A; both the commercial membrane and the SMM blended PS membranes exhibit an exponential increase of the DCMD flux with an increase in $T_m$ as discussed above in the section regarding SMMs type effect.

M1 membrane showed a flux that is superior to that of the commercial or M6 membrane. In particular; the decreasing order of the flux was M1>FGLP 1425>M6. The M6 membrane's flux was lower, on average of the tested temperature range, than that of the commercial membrane by around (53±2.73) %. This decreasing order agrees with the increasing order of the LEPw of the SMM blended PS membranes, respectively as shown in Table 13. More specifically; the increasing order in LEPw was M1 (2.9 bar)<M6 (3.2 bar).

This validates our earlier conclusion that the membranes with lower LEPw exhibit higher fluxes since they have larger maximum pore sizes. Furthermore, the decreasing order of the flux agrees with the decreasing order of the ratio ($\epsilon r/L_p$); i.e. M1 (1.15 10$^{-4}$)>M6 (1.65 10$^{-6}$). This further validates our earlier conclusion of the relationship between the ratio ($\epsilon r/L_p$) and the permeate flux.

Figure 16F:
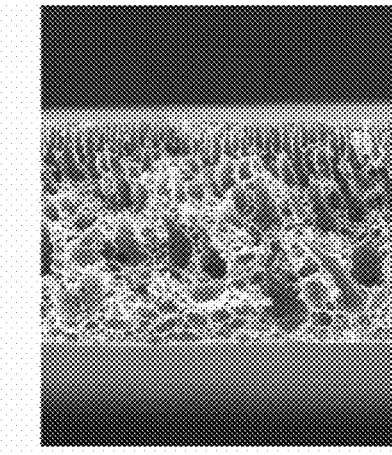
Figure 16G:
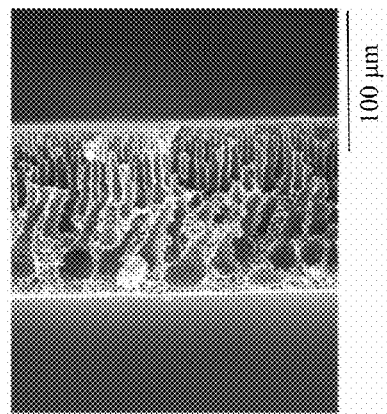

It is worth mentioning that, although M6 membrane exhibited a more profound sponge like structure at the intermediate and bottom sub-layer than that of M1 membrane (see FIG. 16A (M1) and FIG. 16F (M6)), which is more favorable in MD [13], the trend in the flux was the opposite. This suggests that the flux is more affected by the top skin layer properties including the ($\epsilon r/L_p$) ratio and LEPw.

In presence of NaCl, the flux decreased compared to those values obtained when distilled water was used as feed (see FIG. 19B). The flux decline in case of M6 membrane was 58%. Once again, this could be explained by the formation of the concentration boundary layer. Most importantly, the solute separation factor was higher than 99.9% for all membranes involved with the permeate conductivity of around 12 μS/cm and 23 μS/cm for M6 and M1 membrane, respectively.

4. Non-Solvent (Ethanol) Concentration Effect

Figure 20A:
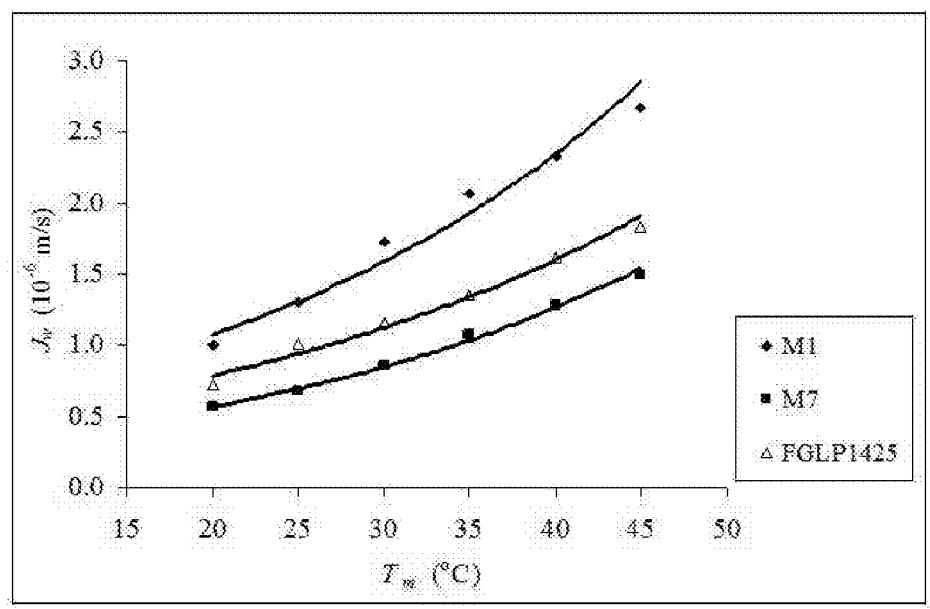
FIGS. 20A and 20B graphically depict the effect of non-solvent concentration on SMM/PS membrane performance in DCMD.
Figure 20B:
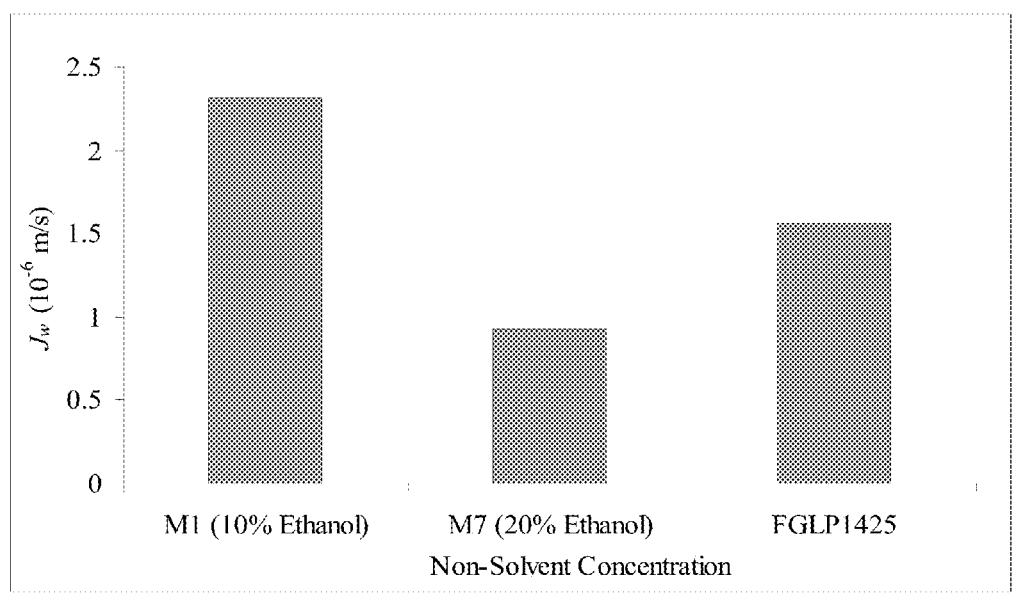

M1 (10% Ethanol) and M7 (20% ethanol) were chosen for the comparison of SMM/PS membranes prepared with different non-solvent concentrations. Other membrane preparation parameters were kept unchanged (see Table 10). FIGS. 20A and 20B show the DCMD fluxes of the above membranes along with those of the commercial membrane (FGLP 1425). FIG. 20A shows the DCMD flux versus the average temperature of feed and permeate solutions ($T_m$) when distilled water was used as feed, while FIG. 20B shows the DCMD flux of the same membranes when using 0.5M NaCl aqueous solution as feed.

As shown in FIG. 20A, both the commercial membrane and the SMM blended PS membranes exhibit an exponential increase of the DCMD flux with an increase in $T_m$ due to the reason discussed earlier in the section relating to the SMMs type effect.

M1 membrane showed a flux that was superior to that of the commercial or M7 membranes. In particular; the decreasing order of the flux was M1>FGLP 1425>M7. The M7 membrane's flux was lower than that of the commercial membrane, in the tested temperature range, than that of the commercial membrane by around (23±5.39) %. This decreasing order agrees with the increasing order of the LEPw of the SMM blended PS membranes, respectively as shown in Table 13. More specifically; the LEPw increasing order was M1 (2.9 bar)<M7 (3.3 bar). This, again, validates our earlier conclusion that the membranes with lower LEPw exhibit higher fluxes since they have larger maximum pore sizes. Furthermore, the decreasing order of flux agrees with the decreasing order of the ratio ($\epsilon r/L_p$); i.e. M1 (1.15 10$^{-4}$)>M7 (5.48 10$^{-7}$). This further validates the earlier conclusion of the relationship between the ratio ($\epsilon r/L_p$) and the permeate flux.

Although the non-solvent additives is used to enhance the pore size and/or porosity of the membrane [27] and to achieve better permeate flux, the trend shown in FIG. 20B is the opposite. As a conclusive remark; it is not necessary to enhance the permeate flux by increasing the ethanol concentration. Z.-L. Xu and F. Qusay [28] found that increasing the ethanol concentration from 0 to 15 wt % in polyethersulfone ultrafiltration hollow fibers decreased the mean pore size and caused an increase in the pore density. On the other hand; they also reported that the opposite occurred when increasing the ethanol concentration above 15 wt %. In the presence of NaCl, the flux decreased compared to those values obtained when distilled water was used as feed (see FIG. 20B). The flux decline in case of M7 membrane was 38%. Once again, this could be explained by the formation of the concentration boundary layer. The solute separation factor was higher than 99.9% for all the membranes involved with the permeate conductivity around 18 µS/cm and 23 µS/cm for M7 and M1 membrane, respectively.

Conclusions

This Example demonstrates that polysulfone (PS) use as a manufacturing material for membrane distillation (MD) membranes. This was achieved by blending PS, which is a hydrophilic polymer, with three different types of surface modifying macromolecules. The effects of different membrane preparation parameters such as SMMs type, hydrophilic polymer concentration, solvent type and non-solvent additive concentration on the membrane characteristics and performance in DCMD were clearly identified.

It was found that the characteristics of the top skin layer that governs the DCMD are able to explain the reported flux trends. Those characteristics are the product of average pore size and effective porosity per unit effective pore length ($r\epsilon/L_p$) and the liquid entry pressure of water (LEPw). In other words, membranes with higher $r\epsilon/L_p$ and lower LEPw produced higher permeate fluxes.

Among the tested membrane preparation conditions, it was found that nSMM1/PS membrane is better than those membranes prepared with nSMM2 and nSMM3. NMP was better solvent for membrane preparation than DMAc, membranes prepared with lower hydrophilic polymer (PS) concentration exhibited higher permeate fluxes than those of higher PS concentration, and finally, membranes with 10 wt % non-solvent additive (Ethanol) concentration produced higher permeate fluxes than the membranes prepared with 20 wt % Ethanol concentration.

Generally, SMM/PS membranes are promising as novel MD membranes. Some of the SMMs modified PS membranes exhibited higher permeate fluxes than those obtained using the commercial PTFE membrane, although the SMMs modified PS membranes have considerably lower pore size and porosity.

Most importantly, the separation factor was found to be higher than 99.9% for all of the tested membranes.

Example 4

Comparing the Desalination Performance of SMM Blended Polyethersulfone to SMM Blended Polyetherimide Membranes by Direct Contact Membrane Distillation In this Example, nSMM was used to prepare SMM blended PES and PEI composite membranes. The membranes were prepared by a single casting step via the phase inversion method as described in an earlier study [16]. The membranes were characterized using a wide variety of characterization techniques including; gas permeation test, measurement of the liquid entry pressure of water (LEPw), scanning electronic microscopy (SEM), Atomic Force microscopy (AFM) and contact angle measurement (CA).

The main objective of this Example was to study the effect of the hydrophilic polymer type on the membrane characteristics as well as its DCMD performance when distilled water or 0.5M NaCl solution was used as a feed. The results were compared to those of the commercial PTFE membrane (FGLP 1425, Millipore Corporation USA). The prepared membranes are useful for practical application in desalination by DCMD. This Example further provides a link between the characteristics of the composite hydrophobic/hydrophilic composite membrane and the DCMD performance. This improves the overall understanding of the principle of the hydrophobic/hydrophilic composite membrane in membrane distillation.

Experimental

Materials

All chemicals used in this work and their chemical abstract service (CAS) number are enlisted in Table 14. The weight average molecular weight ($M_w$) of the polyetherimide (PEI) and the polyethersulfone used in this study are 15 and 30.8 kDa, respectively. The commercial membrane used is polytetrafluoroethylene, PTFE, (FGLP 1425) having a porosity of 0.70 and a nominal pore size of 0.25 µm supplied by the Millipore Corporation, Billerica, Mass., USA.

TABLE 14

Materials used in this Example.

| Material description | CAS number | Source |
|---|---|---|
| 4,4'-Methylene bis(phenyl isocyanate) (MDI, 98%) | 101-68-8 | Sigma-Aldrich, Inc., St. Louis, MO, USA |
| α,ω-Aminopropyl poly(dimethyl siloxane) (PDMS) of average molecular weight 900 | 106214-84-0 | Shin-Etsu Chemical Co. Ltd., Tokyo, Japan |
| Zonyl fluorotelomer intermediate, 2-(Perfluoroalkyl)ethanol, (FAE, BA-L of average $M_n$ 443 and 70 wt % fluorine | 678-39-7 | DuPont product supplied by Aldrich Chemical Company, Inc., Milwaukee, WI, USA |
| N,N-Dimethylacetamide (DMAc, anhydrous 99.8%) | 127-19-5 | Sigma-Aldrich, Inc., St. Louis, MO, USA |
| 1-Methyl-2-pyrrolidinone (NMP, anhydrous 99.5%) | 112-14-1 | Sigma-Aldrich, Inc., St. Louis, MO, USA |
| γ-Butyrolactone (GBL, 99+%) | 96-48-0 | Aldrich Chemical Company, Inc., Milwaukee, WI, USA |
| Ethanol (anhydrous, 99+%) | 64-17-5 | Aldrich Chemical Company, Inc., Milwaukee, WI, USA |
| Tetrahydrofuran (THF, HPLC grade 99.9%) | 109-99-9 | Aldrich Chemical Company, Inc., Milwaukee, WI, USA |
| Polyetherimide (PEI, Ultem 1000, Natural Pallet) Specific gravity: 1.27 | 61128-46-9 | General Electric Co., Pittsfield, MA, USA |
| Polyethersulfone (PES, Radel A-300PNT) | 25667-42-9 | Amoco Polymer Inc., Alpharetta, Georgia, USA |

SMMs Synthesis and Characterization

The SMMs were synthesized using a two-step solution polymerization method [23] as described above in Example 2. The first polymerization step was conducted in a solution with a predetermined composition to form polyurea as a prepolymer from the reaction of MDI with PDMS. In the second step, the pre-polymer was end-capped by the addition of FAE, resulting in a solution of SMM. The ratio of monomers for the synthesis of SMM was: MDI:PDMS:FAE=3:2:2. The prepared SMM is referred to hereafter as nSMM2 and has the PUDU structure shown in FIG. 8.

The synthesized SMM was characterized for fluorine content, glass transition temperature and weight and number average molecular weights as described above in Examples 2 and 3. As above, the values for m, y, and q, for the repeating units shown in the chemical structure of the SMM (see FIG. 8), were calculated from the average molecular weight of FAE, PDMS and SMM, respectively.

Membrane Preparation

SMM modified PES and PEI membranes were prepared in a single casting step by the phase inversion method [16]. γ-Butyrolactone (GBL) was used as a non-solvent additive for PEI and Ethanol (EtOH) was used in case of PES. NMP was used as solvent. A predetermined amount of PES or PEI was dissolved in a NMP/ETOH or NMP/GBL mixture. The polymer (PES or PEI) concentration in the casting solution was maintained at 12 wt %, while the amount of non-solvent additive (EtOH or GBL) was maintained at 10 wt %. The added SMM concentration was 1.5 wt %. The resulting mixtures were stirred in an orbital shaker at room temperature for at least 48 h. Prior to use, all polymer solutions were filtered through a 0.5 μm Teflon® filter and degassed at room temperature. The polymer solutions were cast on a smooth glass plate to a thickness of 0.30 mm using a casting rod at room temperature. The cast films together with the glass plates were immersed for 1 h in distilled water at room temperature. During gelation, it was observed that the membranes peeled off from the glass plate spontaneously. All the membranes were then dried at ambient conditions for 3 days. Two membranes were prepared, M1, which is made of PES as host polymer, and M2 based on PEI as host polymer.

Membrane Characterization

1. Measurement of Gas Permeation test and Liquid Entry Pressure of Water (LEPw)

Measurement of liquid entry pressure of water (LEPw) and the gas permeation test were carried out for the prepared surface modified membranes. The gas permeation test was performed prior to the measurement of LEPw. The details of the system and method are provided above in Examples 2 and 3, and the references cited therein.

As in Examples 2 and 3, throughout all the gas permeation experiments, it was noticed that the gas permeance was independent of $P_m$. Therefore, the diffusive mechanism seems to dominate the gas transport through the membrane pores revealing the fact that the prepared membranes in this Example have small pore sizes. Accordingly, the gas permeance is given, by ignoring the viscous term of Eq. (34), to get Eq. (35), which was useful in evaluating the ratio ($r\epsilon/L_p$).

Also, as in Examples 2 and 3, some of the gas permeation experiments were duplicated using different membrane sheets made from the same casting solution batch in order to evaluate the variance of the obtained values from batch to batch. Moreover, for each membrane, the measurement of the gas flow rate was made three times at a given gas pressure and the resulting values were averaged to obtain the membrane permeance value.

The measurements for the LEPw were then carried out as explained above and elsewhere [14]. The experiment was done three times using three different sheets made each casting solution batch. The results were averaged to obtain the final LEPw value of each membrane.

2. Scanning Electron Microscopy (SEM)

The cross-section of the SMMs blended PS membranes was analyzed by SEM using the same system and technique as set out in Example 2.

3. Atomic Force Microscopy (AFM) Observation

The morphology of the top surface (i.e., the hydrophobic surface) of the SMM/PES and SMM/PEI membranes was studied by atomic force microscopy (AFM). Details of the tapping mode (TM)-AFM technique are given elsewhere [33]. The membrane top surface was characterized in terms of the roughness, pore size and size of nodule aggregates.

Pore sizes and nodule/nodular aggregate sizes were measured by visual inspection of line profiles from the obtained AFM images. To obtain the pore sizes and nodule/nodular aggregate sizes, cross-sectional line profiles were selected to traverse micron scan surface areas of the TM-AFM images. The diameters of nodules (i.e., light region or bright area, high peaks) or pores (i.e., dark area, low valleys, depression) were measured by a pair of cursors along the reference line. The horizontal distance between each pair of cursors was taken as the diameter of the nodule/nodular aggregate or pore.

The sizes of the pores or nodule/nodular aggregates are based on the average of at least 30 measurements. The roughness parameters obtained from AFM images should not be considered as the absolute roughness value. In the present study, the same tip was used for all experiments and all captured surfaces were treated in the same way. The evaluation of the roughness parameters of each membrane sample was based on various micron scan areas (i.e., 1×1 μm$^2$). The pore size distribution was calculated by the method described by Singh et al. [34].

4. Measurement of Contact Angle (CA)

The contact angle (CA) of both SMM/PES and SMM/PEI membranes was measured to study their hydro-phobicity/-philicity using the same system and technique as set out in Example 2.

DCMD Experiments

The prepared SMM blended PES and PEI membranes were tested by the DCMD setup shown in a previous study [16] and detailed above in Example 3.

Results and Discussion

SMM and Membrane Characterization

The SMM characteristics, including the glass transition temperature ($T_g$), weight average molecular weight ($M_w$), number average molecular weight ($M_n$), fluorine content and the number of the structural repeating units are given in Table 15.

TABLE 15

Surface Modifying Macromolecules (SMM) characteristics

| | |
|---|---|
| Glass transition temperature, $T_g$ (° C.) | >280 |
| Weight average molecular weight, $M_w$ (10$^4$ g/mol) | 2.71 |
| Number average molecular weight, $M_n$ (10$^4$ g/mol) | 1.28 |
| Fluorine Content, F (wt %) | 11.75 |
| CF$_2$ repeating unit, m | 7.58 |
| Dimethylsiloxane repeating unit, y | 9.81 |
| Urea repeating unit, q | 22.58 |

The precise glass transition temperature ($T_g$) value could not be obtained for the SMM as the sample could be heated up to 280° C. due to the limitation of higher temperature of the equipment. According to the SMMs chemical composition presented in FIG. 8, the value of m, the number of repeat unit of $CF_2$, was calculated from the FAE molecular weight. The value of y, the number of repeat unit of dimethylsiloxane, was calculated from the average molecular weight of PDMS. The value of q, the number of the urea repeat unit was calculated from the SMM weight average molecular weight.

The prepared SMM/PES and SMM/PEI membranes are called hereafter M1 and M2, respectively. The resulting contact angle (CA) data from these membranes are shown in Table 16. It was observed that the CA of the top side of the prepared membranes is higher than their bottom side. The CA of the top side was nearly equal to or higher than 90° indicating that the top layer is sufficiently hydrophobic. In contrast, the CA of the membranes' bottom side was lower than 90° indicating the hydrophilicity of the bottom layer. This is evidence of formation of composite hydrophobic/hydrophilic membranes by the phase inversion method, in which hydrophobic nSMM is blended to a hydrophilic polymer.

TABLE 16

Top and bottom contact angles (CA) of the prepared membranes.

| Membrane | CA (θ°) |
|---|---|
| M1 | Top: 89.76 ± 3.34 |
|    | Bottom: 62.69 ± 3.82 |
| M2 | Top: 91.93 ± 0.52 |
|    | Bottom: 67.76 ± 3.29 |

Figure 21A:
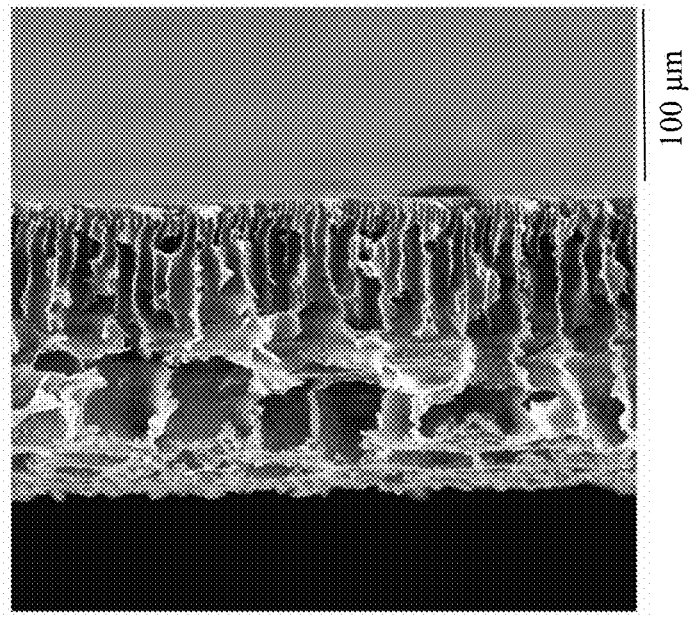
FIGS. 21A and 21B depict SEM pictures of the cross-section of nSMM2/PES and nSMM2/PEI membranes.
Figure 21B:
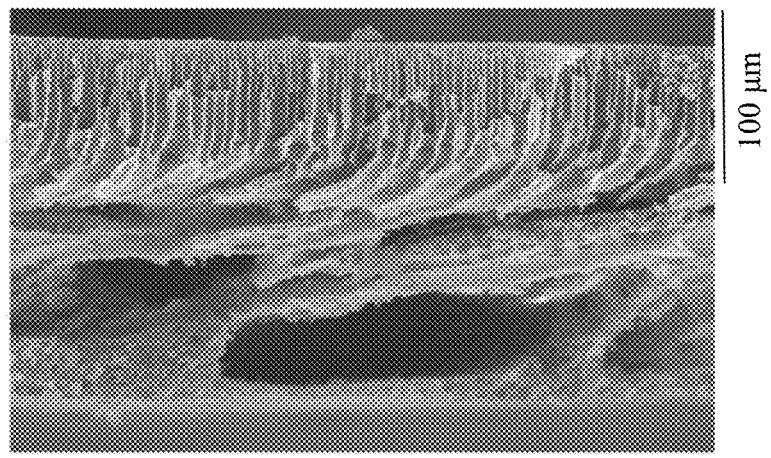

The SEM images of the membranes cross-section are shown in FIGS. 21A and 21B. As can be seen, all the membranes are of asymmetric structure with a dense top-layer supported by a finger-like structure underneath. However, the bottom parts of the membranes are different. The finger-like structure of the membrane M1 (FIG. 21A) reaches the bottom side, where small macro-voids were formed in vertical direction. On the other hand, for the M2 membrane (FIG. 21B), the finger-like structure became more irregular in the middle of the cross-section and large macro-voids were formed in horizontal direction.

Figure 22A:
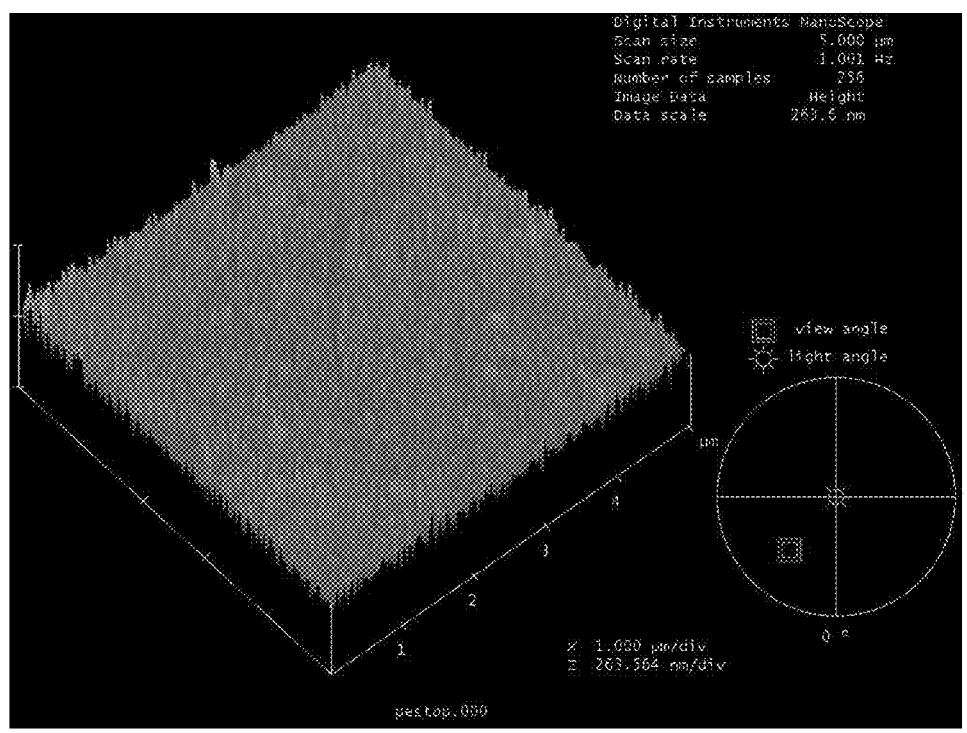
FIGS. 22A and 22B depict AFM images of the top surface of nSMM2/PES and nSMM2/PEI membranes.
Figure 22B:
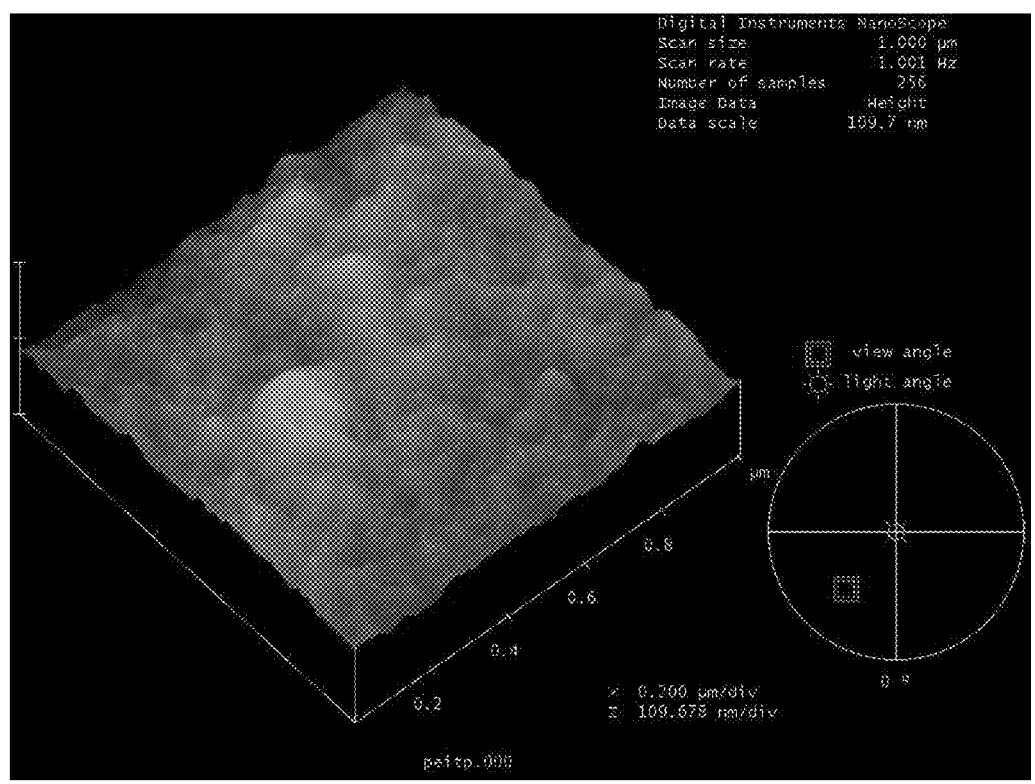

AFM images of the SMM/PES (M1) and SMM/PEI (M2) top side membranes are shown in FIGS. 22A and 22B. The bright side is the highest point (nodule) and the dark region is the lowest point (pore). For analyzing the top surface characteristics, AFM image analysis program was used. Table 17 shows the prepared membranes' top surface characteristics from the AFM analysis, including the mean pore size, the surface roughness and the mean nodule size.

TABLE 17

AFM analysis results of the prepared membranes' top surface

| Surface Characteristics | M1 | M2 |
|---|---|---|
| Mean pore size ($d_p$, nm) | 21.50 | 22.38 |
| Mean nodule size (nm) | 33.30 | 29.58 |
| Surface roughness (R, nm) | 9.8 | 10.32 |
| Geometric standard deviation ($\sigma_p$) | 1.18 | 1.28 |

As shown in Table 17, M1 membrane exhibited smaller mean pore size and larger nodule size compared to that of M2 membrane. From the mean pore size ($d_p$) and the geometric standard deviation ($\sigma_p$) data, the pore size distribution of the laboratory made membranes can be expressed by the probability density function [38]

$$\frac{df(d_i)}{dd_i} = \frac{1}{d_i \ln\sigma_p \sqrt{2\pi}} \exp\left[-\frac{(\ln d_i - \ln d_p)^2}{2(\ln\sigma_p)^2}\right] \quad (38)$$

Figure 23:
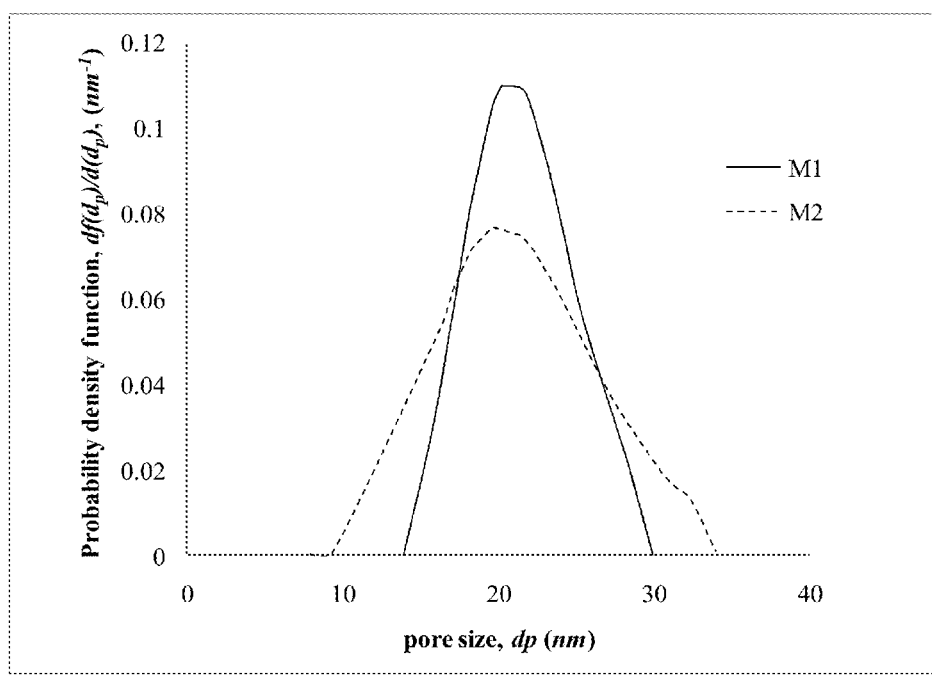
FIG. 23 shows the probability density function generated for the pore size measured from the AFM images.

The pore size distribution of M1 and M2 membranes are shown in FIG. 23. As can be seen, M1 membrane exhibited narrower pore size distribution than M2 membrane.

The data for the LEPw and product of average pore size and effective porosity per unit effective pore length ($r\epsilon/L_p$) are summarized in Table 18.

TABLE 18

Liquid entry pressure of water ($LEP_w$) and product of average pore size and effective porosity per unit effective pore length ($\epsilon r/L_p$) of the laboratory prepared membranes.

| Membrane | $LEP_w$ (bar) | $\epsilon r/Lp$ |
|---|---|---|
| M1 | 3.1 | 6.97 $10^{-5}$ |
| M2 | 4.0 | 1.53 $10^{-5}$ |

Membrane Performance

Figure 24A:
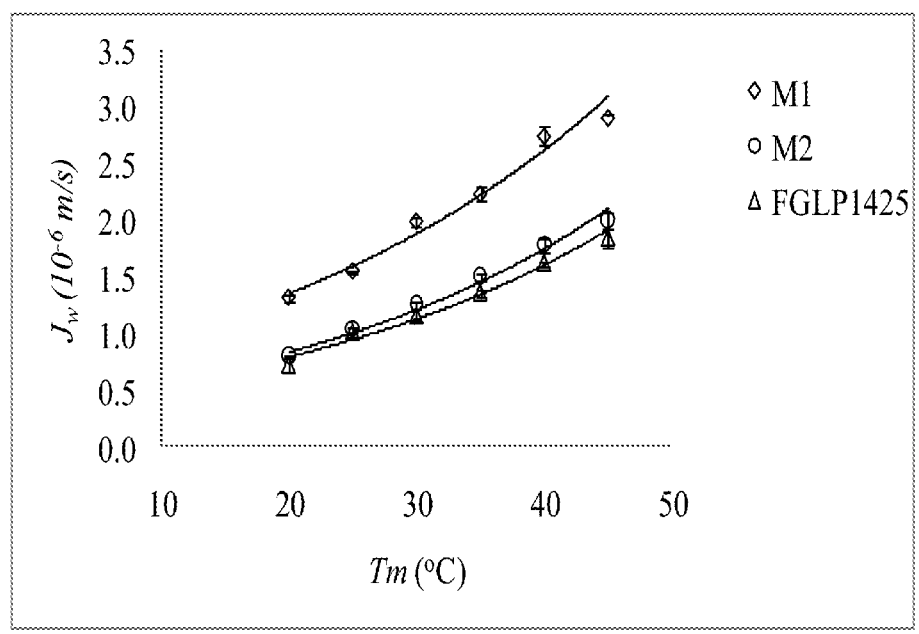
FIGS. 24A and 24B graphically depict the DCMD flux results of nSMM2/PES and nSMM2/PEI membranes.
Figure 24B:
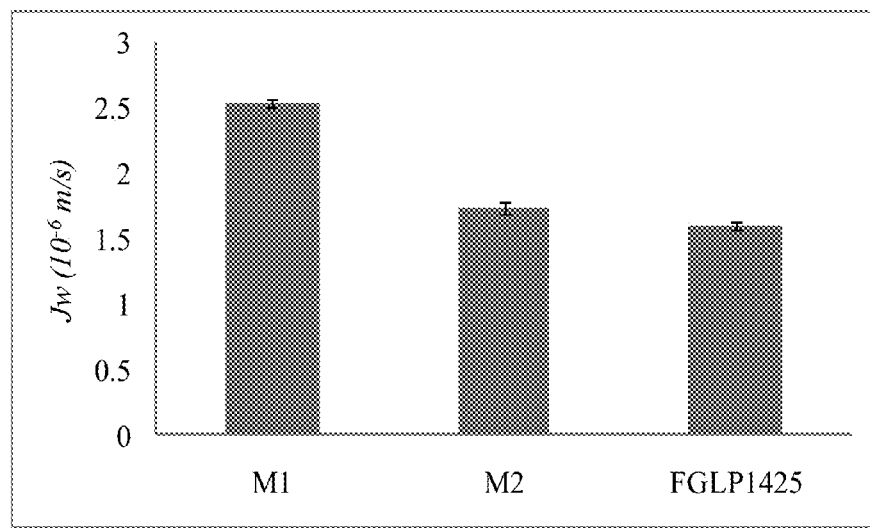

FIGS. 24A and 24B show the DCMD fluxes of the prepared M1 (PES) and M2 (PEI) membranes along with those of the commercial membrane (FGLP 1425). FIG. 24A shows the DCMD flux versus the average temperature of feed and permeate solutions (Tm) when distilled water was used as feed, while FIG. 24B shows the DCMD flux of the same membranes when using 0.5M NaCl aqueous solution as feed.

It is well documented that temperature is the operating variable that affects the MD flux the most due to the exponential increase of vapour pressure with temperature according to the Antoine equation [1-6, and 32]. As shown in FIG. 24A; both the commercial membrane and the SMM blended PES and PEI membranes exhibit an exponential increase of the DCMD flux with an increase in Tm.

Both FIGS. 24A and 24B show that the order in the DCMD flux is M1>M2>FGLP 1425. In other words, the prepared SMM blended PES or PEI membranes showed higher permeate fluxes than the commercial membrane. In particular, the DCMD flux of the membranes M1 and M2 was found, on average within the tested temperatures, to be 40% and 8%, respectively, higher than that of the commercial membrane as shown in FIG. 24A.

According to Table 18, the LEPw of the membranes under investigation followed the order of M2>M1. This indicates that the order of the maximum pore size, according to Laplace equation [13], should be M1>M2, when the hydrophobicity of both membranes are equal. Moreover, Table 18 shows that the decreasing order of the ratio ($r\epsilon/L_p$) is M1>M2. The orders both in maximum pore size and ($r\epsilon/L_p$) agree with the order in the permeate flux. It can be therefore concluded that the membrane exhibiting higher ($r\epsilon/L_p$) ratio will have higher DCMD flux. This is expected since an increase in the ratio ($r\epsilon/L_p$) means an increase in either the porosity and/or pore radius or a decrease in effective pore length.

According to the AFM data (see Table 17), M1 membrane exhibited smaller mean pore size compared to M2 membrane. This contradicts the reported permeate flux result. But according to $r\epsilon/L_p$ values then this flux enhancement is due to the increase of the effective porosity ratio, $\epsilon/L_p$, which is greater for M1 membrane.

As can be observed in FIG. 24B; smaller permeate fluxes were obtained in the presence of sodium chloride. The flux of M1, M2 and FGLP 1425 decreased by 13-15% compared to that obtained when distilled water was used as feed. Generally, it is expected to observe a flux decline in presence of NaCl, since the water vapour pressure decreases, which results in lower driving force for vapor transport. Moreover, a boundary layer develops next to the feed membrane surface, where the NaCl concentration increases toward the membrane surface due to concentration polarization. The presence of the concentration boundary layer and the temperature boundary layer together reduces the driving force.

The solute separation factor defined earlier in Eq. (37) was higher than 99.9% (the permeate conductivity was always smaller than 25 µS/cm in all the tested membranes) for all the tested membranes. This indicates that the SMMs blended membranes M1 and M2 are useful for MD processes.

Conclusions

The data presented in this Example provides a better and instructive understanding of hydrophobic/hydrophilic membranes performance in MD by finding the relationship between the membrane morphology and its performance in MD. In particular, the higher product of average pore size and effective porosity per unit effective pore length ($r\epsilon/L_p$) membranes produced higher fluxes. Membranes with higher liquid entry pressure of water (smaller maximum pore size) exhibitor higher fluxes.

Among the tested membrane preparation conditions it was found that the SMM/PES performed better membrane than SMM/PEI membranes.

Overall, both laboratory-made membranes performed better than the commercial PTFE membrane, although they have considerably lower pore size and porosity. Moreover, the separation factor was higher than 99.9% for all the tested membranes. Furthermore, it was proved that the SMMs are necessary to produce workable membranes in MD.

Example 5

Effect of Surface Modifying Macromolecules Stoichiometric Ratio on Composite Hydrophobic/Hydrophilic Membranes Characteristics and Performance in Membrane Distillation The present Example provides further improvement of the MD membranes performance by changing the nSMM structures. To this end, the stoichiometric ratio of nSMM components was altered systematically in nSMM synthesis:

1. nSMM1: 2(MDI):1(PDMS):2(FAE)
2. nSMM2: 3(MDI):2(PDMS):2(FAE)
3. nSMM3: 4(MDI):3(PDMS):3(FAE).

Furthermore, the newly developed SMMs were blended with PEI host polymer to prepare composite hydrophobic/hydrophilic membranes. This was done in a single casting step by the phase inversion method.

The membranes were characterized using gas permeation test, measurement of the liquid entry pressure of water (LEPw), scanning electronic microscopy (SEM), and contact angle measurement (CA). The effects of the SMM type on the membrane morphology were identified, which enabled us to link the membrane morphology to the membrane performance.

The membranes were further tested by DCMD for desalination of 0.5 M NaCl solution and the results were compared to commercial polytetrafluoroethylene (PTFE) membranes (FGLP 1425, Millipore Corporation, USA).

Experimental

Materials

All chemicals used in this work and their chemical abstract service (CAS) number are described in Example 2 above, and listed in Table 3.

SMMs Synthesis and Characterization

The SMMs were synthesized using a two-step solution polymerization method as described above in Example 2. The ratio of the components of the SMMs were MDI:PDMS: FAE=2:1:2, 3:2:2 and 4:3:3. The prepared SMMs are named hereafter as nSMM1, nSMM2 and nSMM3, respectively, based on the PDMS stoichiometric number. The chemical structure of the synthesized SMMs is shown in FIG. 8 as PUDU.

The synthesized SMM was characterized for fluorine content, glass transition temperature and weight and number average molecular weights as described above in Examples 2 and 3.

Membrane Preparation

SMM modified PEI membranes were prepared in a single casting step by the phase inversion method [15 and 16]. γ-Butyrolactone (GBL) was used as a non-solvent additive. A predetermined amount of PEI was dissolved in a NMP/GBL mixture. The PEI concentration in the casting solution was maintained at 12 wt %, while the amount of GBL was maintained at 10 wt %. Three different types of SMMs, nSMM1, nSMM2 and nSMM3, were added to the PEI solution in a concentration of 1.5 wt %. The resulting mixtures were stirred in an orbital shaker at room temperature for at least 48 h. Prior to their use, all the resulted polymer solutions were filtered through a 0.5 µm Teflon® filter and degassed at room temperature. The polymer solutions were cast on a smooth glass plate to a thickness of 0.30 mm using a casting rod at room temperature. The solvent was then evaporated at ambient temperature for a predetermined period before the cast films together with the glass plates were immersed for 1 h in distilled water at room temperature. During gelation, it was observed that the membranes peeled off from the glass plate spontaneously. All the membranes were then dried at ambient conditions for 3 days. Table 19 shows the prepared membranes, their materials of construction and preparation conditions.

TABLE 19

Prepared membranes codes and the type of SMM used[‡].

| Membrane Code | SMM type |
|---|---|
| M0 | No SMMs |
| M1 | nSMM1 |
| M2 | nSMM2 |
| M3 | nSMM3 |

[‡]PEI concentration: 12 wt %; GBL concentration: 10 wt %; NMP solvent: 76.5 wt %; SMMs: 1.5 wt %, gelation bath temperature; 20° C., evaporation time: 0 minute.

Membrane Characterization

1. Measurement of Gas Permeation test and Liquid Entry Pressure of Water (LEPw)

Measurement of liquid entry pressure of water (LEPw) and the gas permeation test were carried out for the prepared surface modified membranes. The gas permeation test was performed prior to the measurement of LEPw. The details of the system and method are provided above in Examples 2 and 3, and the references cited therein.

As in Examples 2 and 3, throughout all the gas permeation experiments, it was noticed that the gas permeance was independent of $P_m$. Therefore, the diffusive mechanism seems to dominate the gas transport through the membrane pores revealing the fact that the prepared membranes in this Example have small pore sizes. Accordingly, the gas permeance is given, by ignoring the viscous term of Eq. (34), to get Eq. (35), which was useful in evaluating the ratio ($r\epsilon/L_p$).

Also, as in Examples 2 and 3, some of the gas permeation experiments were duplicated using different membrane sheets made from the same casting solution batch in order to evaluate the variance of the obtained values from batch to batch. Moreover, for each membrane, the measurement of the gas flow rate was made three times at a given gas pressure and the resulting values were averaged to obtain the membrane permeance value.

The measurements for the LEPw were then carried out as explained above and elsewhere [14]. The experiment was done three times using three different sheets made each casting solution batch. The results were averaged to obtain the final LEPw value of each membrane.

2. Scanning Electron Microscopy (SEM)

The cross-section of the SMMs blended PS membranes was analyzed by SEM using the same system and technique as set out in Example 2.

3. X-ray Photoelectron Spectroscopy (XPS)

The elemental composition at the surface of each SMM blended membrane was determined by X-ray photoelectron spectroscopy using the same system and technique as set out in Example 2.

4. Measurement of Contact Angle (CA)

The contact angle (CA) of the SMMs blended membranes was measured to study their hydro-phobicity/-philicity using the same system and technique as set out in Example 2.

DCMD Experiments

The prepared SMMs blended PEI membranes were tested by the DCMD setup shown in a previous study [36]. The experiments were performed using the system and method described above in Example 2.

Results and Discussion

SMMs Characterization

The precise $T_g$ values could not be obtained for the SMMs (nSMM1, nSMM2 and nSMM3) as the samples were heated up to 280° C. due to the limitation of higher temperature of the equipment. According to the SMMs chemical structure presented in FIG. 8, the value of m, repeating unit of $CF_2$, was calculated from the molecular weight of (BAL). The values of y, repeating unit of dimethylsiloxane, were calculated from the average molecular weight of PDMS. q, repeating unit of the urea value was estimated for each SMM using two different methodologies; the SMMs molecular weight ($q_{Mwt}$) and fluorine content ($q_{Fwt\%}$). The values of $T_g$, number average molecular weight ($M_w$), fluorine content (F wt %), m, y, $q_{Mwt}$ and $q_{Fwt\%}$ for the SMMs are given in Table 20.

TABLE 20

SMMs characterization results

| SMM | F (wt %) | $M_w$ ($10^4$ g/mol) | $T_g$ (° C.) | M | y | $q_{Mwt}$ | $q_{Fwt\%}$ |
|---|---|---|---|---|---|---|---|
| nSMM1 | 16.21% | 2.95 | >280 | 7.58 | 9.81 | 24.67 | 2.306 |
| nSMM2 | 11.75% | 2.71 | >280 | 7.58 | 9.81 | 22.58 | 3.557 |
| nSMM3 | 10.06% | 3.30 | >280 | 7.58 | 9.81 | 27.71 | 4.320 |

Membrane Characterization

The contact angle (CA) data of all membranes are shown in Table 21. It was observed that the CA of the top side of the prepared membranes was higher than their bottom side. The higher CA of the membrane M1 and M3 compared to that of the membrane M2 prepared under the same conditions indicates that the hydrophobicity of the membranes prepared with nSMM1 (M1) and nSMM3 (M3) is greater than that of the membrane prepared with nSMM2 (M2).

TABLE 21

Top and bottom contact angle (CA) of the prepared membranes

| Membrane | CA (θ°) |
|---|---|
| M0 | Top: 80.04 ± 4.55 |
|    | Bottom: 72.83 ± 2.62 |
| M1 | Top: 93.55 ± 1.054 |
|    | Bottom: 62.84 ± 3.05 |
| M2 | Top: 91.93 ± 0.52 |
|    | Bottom: 67.76 ± 3.29 |
| M3 | Top: 100.17 ± 3.62 |
|    | Bottom: 73.80 ± 4.08 |

The results of the XPS analysis for both PEI and SMMs blended PEI membranes are presented in Table 22. Fluorine was not detected in the PEI membrane. This is expected since fluorine is associated to SMMs. For all the SMMs blended PEI membranes, fluorine contents were found to be higher at the top side than the bottom side indicating SMMs' migration towards the top side. The nSMM1 blended PEI membrane (M1) exhibits more fluorine than the nSMM2 and nSMM3 blended PEI membrane (M2 and M3), respectively. This is related to the order in the fluorine contents of SMMs, i.e. nSMM1>nSMM2>nSMM3 (Table 20). It is worth mentioning that the fluorine content at the top side of nSMM1 and nSMM2 blended PEI membranes was significantly higher than the bottom side. On the other hand, nSMM3 blended PEI membrane exhibited only a small difference between the top and the bottom side. This indicates that the migration of nSMM1 and nSMM2 to the top-layer was much faster than nSMM3. The fast migration of nSMM2 to the top-layer is reported in [25].

TABLE 22

XPS results of the prepared membranes for both top and bottom sides

| Membrane | F (mass conc., %) |
|---|---|
| M0 | Top: 0.00 |
|    | Bottom: 0.00 |
| M1 | Top: 30.80 |
|    | Bottom: 4.62 |
| M2 | Top: 28.93 |
|    | Bottom: 7.68 |
| M3 | Top: 5.82 |
|    | Bottom: 4.89 |

Figure 25A:
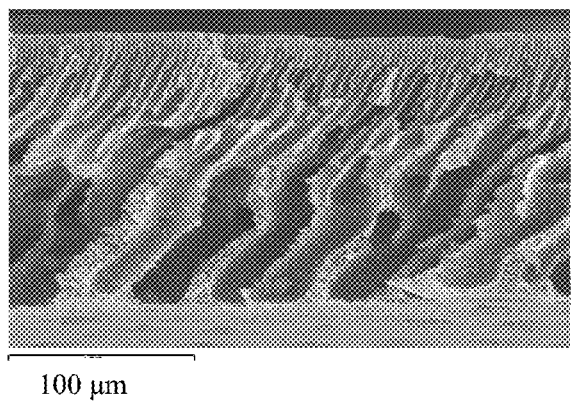
FIGS. 25A-25C depict SEM pictures of the cross-section of the prepared membranes from Example 5.
Figure 25B:
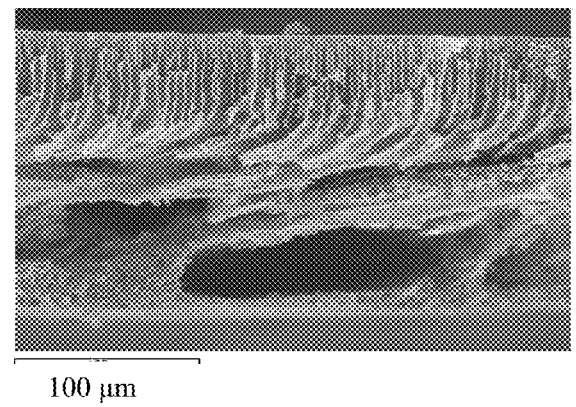
Figure 25C:
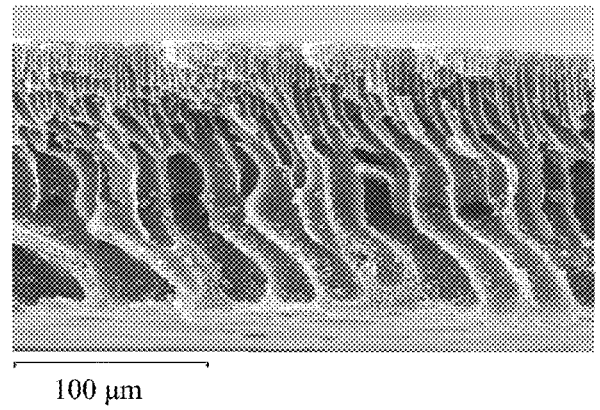

The SEM images of the membrane cross-sections are shown in FIGS. 25A-25C. As can be seen, all the membranes are of asymmetric structure with a dense top-layer supported by a finger-like structure underneath. However, the bottom parts of the membranes are different. The finger-like structure of the membrane M1 and M3 (FIG. 25A and FIG. 25C, respectively) reaches the bottom side, where small macro-voids were formed in vertical direction. On the other hand, for the M2 membrane (FIG. 25B), the finger-like structure became more irregular in the middle of the cross-section and large macro-voids were formed in horizontal direction.

The data for the LEPw and product of average pore size and effective porosity per unit effective pore length ($r\epsilon/L_p$) are summarized in Table 23. The increasing order in LEPw values was; M2 (4.0 bar)<M1 (4.5 bar)<M3 (4.7 bar). According to the Laplace equation [27], the above order should be the same as the order in the decreasing pore size and/or in the increasing hydrophobicity. It is found that both are satisfied when looking into the $\epsilon r/L_p$ values in Table 23 (M2 (1.53× $10^{-5}$)>M1 (6.02×$10^{-6}$)>M3 (2.74×$10^{-6}$)) and the CA data in Table 21 (M2 (91.93°)<M1 (93.55°)<M3 (100.17°)).

TABLE 23

Liquid entry pressure of water (LEPw) and $\epsilon r/L_p$ of prepared membranes

| Membrane | LEP$_w$ (bar) | $\epsilon r/L_p$ |
|---|---|---|
| M1 | 4.5 | 6.02 $10^{-6}$ |
| M2 | 4.0 | 1.53 $10^{-5}$ |
| M3 | 4.7 | 2.74 $10^{-6}$ |

Membrane Performance

Figure 26A:
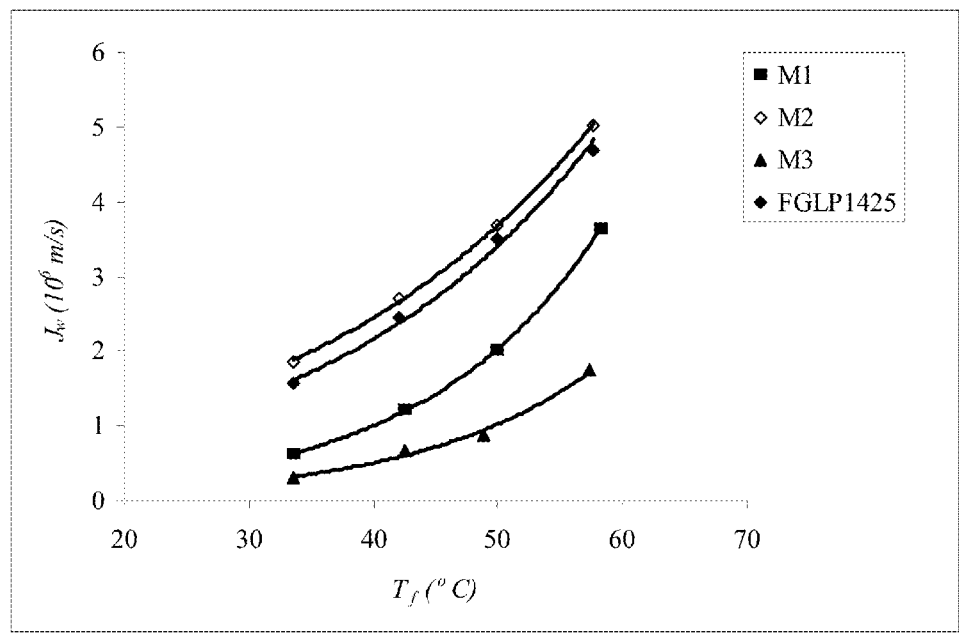
FIGS. 26A and 26B graphically depict the effect of SMM type on membrane performance in DCMD from Example 5.
Figure 26B:
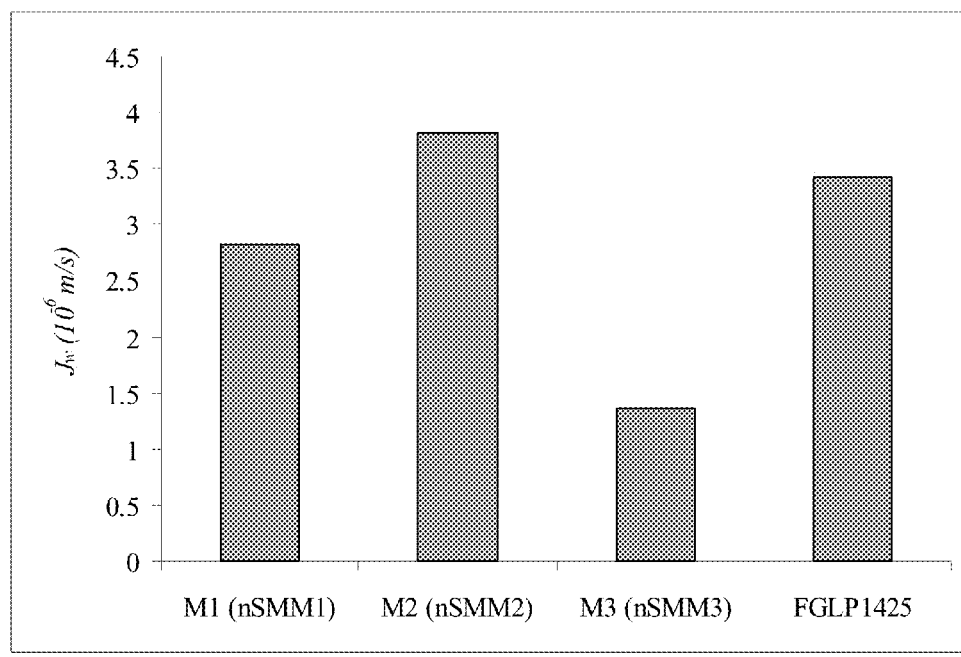

FIGS. 26A and 26B show the DCMD fluxes of the prepared membranes along with those of the commercial membrane (FGLP 1425). FIG. 26A shows the DCMD flux versus feed inlet temperature when distilled water was used as feed. FIG. 26B shows the DCMD flux of those membranes when using 0.5M NaCl aqueous solution as feed. As can be observed, both the commercial membrane and the SMMs blended PEI membranes exhibit an exponential increase of the DCMD flux with an increase in the feed inlet temperature. Both FIGS. 26A and 26B show that the order in the DCMD flux is M2>FGLP 1425>M1>M3. The nSMM2 blended PEI membrane (M2) showed ca 10% higher permeate fluxes than the commercial membrane. On the other hand, M1 and M3 exhibited lower fluxes than that of the commercial membrane by 42% and 72%, respectively.

The permeate flux for the NaCl aqueous solution was 25 to 30% lower than the distilled water flux, reflecting the lower vapor pressure of the salt solution. Another reason for the decrease in the DCMD flux is the concentration polarization due to the presence of NaCl solute in the feed membrane side [16]. Referring to the studies using the salt solution, the solute separation factor (defined by Eq. (37)) was above 99% for both the prepared and the commercial membranes. This indicates that the SMMs blended membranes M1, M2 and M3 are promising MD membranes as reported in previous studies [16-18]. It is interesting to note that the order in the DCMD flux is M2>M1>M3, which is precisely the decreasing order in (r$\epsilon/L_p$). It can therefore be concluded that the higher $\epsilon r/L_p$, the higher the flux will be. This is consistent with the fact that increasing (r$\epsilon/L_p$) coincides with an increase in either porosity or pore radius or a decrease in effective pore length, which will naturally lead to a decrease in the barrier resistance. Nevertheless, the parallel relationship found between the gas transport and vapour transport is documented in an earlier study [14].

Furthermore, the reported flux results match well with the LEPw and CA measurements, since the membrane with lowest LEPw and CA exhibited the highest flux due to the fact that it has the largest maximum pore size as was discussed earlier.

According to the SEM pictures shown in FIGS. 25A-25C, the macro-voids size of M2 membrane was larger than those of M1 and M3 membranes. This might have reduced the barrier resistance toward mass transfer and enhanced the flux as a result.

REFERENCES

[1]. K. W. Lawson, D. R. Lloyd, Membrane distillation, J. Membr. Sci., 124 (1997) 1-25.
[2]. J. I. Mengual, L. Peña, Membrane distillation, Current Topic Colloid Interface Sci., 1 (1997) 17-29.
[3]. A. Burgoyne, M. M. Vandati, Direct contact membrane distillation, Sep. Sci Technol., 35 (2000) 1257-1284.
[4]. A. M. Alklaibi, N. Lior, Membrane-distillation desalination: Status and potential, Desalination, 171 (2004) 111-131.
[5]. E. Curcio, E. Drioli, Membrane distillation and related operations—a review, Sep. Purif. Rev., 34 (2005) 35-86.
[6]. M. S. El-Bourawi, Z. Ding, R. Ma, M. Khayet, A framework for better understanding membrane distillation separation process, J. Membr. Sci., 285 (2006) 4-29.
[7]. P. Peng, A. G. Fane, X. Li, Desalination by membrane distillation adopting a hydrophilic membrane, Desalination 173 (2005) 45-54.
[8]. C. Feng, B. Shi, G. Li, Y. Wu, Preparation and properties of microporous membrane from poly(vinylidene fluoride-co-tetrafluoroethylene) (F2.4) for membrane distillation, J. Membr. Sci., 237 (2004) 15-24.
[9]. C. Feng, R. Wang, B. Shi, G. Li, Y. Wu, Factors affecting pore structure and performance of poly(vinylidene fluoride-co-hexafluoro propylene) asymmetric porous membrane, J. Membr. Sci., 277 (2006) 55-64.
[10]. B. Li, K. K. Sirkar, Novel membrane and device for vacuum membrane distillation-based desalination process, J. Membr. Sci., 257 (2005) 60-75.
[11]. L. Song, B. Li, K. K. Sirkar, J. L. Girlon, Direct contact membrane distillation-based desalination: Novel membranes, devices, larger-scale studies, and a model, Ind. Eng. Chem. Res., 46 (2007) 2307-2323.
[12]. J. Girlon, L. Song, K. K. Sirkar, Design for cascade of crossflow direct contact membrane distillation, Ind. Eng. Chem. Res., 46 (2007) 2324-2334.
[13]. S. Bonyadi, T. S. Chung, Flux enhancement in membrane distillation by fabrication of dual layer hydrophilic-hydrophobic hollow fiber membranes, J. Membr. Sci., 306 (2007) 134-146.
[14]. M. Khayet, T. Matsuura, Preparation and characterization of Polyvinylidene fluoride membranes for membrane distillation, Ind. Eng. Chem. Res., 40 (2001) 5710-5718.
[15]. M. Khayet, T. Matsuura, Application of surface modifying macromolecules for the preparation of membranes for membrane distillation, Desalination, 158 (2003) 51-56.
[16]. M. Khayet, J. I. Mengual, T. Matsuura, Porous hydrophobic/hydrophilic composite membranes: Application in desalination using direct contact membrane distillation, J. Membr. Sci., 252 (2005) 101-113.
[17]. M. Khayet, T. Matsuura, J. I. Mengual, Porous hydrophobic/hydrophilic composite membranes: Estimation of the hydrophobic layer thickness, J. Membr. Sci., 266 (2005) 68-79.
[18]. M. Khayet, T. Matsuura, J. I. Mengual, M. Qtaishat, Design of novel direct contact membrane distillation membranes, Desalination, 192 (2006) 105-111.
[19]. M. Khayet, T. Matsuura, M. R. Qtaishat, J. I. Mengual, Porous hydrophobic/hydrophilic composite membranes: Preparation and application in DCMD desalination at higher temperatures, Desalination, 199 (2006) 180-181.
[20]. M. Khayet, D. E. Suk, R. M. Narbaitz, J. P. Santerre, T. Matsuura, Study on surface modification by surface-modifying macromolecules and its applications in membrane-separation processes, J. Appl. Polym. Sci., 89 (2003) 2902-2916.

[21]. A. L. Ahmad, M. Sarif, S. Ismail, Development of an integrally skinned ultrafiltration membrane for wastewater treatment: effect of different formulations of PSf/NMP/PVP on flux and rejection, Desalination, 179 (2005) 256-263.

[22]. Y. Fang, V. A. Pham, T. Matsuura, J. P. Santerre, R. M. Narbaitz, Effect of surface-modifying macromolecules and solvent evaporation time on the performance of polyethersulfone membranes for the separation of chloroform/water mixtures by pervaporation, J. Appl. Polym. Sci., 54 (1994) 1937-1943.

[23]. D. E. Suk, T. Matsuura, H. B. Park, Y. M. Lee, Synthesis of a new type of surface modifying macromolecules (nSMM) and characterization and testing of nSMM blended membranes for membrane distillation, J. Membr. Sci., 277 (2006) 177-185.

[24]. P. C. Carman, "Flow of gases through porous media", Butterworth Publication, London, UK, 1956.

[25]. D. E. Suk, G. Chowdhury, T. Matsuura, R. M. Narbaitz, P. Santerre, G. Pleizier, Y. Deslandes, Study on the kinetics of surface migration of surface modifying macromolecules in membrane preparation, Macromolecules, 35 (2002) 3017-3021.

[26]. T. Matsuura, "Synthetic membranes and membranes separation processes", CRC Press, Boca Raton, Fla., 1994.

[27]. M. Mulder, "Basic Principles of Membrane Technology", Kluwer Academic Publisher, Boston, Mass., (1996).

[28]. Zhen-Liang Xu, F. Alsalhy Qusay, Polyethersulfone (PES) hollo fiber ultrafiltration membranes prepared by PES/non-solvent/NMP solution, J. Membr. Sci., 233 (2004) 101-111.

[29]. D. Rana, T. Matsuura, R. M. Narbaitz, C. Feng, Development and characterization of novel hydrophilic surface modifying macromolecule for polymeric membranes, J. Membr. Sci., 249 (2005) 103-112.

[30]. D. Rana, T. Matsuura, R. M. Narbaitz, Novel hydrophilic surface modifying macromolecules for polymeric membranes: Polyurethane ends capped by hydroxy group, J. Membr. Sci., 282 (2006) 205-216.

[31]. M. Khayet, T. Matsuura, Surface modification of membranes for the separation of volatile organic compounds from water by pervaporation, Desalination, 148 (2002) 31-37.

[32]. L. Martinez, F. J. Florido-Diaz, A. Hernandez, P. Pradanos, Characterization of three hydrophobic porous membranes used in membrane distillation: Modelling and evaluation of their water vapour permeabilities, J. Membr. Sci., 203 (2002) 15-27.

[33]. J. Barzin, C. Feng, K. C. Khulbe, T. Matsuura, S. S. Madaeni, H. Mirzadeh, Characterization of polyethersulfone hemodialysis membrane by ultrafiltration and atomic force microscopy, J. Membr. Sci. 237 (2004) 77-85.

[34]. S. Singh, K. C. Khulbe, T. Matsuura, P. Ramamurthy, Membrane characterization by solute transport and atomic force microscopy, J. Membr. Sci. 142 (1998) 111-127.

[35]. Y. Fang, V. A. Pham, T. Matsuura, J. P. Santerre, R. M. Narbaitz, Effect of surface-modifying macromolecules and solvent evaporation time on the performance of polyethersulfone membranes for the separation of chloroform/water mixtures by pervaporation, J. Appl. Polym. Sci., 54 (1994) 1937-1943.

[36]. M. Qtaishat, T. Matsuura, B. Kruczek, M. Khayet, Heat and mass transfer analysis in direct contact membrane distillation, Desalination, 219 (2008) 272-292.

[37]. F. A. Banat, F. Abu Al-Rub, K. Bani-Melhem, Desalination by vacuum membrane distillation: sensitivity analysis, Sep. & Pur. Tech., 33 (2003) 75-85.

[38]. M. Khayet, M. P. Godino, J. I. Mengual, Modelling transport mechanism through a porous partition, J. Non-Equi. Therm., 26 (2001) 1-14.

[39]. R. W. Schofield, A. G. Fane, C. J. D. Fell, Heat and mass transfer in membrane distillation, J. Membr. Sci., 33 (1987) 299-313.

[40]. M. Khayet, T. Matsuura, Pervaporation and vacuum membrane distillation processes: Modeling and experiments, AIChE J., 50 (2004) 1679-1712.

[41]. J. Phattaranawik, R. Jiraratananon, A. G. Fane, Effect of pore size distribution and air flux on mass transport in direct contact membrane distillation, J. Membr. Sci., 215 (2003) 75-85.

[42]. L. Martinez, J. M. Rodriguez-Maroto, On transport resistances in direct contact membrane distillation, J. Membr. Sci., 295 (2007) 28-39.

[43]. F. Lagand, G. Barbieri, and E. Drioli, Direct contact membrane distillation: modelling and concentration experiments, J. Membr. Sci., 166 (2000) 1-11.

[44]. M. Tomaszewska, Preparation and properties of flat-sheet membranes from polyvinylidene fluoride for membrane distillation, Desalination, 104 (1996) 1-11.

[45]. M. Khayet, Membrane Surface modification and characterization by X-ray photoelectron spectroscopy, atomic force microscopy and contact angle measurements, Appl. Surf Sci., 238 (2004) 269-272.

[46]. A. O. Imdakem, T. Matsuura, A Monte Carlo simulation model for membrane distillation process: direct contact (MD), J. Membr. Sci., 237 (2004) 51-59.

[47]. A. O. Imdakem, T. Matsuura, Simulation of heat and mass transfer in direct contact membrane distillation (MD): The effect of membrane physical properties, J. Membr. Sci., 262 (2005) 117-128.

[48]. M. Khayet, A. Velazquez, J. I. Mengual, Modelling mass transport through a porous partition: Effect of pore size distribution, J. Non-Equilibrium Thermodynamics 29 (2004) 279-299.

[49]. C. A. Speraty, Physical Constants of fluoropolymers, Polymer Handbook, $3^{rd}$ Ed., Wiley, New York, 1989.

[50]. M. Khayet, C. Y. Feng, T. Matsuura, Morphological study of fluorinated asymmetric polyetherimide ultrafiltration membranes by surface modifying macromolecules, J. Membr. Sci., 213 (2003) 159-180.

All publications, patents and patent applications mentioned in this Specification are indicative of the level of skill of those skilled in the art to which this invention pertains and are herein incorporated by reference to the same extent as if each individual publication, patent, or patent applications was specifically and individually indicated to be incorporated by reference.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

The embodiments of the invention in which an exclusive property or privilege is claimed are defined as follows:

1. A composite hydrophilic/hydrophobic membrane comprising a hydrophilic polymer layer and a hydrophobic polymer layer comprising a fluorinated surface-modifying macromolecule (SMM), wherein said composite membrane has a) vapour flux of at least 10 kg/m² h at 10° C. bulk temperature difference, at a feed temperature of 45° C. and a permeate temperature of 35° C., and b) criterion parameter ($f_i$) of less than 1, wherein the SMM is poly(urea dimethylsiloxane urethane) prepared using a two step polymerization method comprising a first polymerization step to form a polyurea pre-polymer from 4,4'methylene bis(phenyl isocyanate) (MDI) and α,ω-aminopropyl poly(dimethylsiloxane) (PDMS), and a second polymerization step to end-cap the polyurea pre-polymer by the addition of 2-(perfluoroalkyl)ethanol (FAE), and wherein the ratio of MDI:PDMS:FAE is about 2:1:2, about 3:2:2 or about 4:3:3.

2. The composite membrane of claim 1, wherein said hydrophilic polymer layer comprises polysulfone, polyether sulfone, polyetherimide polyvinylidenefluoride or cellulose acetate.

3. A membrane distillation system comprising a composite hydrophilic/hydrophobic membrane according to claim 1.

4. The membrane distillation system of claim 3, wherein said hydrophilic polymer layer comprises polysulfone, polyether sulfone, polyetherimide polyvinylidenefluoride or cellulose acetate.

5. The membrane distillation system of claim 3, which is a direct contact membrane distillation system, a vacuum membrane distillation system, a sweeping gas membrane distillation system, an air gap membrane distillation system, or an osmotic membrane distillation system.

6. The membrane distillation system of claim 5, which is a direct contact membrane distillation system.

7. A method of manufacturing a composite hydrophilic/hydrophobic membrane comprising a hydrophilic polymer layer and a hydrophobic polymer layer, said method comprising the steps of:
(a) blending a host hydrophilic polymer with a fluorinated surface-modifying macromolecule (SMM) and a non-solvent additive in a solvent;
(b) casting the polymer blend and allowing the solvent to evaporate at room temperature for a predetermined time; and
(c) immersing the cast film produced in step (b) in water to allow gelation,
wherein the composite membrane has i) vapour flux of at least 10 kg/m² h at 10° C. bulk temperature difference, at a feed temperature of 45° C. and a permeate temperature of 35° C., and ii) criterion parameter ($f_i$) of less than 1,
wherein the SMM is poly(urea dimethylsiloxane urethane) prepared using a two step polymerization method comprising a first polymerization step to form a polyurea pre-polymer from 4,4'methylene bis(phenyl isocyanate) (MDI) and α,ω-aminopropyl poly(dimethylsiloxane) (PDMS), and a second polymerization step to end-cap the polyurea pre-polymer by the addition of 2-(perfluoroalkyl)ethanol (FAE), and
wherein the ratio of MDI:PDMS:FAE is about 2:1:2, about 3:2:2 or about 4:3:3.

8. The method of claim 7, wherein the host hydrophilic polymer is polysulfone, polyether sulfone, polyetherimide polyvinylidenefluoride, cellulose acetate or a mixture thereof.

9. The method of claim 7, wherein the non-solvent additive is γ-butyrolactone, methanol, or ethanol, or water.

10. The method of claim 7, wherein the solvent is N,N-dimethylacetamide or 1-methyl-2-pyrrolidinone.

* * * * *